US012794520B2

(12) United States Patent
Wang et al.

(10) Patent No.: US 12,794,520 B2
(45) Date of Patent: Nov. 10, 2026

(54) EIGHT PORT UPLINK TRANSMISSION ENHANCEMENTS

(71) Applicant: Intel Products IP LLC, Santa Clara, CA (US)

(72) Inventors: Guotong Wang, Beijing (CN); Alexei Davydov, Nizhny Novgorod (RU)

(73) Assignee: Intel Products IP LLC, Santa Clara, CA (US)

( * ) Notice: Subject to any disclaimer, the term of this patent is extended or adjusted under 35 U.S.C. 154(b) by 193 days.

(21) Appl. No.: 18/727,194

(22) PCT Filed: Mar. 6, 2023

(86) PCT No.: PCT/US2023/014610
§ 371 (c)(1),
(2) Date: Jul. 8, 2024

(87) PCT Pub. No.: WO2023/177547
PCT Pub. Date: Sep. 21, 2023

(65) Prior Publication Data
US 2025/0112675 A1 Apr. 3, 2025

(30) Foreign Application Priority Data
Mar. 14, 2022 (WO) ................ PCT/CN2022/080592
Mar. 25, 2022 (WO) ................ PCT/CN2022/083001
(Continued)

(51) Int. Cl.
*H04W 4/00* (2018.01)
*H04B 7/0456* (2017.01)
(Continued)

(52) U.S. Cl.
CPC ......... *H04B 7/0456* (2013.01); *H04L 27/261* (2013.01); *H04W 72/21* (2023.01)

(58) Field of Classification Search
CPC ..... H04W 72/21; H04L 27/261; H04B 7/0456
See application file for complete search history.

(56) References Cited

U.S. PATENT DOCUMENTS

2020/0083939 A1* 3/2020 Park .................... H04L 25/0226
2020/0100327 A1 3/2020 Zhang et al.
(Continued)

FOREIGN PATENT DOCUMENTS

WO WO-2023177547 A1 9/2023

OTHER PUBLICATIONS

"International Application Serial No. PCT/US2023/014610, International Search Report mailed Jun. 7, 2023", 4 pgs.
(Continued)

*Primary Examiner* — Omoniyi Obayanju
(74) *Attorney, Agent, or Firm* — Schwegman Lundberg & Woessner, P.A.

(57) ABSTRACT

An apparatus and system of providing uplink transmission with eight ports are described. Precoders for partial and full coherent UE uplink transmissions are described, in addition to downlink control information (DCI) enhancements and sounding reference signal (SRS) configurations for codebook-based uplink transmission. Precoder matrices are provided for different ranks for the eight port transmissions.

20 Claims, 18 Drawing Sheets

(30) Foreign Application Priority Data

| | | | |
|---|---|---|---|
| Apr. 6, 2022 | (WO) | ................ | PCT/CN2022/085273 |
| Apr. 6, 2022 | (WO) | ................ | PCT/CN2022/085305 |
| Apr. 15, 2022 | (WO) | ................ | PCT/CN2022/086950 |

(51) Int. Cl.

| | |
|---|---|
| ***H04L 27/26*** | (2006.01) |
| ***H04W 72/21*** | (2023.01) |

(56) References Cited

U.S. PATENT DOCUMENTS

| | | | | |
|---|---|---|---|---|
| 2020/0177261 | A1 | 6/2020 | Park et al. | |
| 2021/0314873 | A1 | 10/2021 | Huang et al. | |
| 2021/0337534 | A1 | 10/2021 | Xiong et al. | |
| 2024/0251405 | A1 * | 7/2024 | Matsumura ....... | H04W 72/0446 |

OTHER PUBLICATIONS

"International Application Serial No. PCT/US2023/014610, Written Opinion mailed Jun. 7, 2023", 4 pgs.

* cited by examiner 8 port: partial coherent
4 port: partial coherent
2 port: non-coherent

EIGHT PORT UPLINK TRANSMISSION ENHANCEMENTS

PRIORITY CLAIM

This application is a U.S. National Stage Filing under 35 U.S.C. 371 from International Application No. PCT/US2023/014610, filed Mar. 6, 2023 and published in English as WO 2023/177547 on Sep. 21, 2023, which claims the benefit of priority to International Application No. PCT/CN2022/80592, filed Mar. 14, 2022, International Application No. PCT/CN2022/083001, filed Mar. 25, 2022, International Application No. PCT/CN2022/085273, filed Apr. 6, 2022, International Application No. PCT/CN2022/085305, filed Apr. 6, 2022, and International Application No. PCT/CN2022/086950, filed Apr. 15, 2022, each of which is incorporated herein by reference in its entirety.

TECHNICAL FIELD

Embodiments pertain to wireless communications. Some embodiments relate to uplink transmission with eight ports.

BACKGROUND

The use and complexity of wireless systems has increased due to both an increase in the types of electronic devices using network resources as well as the amount of data and bandwidth being used by various applications, such as video streaming, operating on the electronic devices. As expected, a number of issues abound with the advent of any new technology, including complexities related to multiple (in particular, eight) port transmissions.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
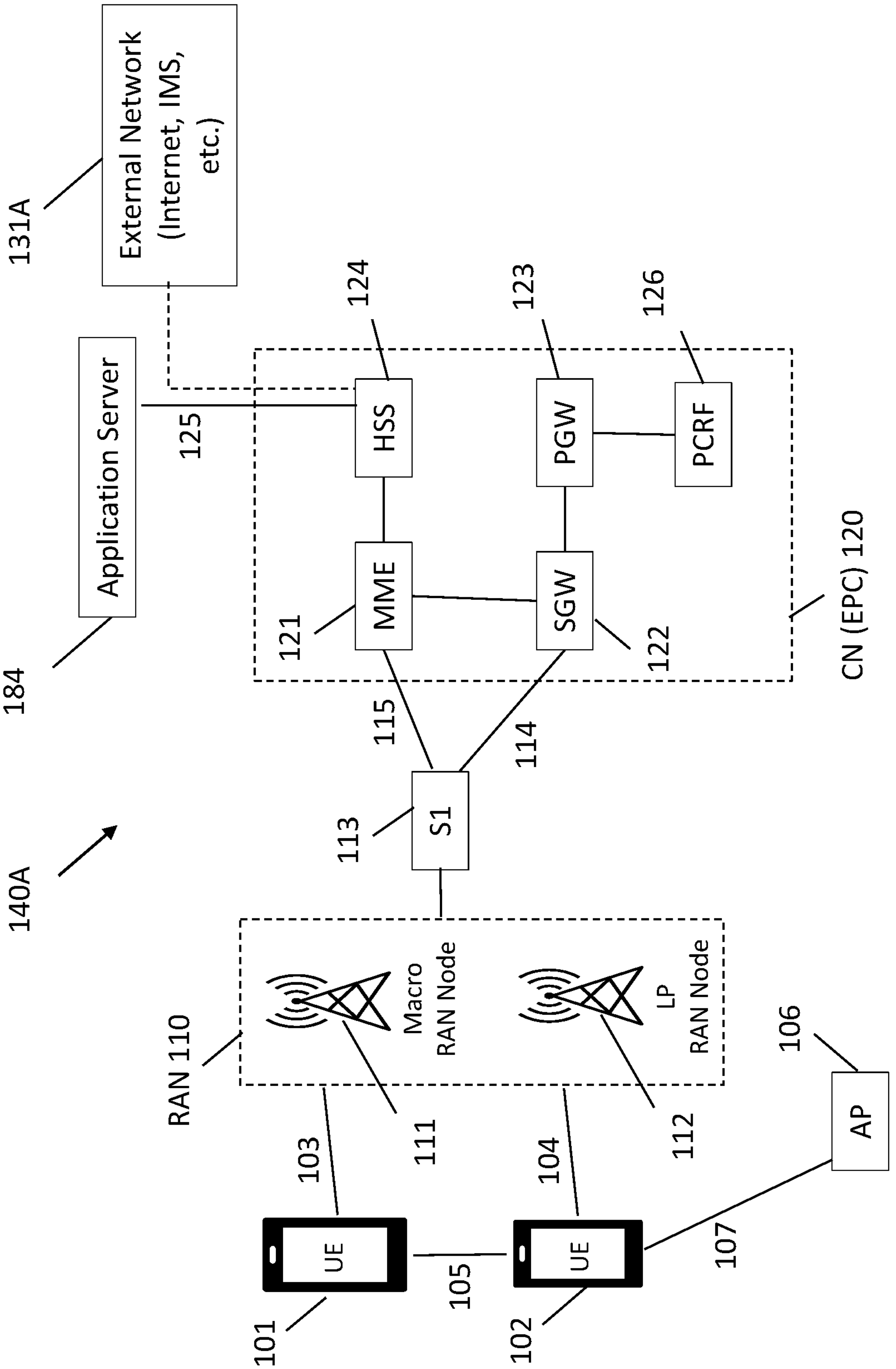
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G and later generation functions. Accordingly, although 5G will be referred to, it is to be understood that this is to extend as able to 6G (and later) structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The RAN 110 may contain one or more gNBs, one or more of which may be implemented by multiple units. Note that although gNBs may be referred to herein, the same aspects may apply to other generation NodeBs, such as 6$^{th}$ generation NodeBs—and thus may be alternately referred to as next generation NodeB (xNB).

Each of the gNBs may implement protocol entities in the 3GPP protocol stack, in which the layers are considered to be ordered, from lowest to highest, in the order Physical (PHY), Medium Access Control (MAC), Radio Link Control (RLC), Packet Data Convergence Control (PDCP), and Radio Resource Control (RRC)/Service Data Adaptation Protocol (SDAP) (for the control plane/user plane). The protocol layers in each gNB may be distributed in different units—a Central Unit (CU), at least one Distributed Unit (DU), and a Remote Radio Head (RRH). The CU may provide functionalities such as the control the transfer of user data, and effect mobility control, radio access network sharing, positioning, and session management, except those functions allocated exclusively to the DU.

The higher protocol layers (PDCP and RRC for the control plane/PDCP and SDAP for the user plane) may be implemented in the CU, and the RLC and MAC layers may be implemented in the DU. The PHY layer may be split, with the higher PHY layer also implemented in the DU, while the lower PHY layer is implemented in the RRH. The CU, DU and RRH may be implemented by different manufacturers, but may nevertheless be connected by the appropriate interfaces therebetween. The CU may be connected with multiple DUs.

The interfaces within the gNB include the E1 and front-haul (F) F1 interface. The E1 interface may be between a CU control plane (gNB-CU-CP) and the CU user plane (gNB-CU-UP) and thus may support the exchange of signalling information between the control plane and the user plane through E1AP service. The E1 interface may separate Radio Network Layer and Transport Network Layer and enable exchange of UE associated information and non-UE associated information. The E1AP services may be non UE-associated services that are related to the entire E1 interface instance between the gNB-CU-CP and gNB-CU-UP using anon UE-associated signalling connection and UE-associated services that are related to a single UE and are associated with a UE-associated signalling connection that is maintained for the UE.

The F1 interface may be disposed between the CU and the DU. The CU may control the operation of the DU over the F1 interface. As the signalling in the gNB is split into control plane and user plane signalling, the F1 interface may be split into the F1-C interface for control plane signalling between the gNB-DU and the gNB-CU-CP, and the F1-U interface for user plane signalling between the gNB-DU and the gNB-CU-UP, which support control plane and user plane separation. The F1 interface may separate the Radio Network and Transport Network Layers and enable exchange of UE associated information and non-UE associated information. In addition, an F2 interface may be between the lower and upper parts of the NR PHY layer. The F2 interface may also be separated into F2-C and F2-U interfaces based on control plane and user plane functionalities.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as E2 nodes, base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission-reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signalling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a core network (CN) 120. The NG-RAN 110 can include a plurality of nodes, such as gNBs and NG-eNBs. The CN 120 (e.g., a 5G core network (5GC)) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
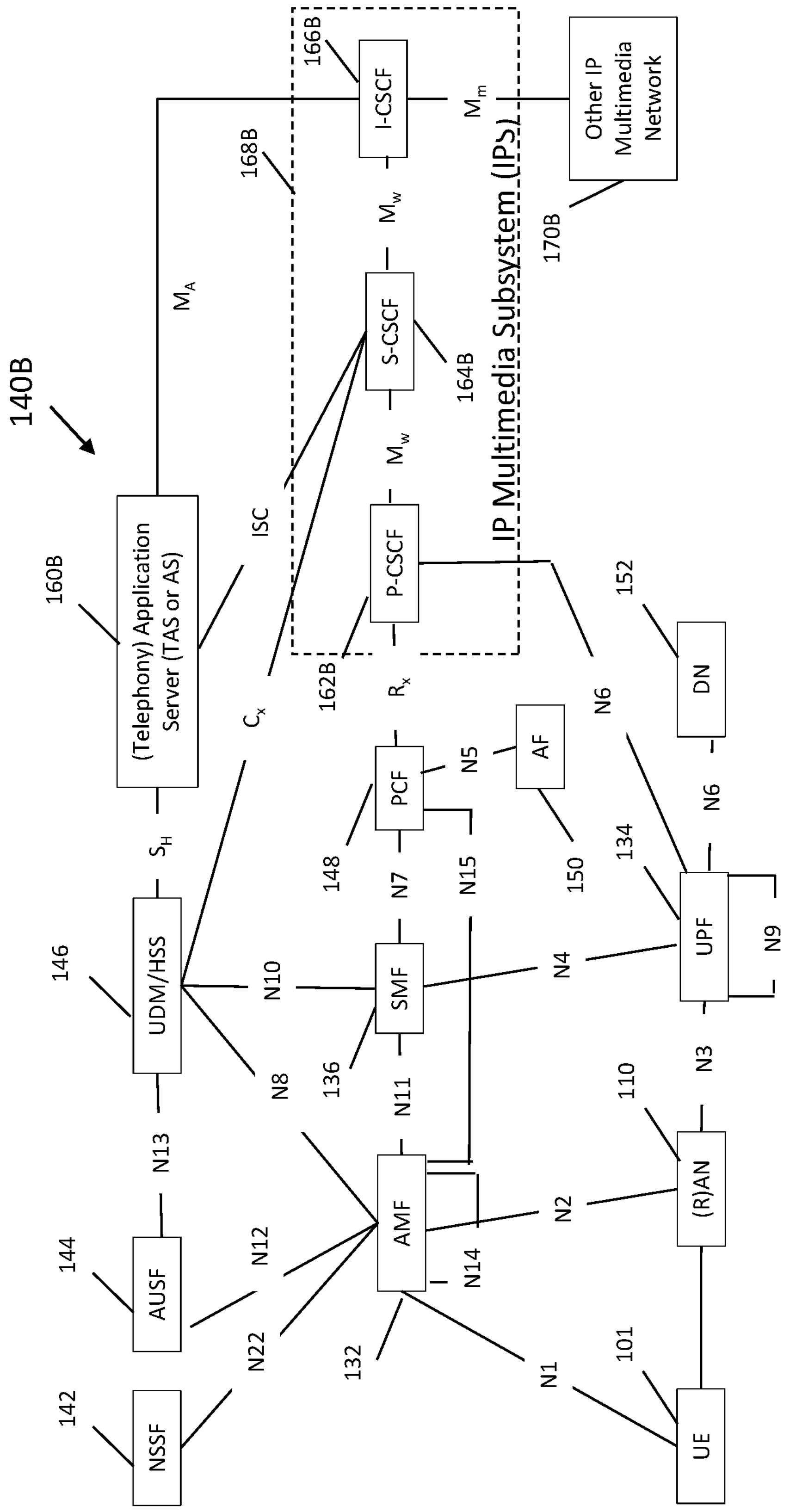
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other CN network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170B, e.g. an IMS operated by a different network operator.

In some aspects, the UDM/HSS 146 can be coupled to an application server (AS) 160B, which can include a telephony application server (TAS) or another application server. The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
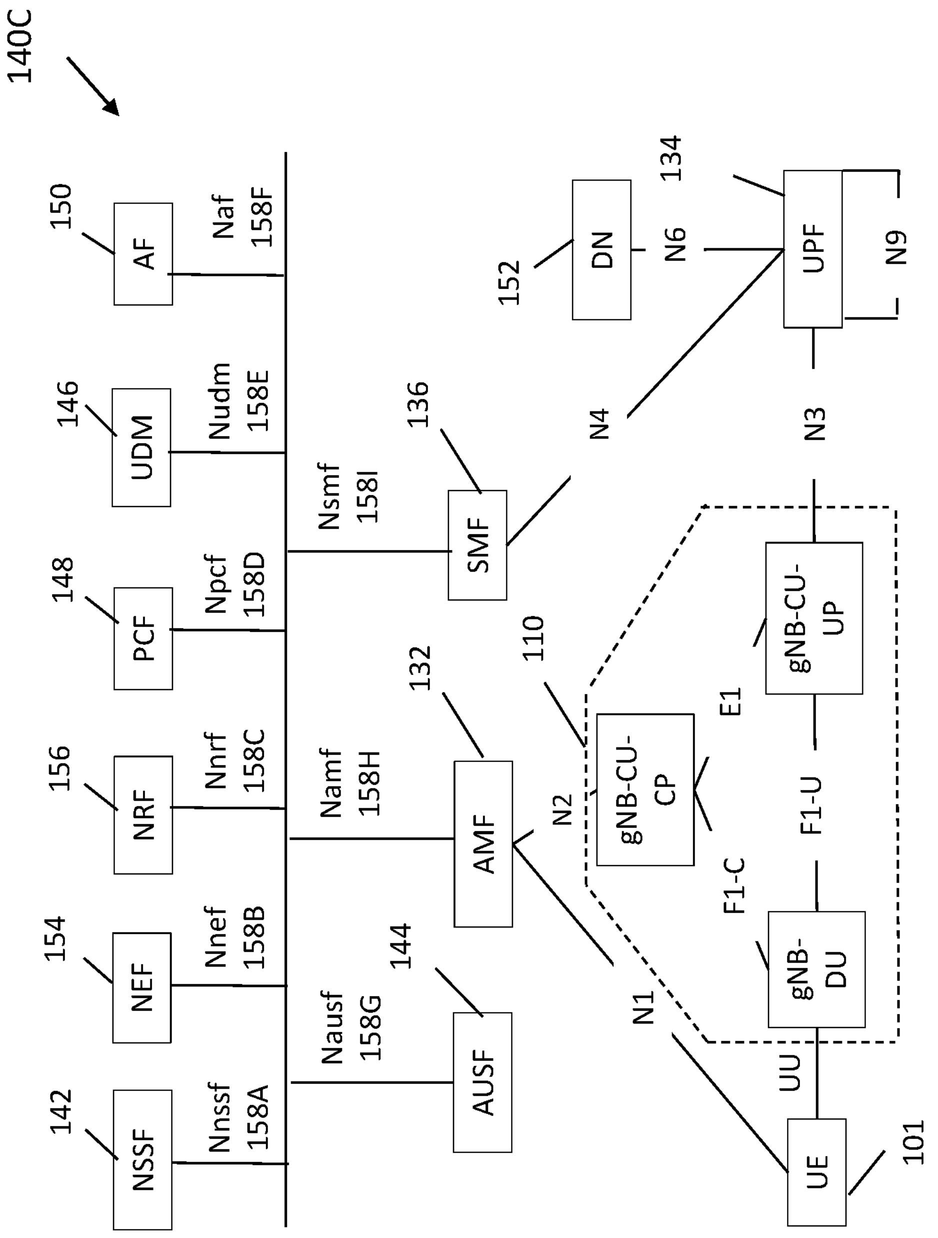
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
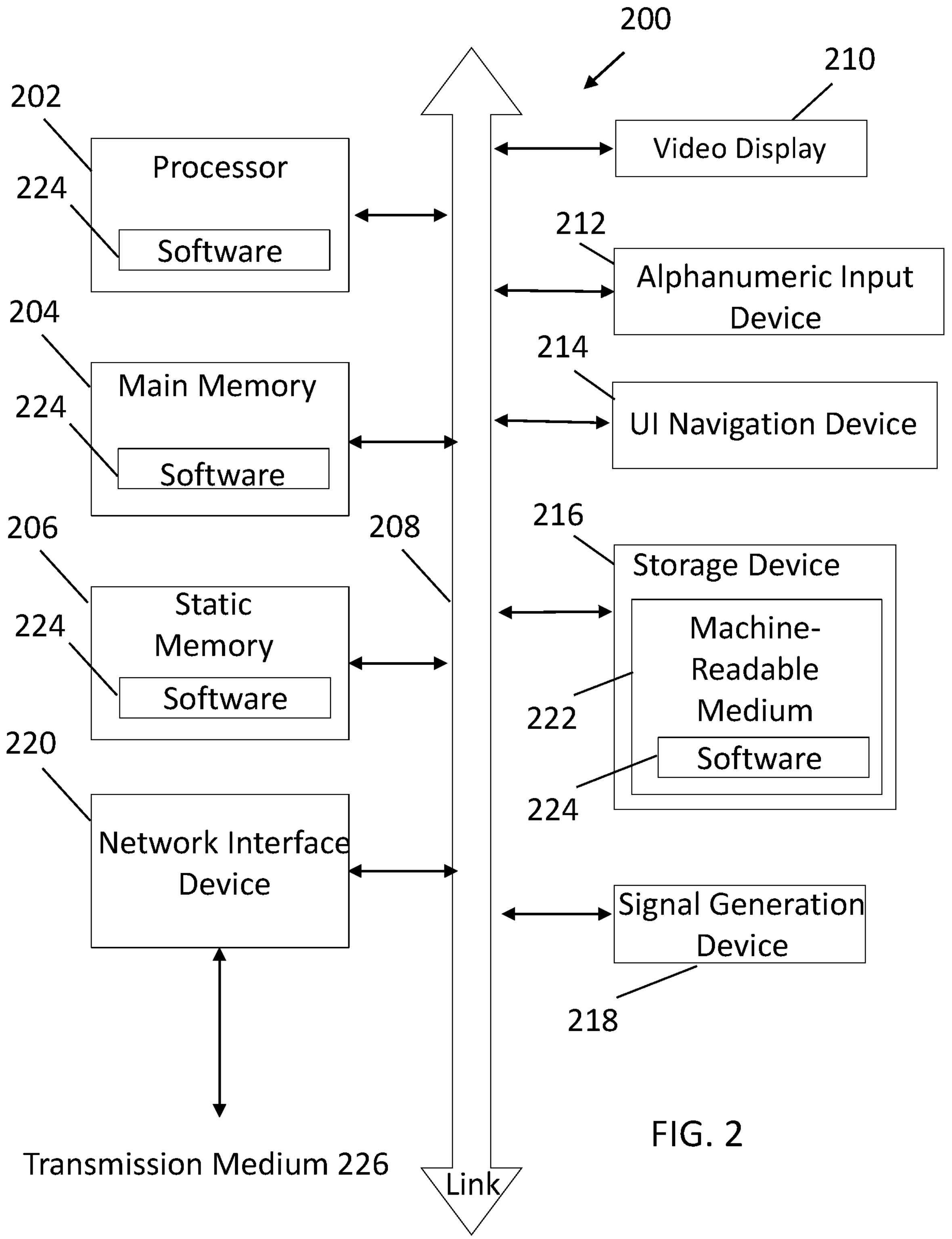
FIG. 2 illustrates a block diagram of a communication device in accordance with some embodiments.

FIG. 2 illustrates a block diagram of a communication device in accordance with some embodiments. such as an evolved Node-B (eNB), a new generation Node-B (gNB) (or another RAN node), an access point (AP), a wireless station (STA), a mobile station (MS), or user equipment (UE), in accordance with some aspects and to perform one or more of the techniques disclosed herein. In alternative aspects, the communication device 200 may operate as a standalone device or may be connected (e.g., networked) to other communication devices. The communication device may be any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.1 lay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (12V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

5G networks extend beyond the traditional mobile broadband services to provide various new services such as internet of things (IoT), industrial control, autonomous driving, mission critical communications, etc. that may have ultra-low latency, ultra-high reliability, and high data capacity requirements due to safety and performance concerns. Some of the features in this document are defined for the network side, such as APs, eNBs, NR or gNBs—note that this term is typically used in the context of 3GPP 5G and 6G communication systems, etc. Still, a UE may take this role as well and act as an AP, eNB, or gNB; that is some or all features defined for network equipment may be implemented by a UE.

Enhanced Partial Coherence for Uplink Transmission with Eight Tx

As above, in NR Rel-15/Rel-16, the precoders (TPMIs) for uplink physical uplink shared channel (PUSCH) transmissions are defined in TS 38.211, depending on the rank value (number of layers), the number of antenna ports and waveform (cyclic prefix Orthogonal Frequency Division Multiplexing (CP-OFDM) or discrete Fourier transform spread OFDM (DFT-s-OFDM)), as shown in the tables below:

Table 63.1.5-1: Preceding matrix W for single-layer transmission using two antenna ports.

TPMI TABLE 1

| TPMIs for Rank-1 with two antenna ports | | | | | | |
|---|---|---|---|---|---|---|
| TPMI index | W (ordered from left to right in increasing order of TPMI Index) | | | | | |
| 0-5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ |

Table 6.3.1.5-4: Precoding matrix W for two-layer transmission using two antenna ports with transform preceding disabled.

TPMI TABLE 2

| TPMIs for Rank-2 with two antenna ports (CP-OFDM) | | | |
|---|---|---|---|
| TPMI index | W (ordered from left to right in increasing order of TPMI index) | | |
| 0-2 | $\frac{1}{\sqrt{2}}\begin{bmatrix}1 & 0\\0 & 1\end{bmatrix}$ | $\frac{1}{2}\begin{bmatrix}1 & 1\\1 & -1\end{bmatrix}$ | $\frac{1}{2}\begin{bmatrix}1 & 1\\j & -j\end{bmatrix}$ |

Table 6.3.1.5-2: Precoding matrix W for single-layer transmission using four antenna ports with transform precoding enabled.

TPMI TABLE 3

| TPMIs for Rank-1 with four antenna ports (DFT-s-OFDM) | | | | | | | | |
|---|---|---|---|---|---|---|---|---|
| TPMI index | W (ordered from left to right in increasing order of TPMI index) | | | | | | | |
| 0-7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |

TPMI TABLE 3-continued

TPMIs for Rank-1 with four antenna ports (DFT-s-OFDM)

| TPMI index | W (ordered from left to right in increasing order of TPMI index) | | | | | | | |
|---|---|---|---|---|---|---|---|---|
| 8-15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ | — | — | — | — |

Table 6.3.1.5-3: Precoding matrix W for single-layer transmission using four antenna ports with transform precoding disabled.

TPMI TABLE 4

TPMIs for Rank-1 with four antenna ports (CP-OFDM)

| TPMI index | W (ordered from left to right in increasing order of TPMI index) | | | | | | | |
|---|---|---|---|---|---|---|---|---|
| 0-7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ | $\frac{1}{2}\begin{bmatrix}1\\j\\j\\-1\end{bmatrix}$ | $\frac{1}{2}\begin{bmatrix}1\\j\\-1\\-j\end{bmatrix}$ | $\frac{1}{2}\begin{bmatrix}-1\\j\\-j\\1\end{bmatrix}$ | $\frac{1}{2}\begin{bmatrix}1\\-1\\1\\-1\end{bmatrix}$ | $\frac{1}{2}\begin{bmatrix}1\\-1\\j\\-j\end{bmatrix}$ | $\frac{1}{2}\begin{bmatrix}1\\-1\\-1\\1\end{bmatrix}$ | $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ | $\frac{1}{2}\begin{bmatrix}1\\-j\\j\\1\end{bmatrix}$ | $\frac{1}{2}\begin{bmatrix}1\\-j\\-1\\j\end{bmatrix}$ | $\frac{1}{2}\begin{bmatrix}1\\-j\\-j\\-1\end{bmatrix}$ | — | — | — | — |

In Rel-18, 8 transmissions (Tx) are to be supported in uplink transmission. Therefore, the codebook should be enhanced to support 8 Tx. The partial coherent TPMI and partial coherent codebook subset should be enhanced considering different UE antenna architectures.

In Rel-16, full power operation is supported including full power Mode 0, full power Mode 1, and full power Mode 2. The operation of these modes is briefly summarized as below:

Mode 0: all power amplifiers (PAs) of the UE can deliver full power (i.e., 23 dBm); the power scaling factor is fixed to be 1.

Mode 1: typically, none of the PAs can deliver full power. For example, the UE has 4 PAs, and each can deliver 17 dBm; the non-antenna selection precoder is included in the non-coherent/partial coherent codebook subset, e.g., [1 1 1 1] to deliver full power; the power scaling factor is the ratio of a number of antenna ports with non-zero PUSCH transmission power over the maximum number of sounding reference signals (SRS) ports supported by the UE.

Mode 2: some PAs can deliver full power. For example, the UE has PA architecture of [23 23 20 20] dBm; the UE should report TPMI(s) to the gNB, which can enable full power transmission, for example, [1 0 0 0] and [0 1 0 0]; for the TPMIs supporting full power, the power scaling factor is fixed to 1. For other TPMIs, the power scaling factor is the ratio of a number of antenna ports with non-zero PUSCH transmission power over a number of SRS ports of the SRS resource indicated by an SRS resource indicator (SRI).

In Rel-18, with support of up to 8-Tx, for a partial coherent UE supporting full power Mode 1, following the Rel-16 power scaling factor, full power may be unable to be delivered for some partial coherent TPMIs even if the UE PA architecture can support full power transmission. Therefore, enhancement is desired for full power operation with partial coherent UE in Rel-18.

Partial Coherence for 8 Ports

Partial Coherence for UE with 4 Panels

Figure 3:
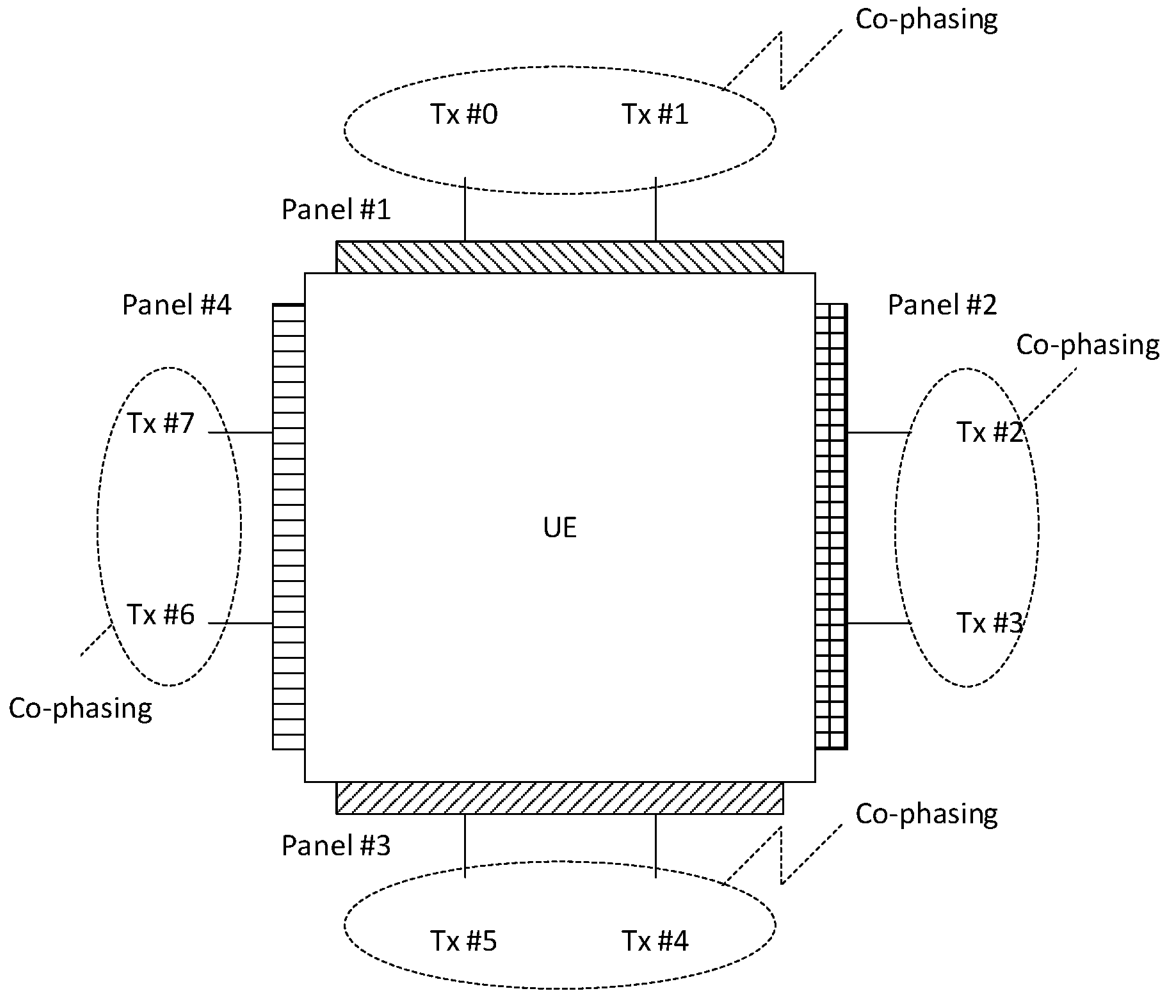
FIG. 3 illustrates a partial coherent user equipment (UE) with four panels in accordance with some embodiments.

In an embodiment, for 8-Tx UE, if the UE has 4 panels, when the UE is partial coherent, the two antenna ports from the same panel are co-phasing ports. The partial coherent TPMI should include two co-phasing ports. FIG. 3 illustrates a partial coherent UE with four panels in accordance with some embodiments.

An example of the Rank-1 partial coherent TPMI codebook containing two co-phasing ports is shown in

TABLE 1

Table 1 Example of Rank-1 partial coherent precoding matrix containing two co-phasing ports for 8 antenna ports

| Precoding Matrix |
|---|
| $\frac{1}{2\sqrt{2}}\begin{bmatrix}1\\0\\1\\0\\0\\0\\0\\0\end{bmatrix}$ |
| $\frac{1}{2\sqrt{2}}\begin{bmatrix}1\\0\\-1\\0\\0\\0\\0\\0\end{bmatrix}$ |
| $\frac{1}{2\sqrt{2}}\begin{bmatrix}1\\0\\j\\0\\0\\0\\0\\0\end{bmatrix}$ |
| $\frac{1}{2\sqrt{2}}\begin{bmatrix}1\\0\\-j\\0\\0\\0\\0\\0\end{bmatrix}$ |
| $\frac{1}{2\sqrt{2}}\begin{bmatrix}0\\1\\0\\1\\0\\0\\0\\0\end{bmatrix}$ |
| $\frac{1}{2\sqrt{2}}\begin{bmatrix}0\\1\\0\\-1\\0\\0\\0\\0\end{bmatrix}$ |
| $\frac{1}{2\sqrt{2}}\begin{bmatrix}0\\1\\0\\j\\0\\0\\0\\0\end{bmatrix}$ |
| $\frac{1}{2\sqrt{2}}\begin{bmatrix}0\\1\\0\\-j\\0\\0\\0\\0\end{bmatrix}$ |
| $\frac{1}{2\sqrt{2}}\begin{bmatrix}0\\0\\0\\0\\1\\0\\1\\0\end{bmatrix}$ |
| $\frac{1}{2\sqrt{2}}\begin{bmatrix}0\\0\\0\\0\\1\\0\\-1\\0\end{bmatrix}$ |
| $\frac{1}{2\sqrt{2}}\begin{bmatrix}0\\0\\0\\0\\1\\0\\j\\0\end{bmatrix}$ |
| $\frac{1}{2\sqrt{2}}\begin{bmatrix}0\\0\\0\\0\\1\\0\\-j\\0\end{bmatrix}$ |
| $\frac{1}{2\sqrt{2}}\begin{bmatrix}0\\0\\0\\0\\0\\1\\0\\1\end{bmatrix}$ |
| $\frac{1}{2\sqrt{2}}\begin{bmatrix}0\\0\\0\\0\\0\\1\\0\\-1\end{bmatrix}$ |
| $\frac{1}{2\sqrt{2}}\begin{bmatrix}0\\0\\0\\0\\0\\1\\0\\j\end{bmatrix}$ |
| $\frac{1}{2\sqrt{2}}\begin{bmatrix}0\\0\\0\\0\\0\\1\\0\\-j\end{bmatrix}$ |

Partial Coherence for UE with 2 Panels

Figure 4:
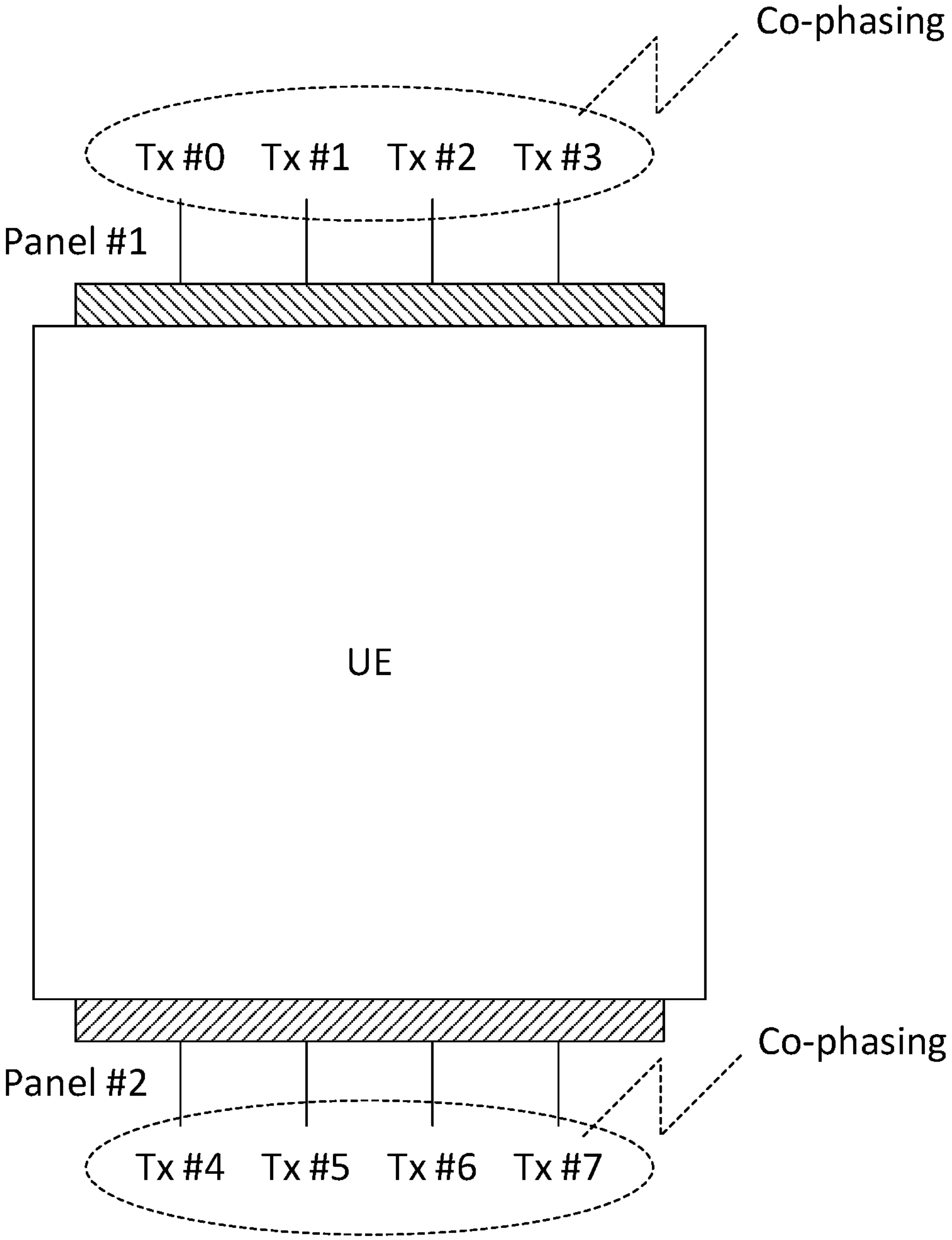
FIG. 4 illustrates a partial coherent UE with two panels in accordance with some embodiments.

In another embodiment, for 8-Tx UE, if the UE has 2 panels, when the UE is partially coherent, the four antenna ports from the same panel are co-phasing ports. The partial coherent TPMI includes four co-phasing ports. FIG. 4 illustrates a partial coherent UE with two panels in accordance with some embodiments.

An example of the Rank-1 partial coherent TPMI codebook containing four co-phasing ports is shown in Table 2.

TABLE 2

An Example of Rank-1 partial coherent precoding matrix containing four co-phasing ports for 8 antenna ports

| Precoding Matrix | | | | | |
|---|---|---|---|---|---|
| $\frac{1}{2\sqrt{2}}\begin{bmatrix}1\\1\\1\\1\\0\\0\\0\\0\end{bmatrix}$ | $\frac{1}{2\sqrt{2}}\begin{bmatrix}1\\1\\j\\j\\0\\0\\0\\0\end{bmatrix}$ | $\frac{1}{2\sqrt{2}}\begin{bmatrix}1\\1\\-1\\-1\\0\\0\\0\\0\end{bmatrix}$ | $\frac{1}{2\sqrt{2}}\begin{bmatrix}1\\1\\-j\\-j\\0\\0\\0\\0\end{bmatrix}$ | $\frac{1}{2\sqrt{2}}\begin{bmatrix}1\\j\\1\\j\\0\\0\\0\\0\end{bmatrix}$ | $\frac{1}{2\sqrt{2}}\begin{bmatrix}1\\j\\j\\-1\\0\\0\\0\\0\end{bmatrix}$ |
| $\frac{1}{2\sqrt{2}}\begin{bmatrix}1\\j\\-1\\-j\\0\\0\\0\\0\end{bmatrix}$ | $\frac{1}{2\sqrt{2}}\begin{bmatrix}1\\j\\-j\\1\\0\\0\\0\\0\end{bmatrix}$ | $\frac{1}{2\sqrt{2}}\begin{bmatrix}0\\0\\0\\0\\1\\1\\1\\1\end{bmatrix}$ | $\frac{1}{2\sqrt{2}}\begin{bmatrix}0\\0\\0\\0\\1\\1\\j\\j\end{bmatrix}$ | $\frac{1}{2\sqrt{2}}\begin{bmatrix}0\\0\\0\\0\\1\\1\\-1\\-1\end{bmatrix}$ | $\frac{1}{2\sqrt{2}}\begin{bmatrix}0\\0\\0\\0\\1\\1\\-j\\-j\end{bmatrix}$ |
| $\frac{1}{2\sqrt{2}}\begin{bmatrix}0\\0\\0\\0\\1\\j\\1\\j\end{bmatrix}$ | $\frac{1}{2\sqrt{2}}\begin{bmatrix}0\\0\\0\\0\\1\\j\\j\\-1\end{bmatrix}$ | $\frac{1}{2\sqrt{2}}\begin{bmatrix}0\\0\\0\\0\\1\\j\\-1\\-j\end{bmatrix}$ | $\frac{1}{2\sqrt{2}}\begin{bmatrix}0\\0\\0\\0\\1\\j\\-j\\1\end{bmatrix}$ | | |

Partial Coherence Codebook Subset Configuration

In an embodiment, a partial coherent UE reports capability, including whether the UE supports 2 co-phasing ports in a partial coherent TPMI, or the UE supports 4 co-phasing ports in a partial coherent TPMI (i.e., whether the UE supports 4 panels or supports 2 panels).

In an embodiment, for a partial coherent UE, when the gNB configures partial coherent codebook subset, the partial codebook subsets include partial coherent TPMIs depending on the UE capability. If the UE supports 2 co-phasing ports in a partial coherent TPMI, then partial coherent TPMIs with two co-phasing ports can be configured to the UE in the partial coherent codebook subset. If the UE supports four co-phasing ports in partial coherent TPMI, then partial coherent TPMIs with four co-phasing ports can be configured to the UE in the partial coherent codebook subset.

In another example, if the UE supports four co-phasing ports in partial coherent TPMI, then partial coherent TPMIs with four co-phasing ports and partial coherent TPMIs with two co-phasing ports can be configured to the UE in the partial coherent codebook subset. If the UE supports two co-phasing ports in partial coherent TPMI, then partial coherent TPMIs with two co-phasing ports can be configured to the UE in the partial coherent codebook subset and partial coherent TPMIs with four co-phasing TPMIs are unable to be configured to the UE in the partial coherent codebook subset.

In another embodiment, for a full coherent UE, all the partial coherent TPMIs containing two co-phasing ports and all the partial coherent TPMIs containing four co-phasing ports can be configured to the UE in the full coherent codebook subset.

Full Power Operation for Partial Coherent UE

Figure 5:
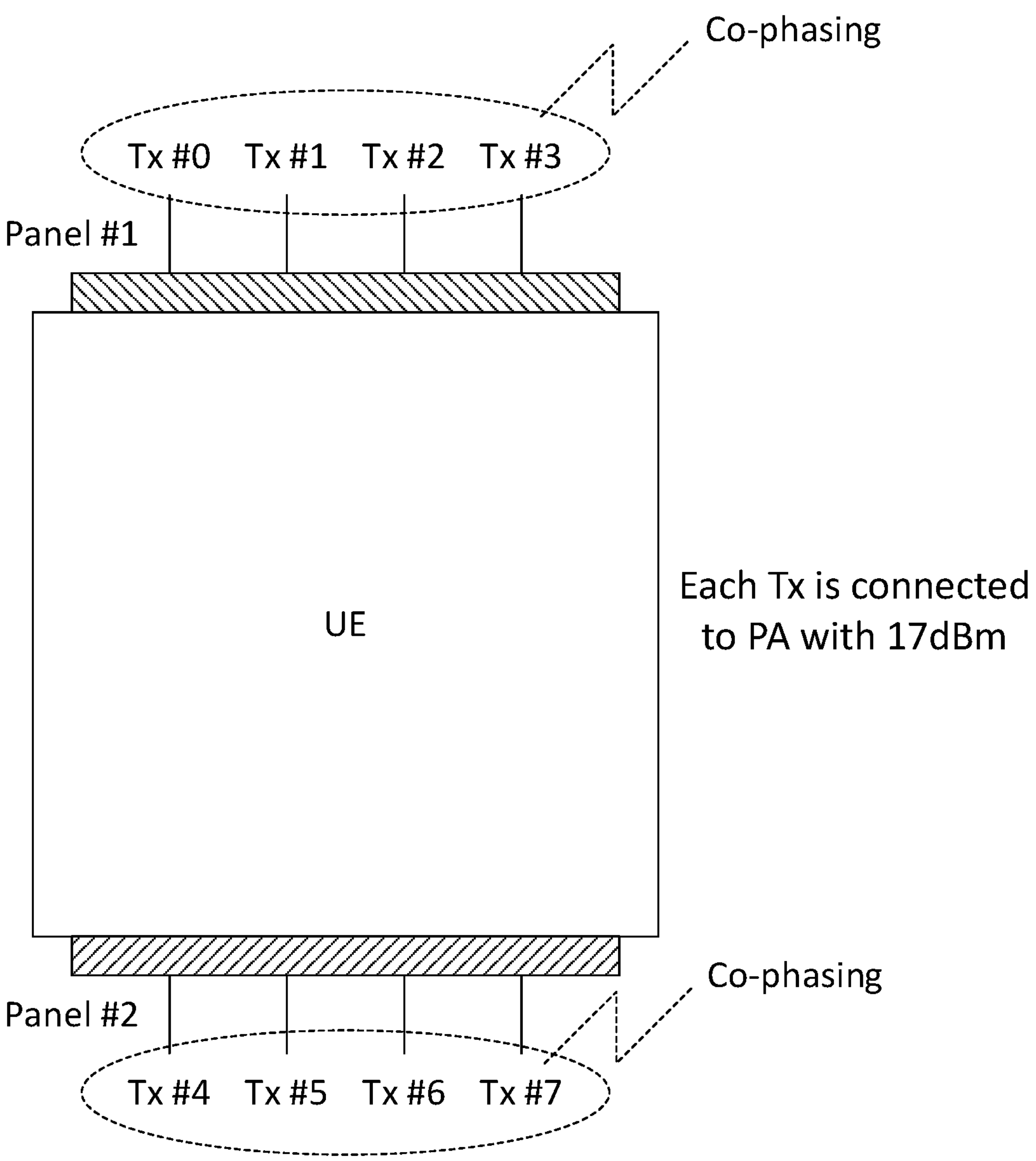
FIG. 5 illustrates a partial coherent UE with a power amplifier (PA) of 17 dBm in accordance with some embodiments.

In an embodiment, for a partial coherent UE supporting full power Mode 1, the UE reports whether the UE can support full power delivery for the partial coherent TPMIs with 2-port co-phasing or 4-port co-phasing. If the UE can support full power for partial coherent TPMIs, the power scaling factor for the corresponding partial coherent TPMIs is set to be 1. Alternatively, the UE reports the partial TPMIs that can deliver full power. FIG. 5 illustrates a partial coherent UE with a PA of 17 dBm in accordance with some embodiments.

As shown in FIG. 5, the partial coherent UE has 8 PAs, and each PA can deliver 17 dBm. For partial coherent TPMI, e.g., [1 1 1 1 0 0 0 0], the UE can deliver a full power of 23 dBm, therefore the power scaling factor for partial coherent TPMI is set to 1.

In another embodiment, the UE may report the supported power scaling factor (1, ½, ¼, etc.) for corresponding TPMIs. The reported power scaling factor may be used for the corresponding TPMIs when performing power control.

Furthermore, the partial TPMIs may be further split into groups (for example, one group for TPMIs with two-port co-phasing, and one group from TPMIs with four-port co-phasing), and the UE reports the power scaling factor for different groups.

For the UE antenna structure as shown in Error! Reference source not found, for the partial coherent TPMIs with 4-port co-phasing, e.g., [1 1 1 1 0 0 0 0], the UE reports a power scaling factor of 1 (full power can be delivered, i.e., 23 dBm). For the partial coherent TPMIs with 2-port co-phasing, e.g., [1 0 1 0 0 0 0 0], the UE reports a power scaling factor of ½ (the max output power is 20 dBm).

As above, up to 4 layers can be supported for PUSCH in the NR Rel-15/Rel-16/Rel-17 specification. TPMIs in addition to those provided in the TPMI Tables above are shown in the TPMI tables below:

Table 6.3.1.5-5: Precoding matrix W for two-layer transmission using four antenna ports with transform precoding disabled.

TPMI TABLE 5

TPMIs for Rank-2 with four antenna ports (CP-OFDM)

| TPMI index | W (ordered from left to right in increasing order of TPMI index) | | | |
|---|---|---|---|---|
| 0-3 | $\frac{1}{2}\begin{bmatrix} 1 & 0 \\ 0 & 1 \\ 0 & 0 \\ 0 & 0 \end{bmatrix}$ | $\frac{1}{2}\begin{bmatrix} 1 & 0 \\ 0 & 0 \\ 0 & 1 \\ 0 & 0 \end{bmatrix}$ | $\frac{1}{2}\begin{bmatrix} 1 & 0 \\ 0 & 0 \\ 0 & 0 \\ 0 & 1 \end{bmatrix}$ | $\frac{1}{2}\begin{bmatrix} 0 & 0 \\ 1 & 0 \\ 0 & 1 \\ 0 & 0 \end{bmatrix}$ |
| 4-7 | $\frac{1}{2}\begin{bmatrix} 0 & 0 \\ 1 & 0 \\ 0 & 0 \\ 0 & 1 \end{bmatrix}$ | $\frac{1}{2}\begin{bmatrix} 0 & 0 \\ 0 & 0 \\ 1 & 0 \\ 0 & 1 \end{bmatrix}$ | $\frac{1}{2}\begin{bmatrix} 1 & 0 \\ 0 & 1 \\ 1 & 0 \\ 0 & -j \end{bmatrix}$ | $\frac{1}{2}\begin{bmatrix} 1 & 0 \\ 0 & 1 \\ 1 & 0 \\ 0 & j \end{bmatrix}$ |
| 8-11 | $\frac{1}{2}\begin{bmatrix} 1 & 0 \\ 0 & 1 \\ -j & 0 \\ 0 & 1 \end{bmatrix}$ | $\frac{1}{2}\begin{bmatrix} 1 & 0 \\ 0 & 1 \\ -j & 0 \\ 0 & -1 \end{bmatrix}$ | $\frac{1}{2}\begin{bmatrix} 1 & 0 \\ 0 & 1 \\ -1 & 0 \\ 0 & -j \end{bmatrix}$ | $\frac{1}{2}\begin{bmatrix} 1 & 0 \\ 0 & 1 \\ -1 & 0 \\ 0 & j \end{bmatrix}$ |
| 12-15 | $\frac{1}{2}\begin{bmatrix} 1 & 0 \\ 0 & 1 \\ j & 0 \\ 0 & 1 \end{bmatrix}$ | $\frac{1}{2}\begin{bmatrix} 1 & 0 \\ 0 & 1 \\ j & 0 \\ 0 & -1 \end{bmatrix}$ | $\frac{1}{2\sqrt{2}}\begin{bmatrix} 1 & 1 \\ 1 & 1 \\ 1 & -1 \\ 1 & -1 \end{bmatrix}$ | $\frac{1}{2\sqrt{2}}\begin{bmatrix} 1 & 1 \\ 1 & 1 \\ j & -j \\ j & -j \end{bmatrix}$ |
| 16-19 | $\frac{1}{2\sqrt{2}}\begin{bmatrix} 1 & 1 \\ j & j \\ 1 & -1 \\ j & -j \end{bmatrix}$ | $\frac{1}{2\sqrt{2}}\begin{bmatrix} 1 & 1 \\ j & j \\ j & -j \\ -1 & 1 \end{bmatrix}$ | $\frac{1}{2\sqrt{2}}\begin{bmatrix} 1 & 1 \\ -1 & -1 \\ 1 & -1 \\ -1 & 1 \end{bmatrix}$ | $\frac{1}{2\sqrt{2}}\begin{bmatrix} 1 & 1 \\ -1 & -1 \\ j & -j \\ -j & j \end{bmatrix}$ |
| 20-21 | $\frac{1}{2\sqrt{2}}\begin{bmatrix} 1 & 1 \\ -j & -j \\ 1 & -1 \\ -j & -j \end{bmatrix}$ | $\frac{1}{2\sqrt{2}}\begin{bmatrix} 1 & 1 \\ -j & -j \\ j & -j \\ 1 & -1 \end{bmatrix}$ | — | — |

Table 6.3.1.5-6: Precoding matrix W for three-layer transmission using four antenna ports with transform precoding disabled.

TPMI TABLE 6

TPMIs for Rank-3 with four antenna ports (CP-OFDM)

| TPMI index | W (ordered from left to right in increasing order of TPMI index) | | | |
|---|---|---|---|---|
| 0-3 | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4-6 | $\frac{1}{2\sqrt{3}}\begin{bmatrix} 1 & 1 & 1 \\ 1 & -1 & 1 \\ j & j & -j \\ j & -j & -j \end{bmatrix}$ | $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ | $\frac{1}{2\sqrt{3}}\begin{bmatrix} 1 & 1 & 1 \\ -1 & 1 & -1 \\ j & j & -j \\ -j & j & j \end{bmatrix}$ | |

Table 6.3.1.5-7: Precoding matrix W for four-layer transmission using four antenna ports with transform precoding disabled

TPMI TABLE 7

| TPMIs for Rank-4 with four antenna ports (CP-OFDM) | | | | |
|---|---|---|---|---|
| TPMI index | W (ordered from left to right in increasing order of TPMI index) | | | |
| 0-3 | $\frac{1}{2}\begin{bmatrix}1&0&0&0\\0&1&0&0\\0&0&1&0\\0&0&0&1\end{bmatrix}$ | $\frac{1}{2\sqrt{2}}\begin{bmatrix}1&1&0&0\\0&0&1&1\\1&-1&0&0\\0&0&1&-1\end{bmatrix}$ | $\frac{1}{2\sqrt{2}}\begin{bmatrix}1&1&0&0\\0&0&1&1\\j&-j&0&0\\0&0&j&-j\end{bmatrix}$ | $\frac{1}{4}\begin{bmatrix}1&1&1&1\\1&-1&1&-1\\1&1&-1&-1\\1&-1&-1&1\end{bmatrix}$ |
| 4 | $\frac{1}{4}\begin{bmatrix}1&1&1&1\\1&-1&1&-1\\J&J&-J&-J\\J&-J&-J&J\end{bmatrix}$ | — | — | — |

The TPMIs may be categorized into full coherent TPMI, partial coherent TPMI, and non-coherent TPMI, depending on whether relative phase can be maintained among all (full coherent), or a subset (partial coherent), or none (non-coherent) of the antenna ports.

Table 3 shows the non-coherent, partial coherent and full coherent TPMIs for 2-ports and 4-ports.

TABLE 3

| Non-coherent, partial coherent and full coherent TPMIs for 2-ports and 4-ports | | |
|---|---|---|
| 2-port | Non-coherent TPMIs | Rank-1: TPMI {0, 1} as shown in TPMI Table 1<br>Rank-2: TPMI {0} as shown in TPMI Table 2 |
| | Full-coherent TPMIs | Rank-1: TPMI {2~5} as shown in TPMI Table 1<br>Rank-2: TPMI {1, 2} as shown in TPMI Table 2 |
| 4-port | Non-coherent TPMIs | Rank-1: TPMI {0~3} as shown in TPMI Table 3 and TPMI Table 4<br>Rank-2: TPMI {0~5} as shown in TPMI Table 5<br>Rank-3: TPMI {0} as shown in TPMI Table 6<br>Rank-4: TPMI {0} as shown in TPMI Table 7 |
| | Partial-coherent TPMIs | Rank-1: TPMI {4~11} as shown in TPMI Table 3 and TPMI Table 4<br>Rank-2: TPMI {6~13} as shown in TPMI Table 5<br>Rank-3: TPMI {1, 2} as shown in TPMI Table 6<br>Rank-4: TPMI {0~3} as shown in TPMI Table 7 |
| | Full-coherent TPMIs | Rank-1: TPMI {12~27} as shown in TPMI Table 3 and TPMI Table 4<br>Rank-2: TPMI {14~21} as shown in TPMI Table 5<br>Rank-3: TPMI {1, 2} as shown in TPMI Table 6<br>Rank-4: TPMI {3, 4} as shown in TPMI Table 7<br>Rank-4: TPMI {0~3} as shown in Error! Reference source not found. |
| | Full-coherent TPMIs | Rank-1: TPMI {12~27} as shown in Error! Reference source not found. and Error! Reference source not found.<br>Rank-2: TPMI {14~21} as shown in Error! Reference source not found.<br>Rank-3: TPMI {1, 2} as shown in Error! Reference source not found.<br>Rank-4: TPMI {3, 4} as shown in Error! Reference source not found. |

In order to improve uplink spectral efficiency, more than 4 layers (e.g., up to 8) uplink transmission are to be supported in NR Rel-18.

In a current DCI scheduling PUSCH (e.g., DCI format 0_1/0_2), TPMI may be indicated via the "Precoding information and number of layers" field, and the TPMI may be 4-port or 2-port. In Rel-17, for multi-TRP operation, two TPMIs may be indicated via two "Precoding information and number of layers" fields. The UE may be configured with two SRS resource sets and two SRI fields are included in the DCI. The association between SRI/TPMI and the SRS resource set is further delivered by the field of SRS Resource Set Indication.

In Rel-18, in order to support PUSCH transmission with 8-ports, the DCI may be enhanced to indicate the UE with 8-port precoder.

Section A: DCI Enhancement for PUSCH Transmission with 8 Ports

In an embodiment, in the DCI format scheduling PUSCH (e.g., DCI format 0_1/0_2), one TPMI is indicated via the field of "Precoding information and number of layers", wherein the TPMI is 8-port TPMI. Correspondingly, the field of "Precoding information and number of layers" should be extended to more bits to support 8-port TPMI.

In another embodiment, in the DCI scheduling PUSCH (e.g., DCI format 0_1/0_2), two 4-ports TPMIs can be indicated (the 4-port TPMI are as shown in TPMI Tables 3-7). Two fields of "Precoding information and number of layers" are included in the DCI, and each field indicates one 4-port TPMI.

The concept of port group may be introduced for uplink transmission. For UEs with 8 Tx, the PUSCH ports may be split into multiple groups (N groups, each group has M ports, and N*M=8), e.g., two groups. The first port group corresponds to port #0 to port #3, and the second port group corresponds to port #4 to port #7.

When two 4-port TPMIs are indicated in the DCI, the first 4-port TPMI is applied for the first PUSCH port group (port #0 to port #3), and the second 4-port TPMI is applied for the second PUSCH port group (port #4 to port #7).

The 8-port precoding matrix $W_{8Tx,R(X)}$ (size of 8×X) with Rank X (X∈{1, 2, 3, 4 . . . 8}) may be generated according to Equation (1). $W_{1,4Tx,R(X1)}$ (size of 4×X1) and $W_{2,4Tx,R(X2)}$ (size of 4×X2) are 4-port precoding matrix with Rank X1 and X2, respectively. The value for $W_{1,4Tx,R(X1)}$ and $W_{2,4Tx,R(X2)}$ are as shown in TPMI Tables 3-7. $V_1$ and $V_2$ are matrix with size of 2×1.

$$W_{8Tx,R(X)} = [\, V_1 \otimes W_{1,4Tx,R(X1)} \quad V_2 \otimes W_{2,4Tx,R(X2)} \,] \tag{1}$$

where ⊗ means Kronecker product operation.

After the precoder is constructed according to Equation (1), the column with all zeros may be removed.

The candidate values for $V_1$ and $V_2$ include the 2-port precoders with Rank-1 plus $[0\ 0]^T$), as shown as in Table 44.

TABLE 4

| Candidates values for $V_1$ and $V_2$ | | | | | | |
|---|---|---|---|---|---|---|
| $\begin{bmatrix}0\\0\end{bmatrix}$ | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ |

In Equation (1), if either $V_1$ or $V_2$ is all zeros ($[0\ 0]^T$), then X=X2 or X=X1. Otherwise, X=X1+X2. X1 and X2 are non-zero positive integers, and X1≤4, X2≤4.

In the DCI scheduling PUSCH (e.g., DCI format 0_1/0_2), two 4-port TPMIs ($W_{1,4Tx,R(X1)}$ and $W_{2,4Tx,R(X2)}$) are indicated. In addition, the value for $V_1$ and $V_2$ may also be indicated by the DCI via new DCI field(s) or reuse/re-purpose some existing field(s). Alternatively, the indication of $V_1$ and $V_2$ may be achieved by joint encoding with other field(s) (for example, the SRS Resource Set Indication field). After receiving the DCI, the UE may construct the 8-port precoding matrix $W_{8Tx,R(X)}$ according to Equation (1).

Figure 6:
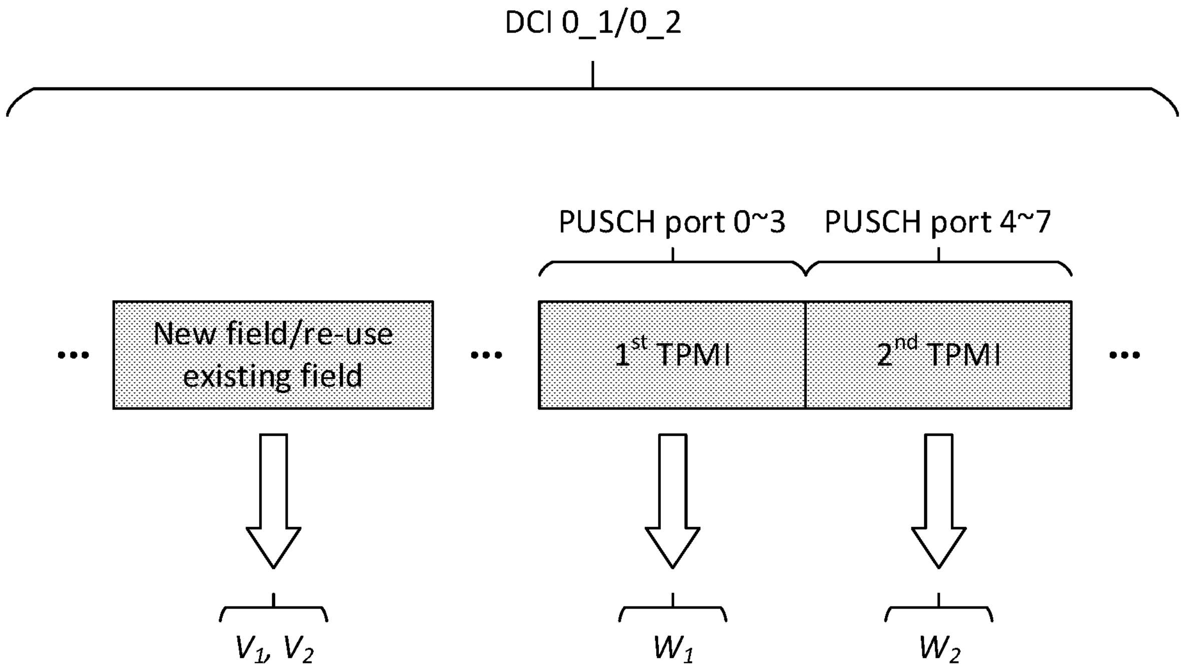
FIG. 6 illustrates downlink control information (DCI) in accordance with some embodiments.

FIG. 6 illustrates DCI in accordance with some embodiments. In the DCI of FIG. 6, two 4-port TPMIs are indicated. The 1st indicated 4-port TPMI is $W_1$, corresponding to $W_{1,4Tx,R(X1)}$ in Equation (1). The 2nd indicated 4-port TPMI is $W_2$, corresponding to $W_{2,4Tx,R(X2)}$ in Equation (1). A new field(s) or an existing DCI field(s) may be used to indicate $V_1$ and $V_2$. The values of $V_1$ and $V_2$ are as shown in Table 4. The DCI in FIG. 6 indicates $W_1$ and $W_2$, $V_1$ and $V_2$.

In one example, the value of $V_1$ and $V_2$ may be restricted. For example, the value combinations of $V_1$ and $V_2$ may be as shown in Table. In this case, the new field of three bits may be added to the DCI or an existing field(s) may be re-used.

According to Table 5, when generating non-coherent TPMIs, the first three values (the first three combinations of $V_1$ and $V_2$) may be used. When generating full coherent TPMIs, the last value (the last combination of $V_1$ and $V_2$) may be used. When generating partial coherent TPMIs, all the values (all the combinations of $V_1$ and $V_2$) may be used.

In another example, if the UE is non-coherent, then only the first three values in Table 5 (the first three combinations of $V_1$ and $V_2$) are used, and consequently the field length is 2 bits.

TABLE 5

List on values of $V_1$ and $V_2$

| Field value | $V_1$ | $V_2$ |
|---|---|---|
| '000' | $\frac{1}{\sqrt{2}}\begin{bmatrix}1\\0\end{bmatrix}$ | $\begin{bmatrix}0\\0\end{bmatrix}$ |
| '001' | $\frac{1}{\sqrt{2}}\begin{bmatrix}1\\0\end{bmatrix}$ | $\frac{1}{\sqrt{2}}\begin{bmatrix}0\\1\end{bmatrix}$ |
| '010' | $\begin{bmatrix}0\\0\end{bmatrix}$ | $\frac{1}{\sqrt{2}}\begin{bmatrix}0\\1\end{bmatrix}$ |
| '011' | $\begin{bmatrix}0\\0\end{bmatrix}$ | $\frac{1}{\sqrt{2}}\begin{bmatrix}1\\1\end{bmatrix}\left(\text{or } \frac{1}{\sqrt{2}}\begin{bmatrix}1\\-1\end{bmatrix}\right)$ |
| '100' | $\frac{1}{\sqrt{2}}\begin{bmatrix}1\\1\end{bmatrix}$ | $\begin{bmatrix}0\\0\end{bmatrix}$ |

TABLE 5-continued

| List on values of $V_1$ and $V_2$ | | |
|---|---|---|
| Field value | $V_1$ | $V_2$ |
| '101' | $\frac{1}{\sqrt{2}}\begin{bmatrix}1\\1\end{bmatrix}$ | $\frac{1}{\sqrt{2}}\begin{bmatrix}1\\1\end{bmatrix}\left(\text{or } \frac{1}{\sqrt{2}}\begin{bmatrix}1\\-1\end{bmatrix}\right)$ |
| Reserved | | |

Furthermore, in order to reduce the overhead, the combinations of $V_1$ and $V_2$ may be further reduced. One example is shown in Table, where 4 combinations of $V_1$ and $V_2$ are listed. In such case, the new field of two bits may be added to the DCI or existing field(s) may be re-used.

According to Table, when generating non-coherent TPMIs, the first two values (the first two combinations of $V_1$ and $V_2$) may be used. When generating full coherent TPMIs, the last value (the last combination of $V_1$ and $V_2$) may be used. When generating partial coherent TPMIs, all the values (all the combinations of $V_1$ and $V_2$) may be used.

In another example, if the UE is non-coherent, then only the first two values (the first two combinations of $V_1$ and $V_2$) are used, and consequently the field length is 1 bit.

TABLE 6

| Reduced combinations of $V_1$ and $V_2$ | | |
|---|---|---|
| Field value | $V_1$ | $V_2$ |
| '00' | $\frac{1}{\sqrt{2}}\begin{bmatrix}1\\0\end{bmatrix}$ | $\begin{bmatrix}0\\0\end{bmatrix}$ |
| '01' | $\frac{1}{\sqrt{2}}\begin{bmatrix}1\\0\end{bmatrix}$ | $\frac{1}{\sqrt{2}}\begin{bmatrix}0\\1\end{bmatrix}$ |
| '10' | $\frac{1}{\sqrt{2}}\begin{bmatrix}1\\1\end{bmatrix}$ | $\begin{bmatrix}0\\0\end{bmatrix}$ |
| '11' | $\frac{1}{\sqrt{2}}\begin{bmatrix}1\\1\end{bmatrix}$ | $\frac{1}{\sqrt{2}}\begin{bmatrix}1\\1\end{bmatrix}\left(\text{or } \frac{1}{\sqrt{2}}\begin{bmatrix}1\\-1\end{bmatrix}\right)$ |

In this embodiment, the UE may be configured with one SRS resource set (the SRS resource in the SRS resource set may support up to 8 ports) with usage of 'codebook' and one SRI field is indicated in the DCI.

Alternatively, the UE may be configured with two SRS resource sets (the SRS resource in the SRS resource set could support up to 4 ports) with usage of 'codebook' and two SRI fields are indicated in the DCI. The association between SRI/SRS resource set and the PUSCH port group/TPMI field may be implicit or explicit. For example, with implicit association, the first SRI field/SRS resource set corresponds to the first PUSCH port group (port #0 to port #3)/the first TPMI, and the second SRI field/SRS resource set corresponds to the second PUSCH port group (port #0 to port #3)/the second TPMI. With explicit association, a new field may be added or the existing field (e.g., the field of SRS Resource Set Indication) may be re-used.

In an example, when two SRS resource sets are configured, then the field to indicate the value for $V_1$ and $V_2$ may be jointly encoded with the field of SRS Resource Set Indication. Assuming the candidate values for $V_1$ and $V_2$ are as shown in Table, then the joint encoding the field of indicating $V_1$ and $V_2$ and the SRS Resource Set Indication field is as shown in Table. In this case, the field to indicate $V_1$ and $V_2$ is just one bit. For example, if the value of SRS Resource Set Indication is '00', then value of 0 for the field indication $V_1$ and $V_2$ means $$V_1 \text{ of } \frac{1}{\sqrt{2}}\begin{bmatrix}1\\0\end{bmatrix} \text{ and } V_2\begin{bmatrix}0\\0\end{bmatrix};$$

and the value oft for the field indication $V_1$ and $V_2$ means $$V_1 \text{ of } \frac{1}{\sqrt{2}}\begin{bmatrix}1\\0\end{bmatrix} \text{ and } V_2\begin{bmatrix}0\\0\end{bmatrix};$$

and so on.

TABLE 7

| Joint encoding between the field indicating $V_1$ and $V_2$ and the field of SRS Resource Set Indication | | | | |
|---|---|---|---|---|
| Value of SRS Resource Set Indication | SRS Resource Set Indication | Value of the field indicating $V_1$ and $V_2$ | $V_1$ | $V_2$ |
| '00' | 1st SRI and 1st TPMI are associated with 1st SRS resource set/1st PUSCH port group (port #0~port #3) | 0 | $\frac{1}{\sqrt{2}}\begin{bmatrix}1\\0\end{bmatrix}$ | $\begin{bmatrix}0\\0\end{bmatrix}$ |
| | 2nd SRI and 2nd TPMI are reserved | 1 | $\frac{1}{\sqrt{2}}\begin{bmatrix}1\\1\end{bmatrix}$ | $\begin{bmatrix}0\\0\end{bmatrix}$ |
| '01' | 1st SRI and 1st TPMI are reserved | 0 | $\begin{bmatrix}0\\0\end{bmatrix}$ | $\frac{1}{\sqrt{2}}\begin{bmatrix}0\\1\end{bmatrix}$ |
| | 2nd SRI and 2nd TPMI are associated with 2nd SRS resource set/2nd PUSCH port group (port #4~port #7) | 1 | $\begin{bmatrix}0\\0\end{bmatrix}$ | $\frac{1}{\sqrt{2}}\begin{bmatrix}1\\1\end{bmatrix}\left(\text{or } \frac{1}{\sqrt{2}}\begin{bmatrix}1\\-1\end{bmatrix}\right)$ |

TABLE 7-continued

| Joint encoding between the field indicating $V_1$ and $V_2$ and the field of SRS Resource Set Indication | | | | |
|---|---|---|---|---|
| Value of SRS Resource Set Indication | SRS Resource Set Indication | Value of the field indicating $V_1$ and $V_2$ | $V_1$ | $V_2$ |
| '10' | $1^{st}$ SRI and $1^{st}$ TPMI are associated with $1^{st}$ SRS resource set/$1^{st}$ PUSCH port group (port #4~port #3) | 0 | $\frac{1}{\sqrt{2}}\begin{bmatrix}1\\0\end{bmatrix}$ | $\frac{1}{\sqrt{2}}\begin{bmatrix}0\\1\end{bmatrix}$ |
| | $2^{nd}$ SRI and $2^{nd}$ TPMI are associated with $2^{nd}$ SRS resource set/$2^{nd}$ PUSCH port group (port #4~port #7) | 1 | $\frac{1}{\sqrt{2}}\begin{bmatrix}1\\1\end{bmatrix}$ | $\frac{1}{\sqrt{2}}\begin{bmatrix}1\\1\end{bmatrix}\left(\text{or } \frac{1}{\sqrt{2}}\begin{bmatrix}1\\-1\end{bmatrix}\right)$ |
| '11' | $2^{nd}$ SRI and $2^{nd}$ TPMI are associated with $2^{nd}$ SRS resource set/$2^{nd}$ PUSCH port group (port #4~port #7) | Reserved | | |

In another example, assuming the candidate values for $V_1$ and $V_2$ are as shown in Table, then the joint encoding the field of indicating $V_1$ and $V_2$ and the SRS Resource Set Indication field is as shown in Table. In this case, the field to indicate $V_1$ and $V_2$ is just one bit.

TABLE 8

| Another joint encoding between the field indicating $V_1$ and $V_2$ and the field of SRS Resource Set Indication | | | | |
|---|---|---|---|---|
| Value of SRS Resource Set Indication | SRS Resource Set Indication | Value of the field indicating $V_1$ and $V_2$ | $V_1$ | $V_2$ |
| '00' | $1^{st}$ SRI and $1^{st}$ TPMI are associated with $1^{st}$ SRS resource set/$1^{st}$ PUSCH port group (port #0~port #3) | 0 | $\frac{1}{\sqrt{2}}\begin{bmatrix}1\\0\end{bmatrix}$ | $\begin{bmatrix}0\\0\end{bmatrix}$ |
| | $2^{nd}$ SRI and $2^{nd}$ TPMI are reserved | 1 | $\frac{1}{\sqrt{2}}\begin{bmatrix}1\\1\end{bmatrix}$ | $\begin{bmatrix}0\\0\end{bmatrix}$ |
| '01' | $1^{st}$ SRI and $1^{st}$ TPMI are reserved $2^{nd}$ SRI and $2^{nd}$ TPMI are associated with $2^{nd}$ SRS resource set/$2^{nd}$ PUSCH port group (port #4~port #7) | Reserved | | |
| '10' | $1^{st}$ SRI and $1^{st}$ TPMI are associated with $1^{st}$ SRS resource set/$1^{st}$ PUSCH port group (port #0~port #3) | 0 | $\frac{1}{\sqrt{2}}\begin{bmatrix}1\\0\end{bmatrix}$ | $\frac{1}{\sqrt{2}}\begin{bmatrix}0\\1\end{bmatrix}$ |
| | $2^{nd}$ SRI and $2^{nd}$ TPMI are associated with $2^{nd}$ SRS resource set/$2^{nd}$ PUSCH port group (port #4~port #7) | 1 | $\frac{1}{\sqrt{2}}\begin{bmatrix}1\\1\end{bmatrix}$ | $\frac{1}{\sqrt{2}}\begin{bmatrix}1\\1\end{bmatrix}\left(\text{or } \frac{1}{\sqrt{2}}\begin{bmatrix}1\\-1\end{bmatrix}\right)$ |
| '11' | $2^{nd}$ SRI and $2^{nd}$ TPMI are associated with $2^{nd}$ SRS resource set/$2^{nd}$ PUSCH port group (port #4~port #7) | Reserved | | |

In this embodiment, whether both TMPI fields or only one TPMI field are used for 8-port precoder generation may be indicated by another field (which may be a new field, or the field indicating values for $V_1$ and $V_2$ or some other existing field, e.g., the field of SRS Resource Set Indication).

In this embodiment, whether both TPMI fields are present in the DCI may be configurable. For example, if the PUSCH transmission is with 4 ports or less than 4 ports, then the second TPMI field is not present. In another example, if the maximum number of ports for SRS resources configured with usage of codebook is 4 or less than 4, then the second TPMI field is not present in DCI.

Note: this embodiment may also be applied to the case that multiple codewords (e.g., two codewords) are used for uplink transmission. In this case, the $1^{st}$ codeword corresponds to the $1^{st}$ PUSCH port group (port #0~port #3), and the $2^{nd}$ codeword corresponds to the $2^{nd}$ PUSCH port group (port #4~port #7). The $1^{st}$ TPMI is used for the $1^{st}$ codeword, and the $2^{nd}$ TPMI is used for the $2^{nd}$ codeword. $W_1$ and $V_1$ are used for the $1^{st}$ codeword, $W_2$ and $V_2$ are used for the $2^{nd}$ codeword.

In another embodiment, the concept of port group may be introduced for uplink transmission. For a UE with 8-Tx, the PUSCH ports may be split into multiple groups (N groups, each group has M ports, and N*M=8), e.g., two groups. The first port group corresponds to port #0 to port #3, and the second port group corresponds to port #4 to port #7. The 8-port precoding matrix $W_{8Tx,R(X)}$ (size of 8×X) with Rank X may be generated by different methods.

1) Method A

If the Rank value X∈{1,2,3,4,6,8}, then the 8-port precoding matrix $W_{8Tx,R(X)}$ may be generated according to Equation (2). $W_{1,2Tx,R(X1)}$ (size of 2×X1) is a 2-port precoder with Rank X1, and $W_{2,4Tx,R(X2)}$ (size of 4×X2) is a 4-port precoder with Rank X2. $W_{1,2Tx,R(X1)}$ is as shown in TPMI Tables 1 and 2. $W_{2,4Tx,R(X2)}$ is as shown in TPMI Tables 3-7.

$$W_{8Tx,R(X)} = W_{1,2Tx,R(X1)} \otimes W_{2,4Tx,R(X2)} \quad (2)$$

where ⊗ means Kronecker product operation. In Equation (2), X=X1×X2, where X1 and X2 are non-zero positive integers, and X1≤2, X2≤4.

Figure 7:
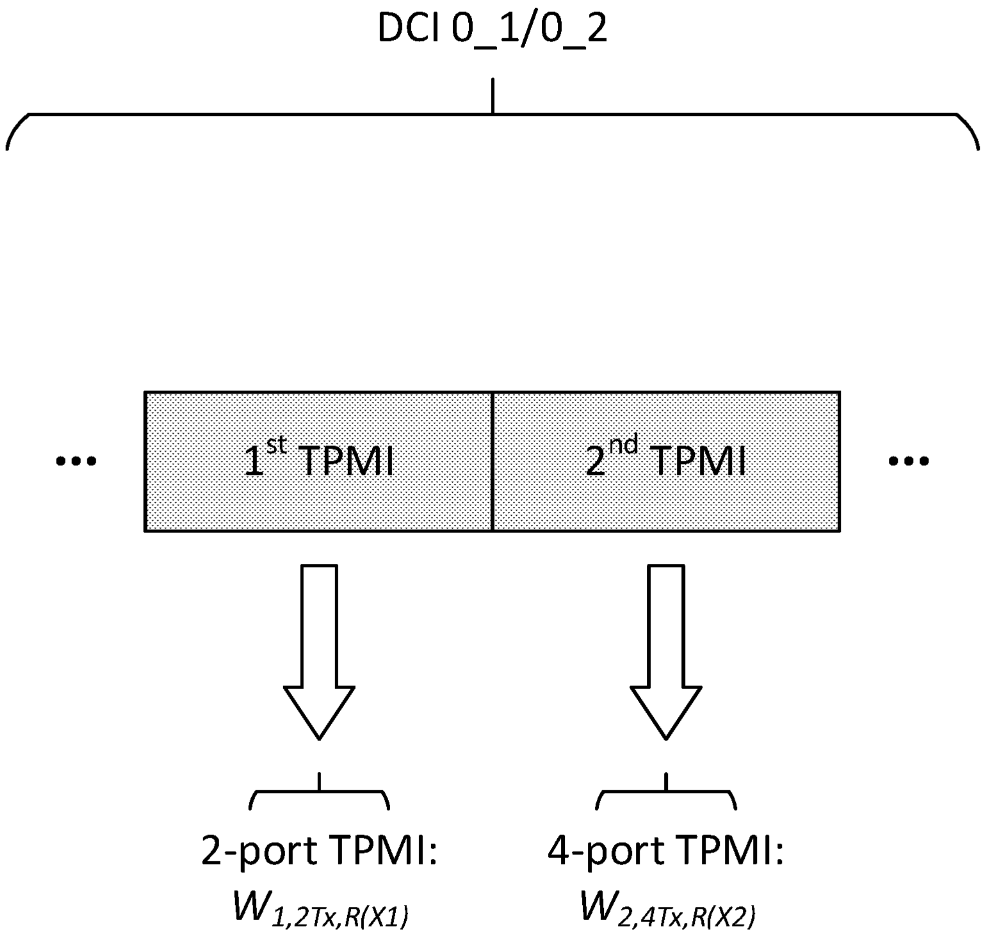
FIG. 7 illustrates Transmit Precoder Matrix Indicator (TPMI) operation in accordance with some embodiments.

If the 8-port precoder is generated according to Equation (2), then in the DCI scheduling PUSCH, two TPMIs should be indicated, one is 2-port TPMI $W_{1,2Tx,R(X1)}$, and the other one is 4-port TPMI $W_{2,4Tx,R(X2)}$. Two fields of "Precoding information and number of layers" may be included in the DCI, one for 2-port TPMI and the other one for 4-port TPMI. FIG. 7 illustrates TPMI operation in accordance with some embodiments. In particular, FIG. 7 illustrates TPMI operation in accordance with Method A.

2) Method B

If the Rank value X∈{2, 3,4 . . . 8}, then the 8-port precoding matrix $W_{8Tx,R(X)}$ may be generated according to Equation (3). $W_{1,4Tx,R(X1)}$ (size of 4×X1) and $W_{2,4Tx,R(X2)}$ (size of 4×X2) are 4-port precoding matrix with Rank X1 and X2, respectively. $W_{1,4Tx,R(X1)}$ and $W_{2,4Tx,R(X2)}$ are as shown in TPMI Tables 3-7. $V_{1,2Tx,R(1)}$ and $V_{2,2Tx,R(1)}$ are 2-port precoder with Rank-1, as shown in TPMI Table 1.

$$W_{8Tx,R(X)} = [\, V_{1,2Tx,R(1)} \otimes W_{1,4Tx,R(X1)} \quad V_{2,2Tx,R(1)} \otimes W_{2,4Tx,R(X2)} \,] \quad (3)$$

where ⊗ means Kronecker product operation. In Equation (3), X=X1+X2, where X1 and X2 are non-zero positive integers, and X1≤4, X2≤4.

If the 8-port precoder is generated according to Equation (3), then in the DCI scheduling PUSCH, two 4-port TPMIs ($W_{1,4Tx,R(X1)}$ and $W_{2,4Tx,R(X2)}$) may be indicated. Two fields of "Precoding information and number of layers" is included in the DCI, and each field indicates one 4-port TPMI. In addition, two 2-port TPMIs with Rank-1 ($V_{1,2Tx,R(1)}$ and $V_{2,2Tx,R(1)}$) may also be indicated.

Figure 8:
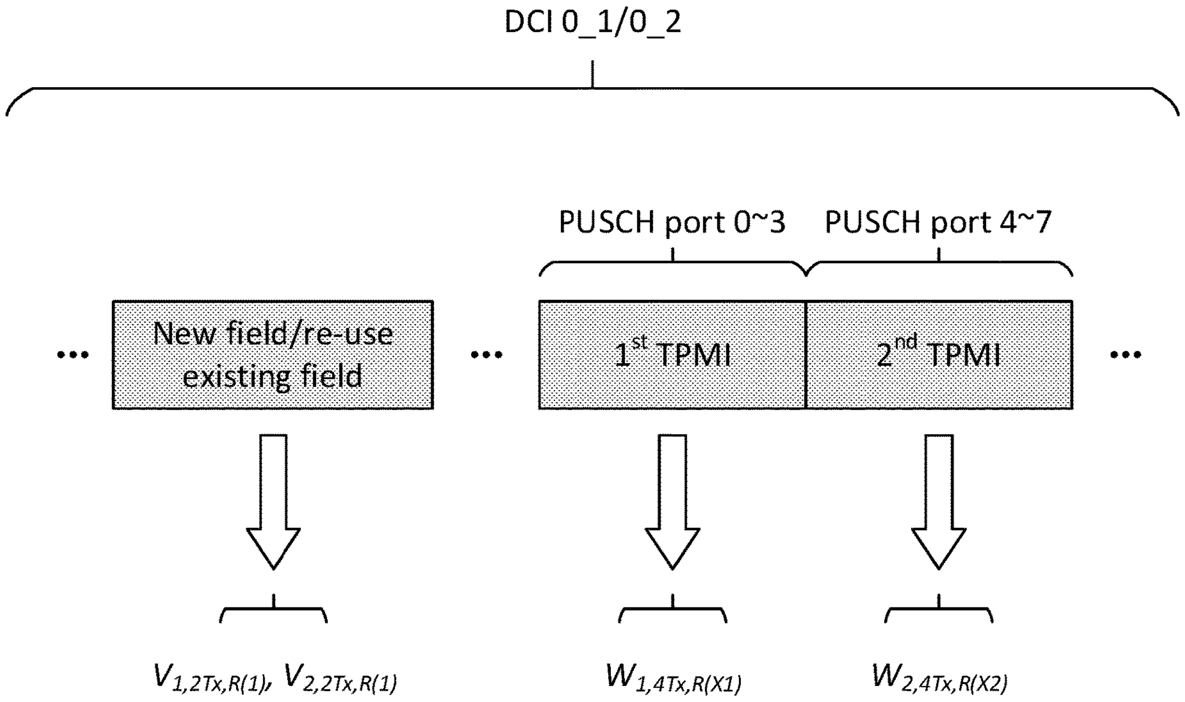
FIG. 8 illustrates another TPMI operation in accordance with some embodiments.

When two 4-port TPMIs are indicated in the DCI, the first 4-port TPMI is applied for the first PUSCH port group (port #0 to port #3), and the second 4-port TPMI is applied for the second PUSCH port group (port #4 to port #7). FIG. 8 illustrates another TPMI operation in accordance with some embodiments. In particular, FIG. 8 illustrates TPMI operation in accordance with Method B.

3) Method C

In the DCI scheduling PUSCH, two 4-port TPMIs ($W_{1,4Tx,R(X1)}$ and $W_{2,4Tx,R(X2)}$) may be indicated. Two fields of "Precoding information and number of layers" is included in the DCI, and each field indicates one 4-port TPMI. When two 4-port TPMIs are indicated in the DCI, the first 4-port TPMI is applied for the first PUSCH port group (port #0 to port #3), and the second 4-port TPMI is applied for the second PUSCH port group (port #4 to port #7).

A new field(s) may be added to indicate whether only one TPMI (either the $1^{st}$ TPMI or the $2^{nd}$ TPMI) is used or both TPMIs are used to generate the 8-port precoder. Alternatively, the SRS Resource Set Indication field may be re-used if two SRS resource sets with usage of codebook are configured.

For the Rank value X∈{1,2, 3,4 . . . 8}, the 8-port precoding matrix $W_{8Tx,R(X)}$ (size of 8×X) with Rank X may be generated as below.

If only the $1^{st}$ TPMI field is used, then the 8-port precoding matrix $W_{8Tx,R(X)}$ may be generated by:

$$W_{8Tx,R(X)} = V_{1,2Tx,R(1)} \otimes W_{1,4Tx,R(X1)} \quad (4)$$

where ⊗ means Kronecker product operation.

If only the $2^{nd}$ TPMI field is used, then the 8-port precoding matrix $W_{8Tx,R(X)}$ may be generated by:

$$W_{8Tx,R(X)} = V_{2,2Tx,R(1)} \otimes W_{2,4Tx,R(X2)} \quad (5)$$

where ⊗ means Kronecker product operation.

If both TPMI fields are used, then the 8-port precoding matrix $W_{8Tx,R(X)}$ may be generated by:

$$W_{8Tx,R(X)} = [\, V_{1,2Tx,R(1)} \otimes W_{1,4Tx,R(X1)} \quad V_{2,2Tx,R(1)} \otimes W_{2,4TxR(X2)} \,] \quad (6)$$

where ⊗ means Kronecker product operation.

$W_{1,4Tx,R(X1)}$ (size of 4×X1) and $W_{2,4Tx,R(X2)}$ (size of 4×X2) are 4-port precoding matrix with Rank X1 and X2, respectively. $W_{1,4Tx,R(X1)}$ and $W_{2,4Tx,R(X2)}$ are as shown in TPMI Tables 3-7. $V_{1,2Tx,R(1)}$ and $V_{2,2Tx,R(1)}$ are 2-port precoder with Rank-1, as shown in TPMI Table 1. The value combinations for $V_{1,2Tx,R(1)}$ and $V_{2,2Tx,R(1)}$ may be further restricted as shown in TPMI Tables 3-4 ($V_1$ and $V_2$ corresponds to $V_{1,2Tx,R(1)}$ and $V_{2,2Tx,R(1)}$, respectively, and value of $[0\ 0]^T$ means it is not used).

In Equation (4), X=X1. In Equation (5), X=X2. In Equation (6), X=X1+X2. X1 and X2 are non-zero positive integers, and X1≤4, X2≤4.

In an example, the 8-port precoder generation with Equation (5) may be optional, i.e., the precoder is generated based on Equation (4) and Equation (6).

In another example, Equation (4) is used if the Rank value is X∈{1,2, 3,4}. Equation (6) is used if the Rank value is X∈{5,6,7,8}.

Figure 9:
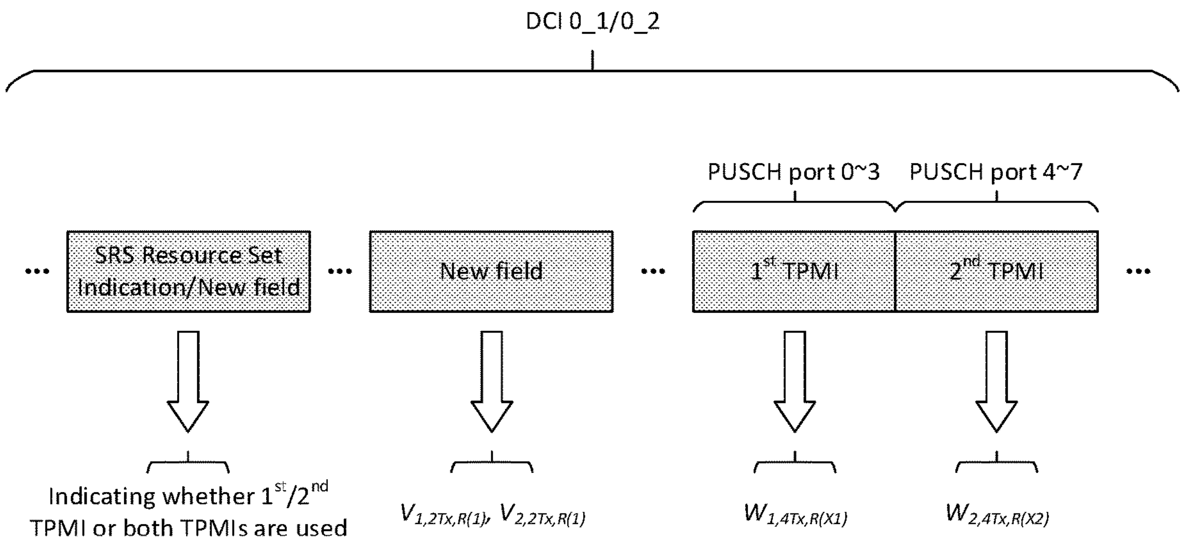
FIG. 9 illustrates another TPMI operation in accordance with some embodiments.

In the scheduling DCI, besides the two 4-port TPMIs, two 2-port TPMIs with Rank-1 ($V_{1,2Tx,R(1)}$ and $V_{2,2Tx,R(1)}$) may also be indicated. In the scheduling DCI, the value for $V_{1,2Tx,R(1)}$ and $V_{2,2Tx,R(1)}$ may be indicated via new DCI field(s) or re-use existing fields or joint encoding with other field, e.g., the field of SRS Resource Set Indication/the new field indicating which TPMI field(s) is used. FIG. 9 illustrates another TPMI operation in accordance with some embodiments. In particular, FIG. 9 illustrates TPMI operation in accordance with Method C.

Table shows an example of the joint encoding between SRS Resource Set Indication field and the field indicating $V_1$ and $V_2$ (corresponding to $V_{1,2Tx,R(1)}$ and $V_{2,2Tx,R(1)}$, respectively).

TABLE 9

Joint encoding between the field indicating $V_1$ and $V_2$ and the field of SRS Resource Set Indication

| Value of SRS Resource Set Indication | SRS Resource Set Indication | Value of the field indicating $V_1$ and $V_2$ | $V_1$ | $V_2$ |
|---|---|---|---|---|
| '00' | 1st SRI and 1st TPMI are associated with 1st SRS resource set/1st PUSCH port group (port #0~port #3) | 0 | $\frac{1}{\sqrt{2}}\begin{bmatrix}1\\0\end{bmatrix}$ | Reserved |
| | 2nd SRI and 2nd TPMI are reserved | 1 | $\frac{1}{\sqrt{2}}\begin{bmatrix}1\\1\end{bmatrix}$ | Reserved |
| '01' | 1st SRI and 1st TPMI are reserved | 0 | Reserved | $\frac{1}{\sqrt{2}}\begin{bmatrix}0\\1\end{bmatrix}$ |
| | 2nd SRI and 2nd TPMI are associated with 2nd SRS resource set/2nd PUSCH port group (port #4~port #7) | 1 | Reserved | $\frac{1}{\sqrt{2}}\begin{bmatrix}1\\1\end{bmatrix}\left(\text{or } \frac{1}{\sqrt{2}}\begin{bmatrix}1\\-1\end{bmatrix}\right)$ |
| '10' | 1st SRI and 1st TPMI are associated with 1st SRS resource set/1st PUSCH port group (port #0~port #3) | 0 | $\frac{1}{\sqrt{2}}\begin{bmatrix}1\\0\end{bmatrix}$ | $\frac{1}{\sqrt{2}}\begin{bmatrix}0\\1\end{bmatrix}$ |
| | 2nd SRI and 2nd TPMI are associated with 2nd SRS resource set/2nd PUSCH port group (port #4~port #7) | 1 | $\frac{1}{\sqrt{2}}\begin{bmatrix}1\\1\end{bmatrix}$ | $\frac{1}{\sqrt{2}}\begin{bmatrix}1\\1\end{bmatrix}\left(\text{or } \frac{1}{\sqrt{2}}\begin{bmatrix}1\\-1\end{bmatrix}\right)$ |
| '11' | 2nd SRI and 2nd TPMI are associated with 2nd SRS resource set/2nd PUSCH port group (port #4~port #7) | Reserved | | |

Table 9 shows another example of the joint encoding between SRS Resource Set Indication field and the field indicating $V_1$ and $V_2$ (corresponding to $V_{1,2Tx,R(1)}$ and $V_{2,2Tx,R(1)}$, respectively).

TABLE 3

Another joint encoding between the field indicating $V_1$ and $V_2$ and the field of SRS Resource Set Indication

| Value of SRS Resource Set Indication | SRS Resource Set Indication | Value of the field indicating $V_1$ and V2 | $V_1$ | $V_2$ |
|---|---|---|---|---|
| '00' | 1st SRI and 1st TPMI are associated with 1st SRS resource set/1st PUSCH port group (port #0~port #3) | 0 | $\frac{1}{\sqrt{2}}\begin{bmatrix}1\\0\end{bmatrix}$ | Reserved |
| | 2nd SRI and 2nd TPMI are reserved | 1 | $\frac{1}{\sqrt{2}}\begin{bmatrix}1\\1\end{bmatrix}$ | Reserved |
| '01' | 1st SRI and 1st TPMI are reserved 2nd SRI and 2nd TPMI are associated with 2nd SRS resource set/2nd PUSCH port group (port #4~port #7) | Reserved | Reserved | Reserved |
| '10' | 1st SRI and 1st TPMI are associated with 1st SRS resource set/1st PUSCH port group (port #0~port #3) | 0 | $\frac{1}{\sqrt{2}}\begin{bmatrix}1\\0\end{bmatrix}$ | $\frac{1}{\sqrt{2}}\begin{bmatrix}0\\1\end{bmatrix}$ |
| | 2nd SRI and 2nd TPMI are associated with 2nd SRS resource set/2nd PUSCH port group (port #4~port #7) | 1 | $\frac{1}{\sqrt{2}}\begin{bmatrix}1\\1\end{bmatrix}$ | $\frac{1}{\sqrt{2}}\begin{bmatrix}1\\1\end{bmatrix}\left(\text{or } \frac{1}{\sqrt{2}}\begin{bmatrix}1\\-1\end{bmatrix}\right)$ |
| '11' | 2nd SRI and 2nd TPMI are associated with 2nd SRS resource set/2nd PUSCH port group (port #4~port #7) | Reserved | | |

In this embodiment, the UE may be configured with one SRS resource set (the SRS resource in the SRS resource set may support up to 8 ports) with usage of 'codebook' and one SRI field is indicated in the DCI.

Alternatively, the UE may be configured with two SRS resource sets (the SRS resource in the SRS resource set may support up to 4 ports) with usage of 'codebook' and two SRI fields are indicated in the DCI. The association between SRI/SRS resource set and the PUSCH port group/TPMI field may be implicit or explicit. For example, with implicit association, the first SRI field/SRS resource set corresponds to the first PUSCH port group (port #0 to port #3)/the first TPMI, and the second SRI field/SRS resource set corresponds to the second PUSCH port group (port #0 to port #3)/the second TPMI. With explicit association, a new field may be added or the existing field (e.g., the field of SRS Resource Set Indication) may be re-used.

Note: this embodiment can also be applied to the case that multiple codewords (e.g., two codewords) are used for uplink transmission. In this case, the 1st codeword corresponds to the 1st PUSCH port group (port #0~port #3), and the 2nd codeword corresponds to the 2nd PUSCH port group (port #4~port #7). The 1st TPMI is used for the 1st codeword, and the 2nd TPMI is used for the 2nd codeword. $W_{1,4Tx,R(X1)}$ and $V_{1,2Tx,R(1)}$ are used for the 1st codeword, $W_{2,4Tx,R(X2)}$ and $V_{2,2Tx,R(1)}$ are used for the 2nd codeword.

In another embodiment, a new DCI field to indicate which equation is used to generate the precoder, i.e., whether Equation (1)/(2)/(3)/(4)/(5) is used. Alternatively, which Equation is used may be pre-defined, or configured by higher layer signaling (RRC/MAC-CE).

Enhanced SRS Configuration for Codebook Based Uplink Transmission

As above, in the NR Rel-16 specification, for codebook based PUSCH transmission, the SRS configuration may be different considering full power operation mode.

If the full power operation is not enabled, or if the full power operation is enabled and is set to Mode 0 or Mode 1, then one SRS resource set may be configured and up to two SRS resources can be configured in the SRS resource set. The number of SRS antenna ports may be the same for all the SRS resources in the SRS resource set. In this case, the maximum number of SRS antenna ports is 4.

If the full power operation is enabled and set to Mode 2, then one SRS resource set may be configured and up to 2 or 4 SRS resources can be configured in the SRS resource set. The number of SRS antenna ports may be the same or different. In this case, the maximum number of SRS antenna ports is 4.

In Rel-18, the uplink transmission may support up to 8 Tx (8 ports). However, in the real transmission, it may be possible that the gNB configures fewer ports for uplink transmission for power saving, for example, 4 ports or 2 ports. Following the current framework, RRC reconfiguration is used to switch between different number of antenna ports, which leads to extra signaling overhead. Therefore, it may be preferable to allow the gNB and UE to quickly switch between different antenna ports operation in Rel-18.

Single Codeword for PUSCH with Up to 8 Ports

In an embodiment, for codebook based PUSCH transmission (the number of antenna ports is P, where P∈{1, 2, 4, (6), 8}, 6-port is not included if not supported), the UE may be configured with one or multiple SRS resource sets with usage of 'codebook'. The number of SRS resource sets configured for codebook-based transmission is $N_{SRS}$, and $N_{SRS} \geq 1$. Within each SRS resource set, one or multiple SRS resources may be configured. The number of SRS resources within one SRS resource set is $M_{SRS}$, and $M_{SRS} \geq 1$.

In an embodiment, for codebook based PUSCH transmission with up to 8 Tx, one SRS resource set is configured ($N_{SRS}=1$). Up to two SRS resources are configured in the SRS resource set, i.e., $M_{SRS} \geq 2$. The number of SRS ports for all the SRS resources within the SRS resource set may be the same, i.e., P is the same for all the SRS resources and P∈{1, 2, 4, 8}. This embodiment may be applied for codebook-based transmission when full power operation is not enabled, or when full power operation is enabled and set to full power Mode 0 or full power Mode 1. One or multiple SRI fields may be included in the DCI. One or multiple TPMI fields may be included in the DCI.

In an embodiment, for codebook based PUSCH transmission with up to 8 Tx, one SRS resource set is configured ($N_{SRS}=1$). Up to four SRS resources may be configured in the SRS resource set, i.e., $M_{SRS} \leq 4$ (in another example, up to six/eight SRS resources may be configured in the SRS resource set). The number of SRS ports for all the SRS resources within the SRS resource set may be the same or different. For example, 4 SRS resources are configured in the SRS resource set and the number of SRS ports of the 4 SRS resources are {1, 2, 4, 8} respectively. One or multiple SRI fields may be included in the DCI. One or multiple TPMI fields may be included in the DCI.

When different number of ports are configured for the SRS resources within the SRS resource set, the TPMI field length is determined by the maximum number of ports of the configured SRS resource.

This embodiment may be applied for codebook-based transmission when full power operation is enabled and set to full power Mode 2.

Figure 10:
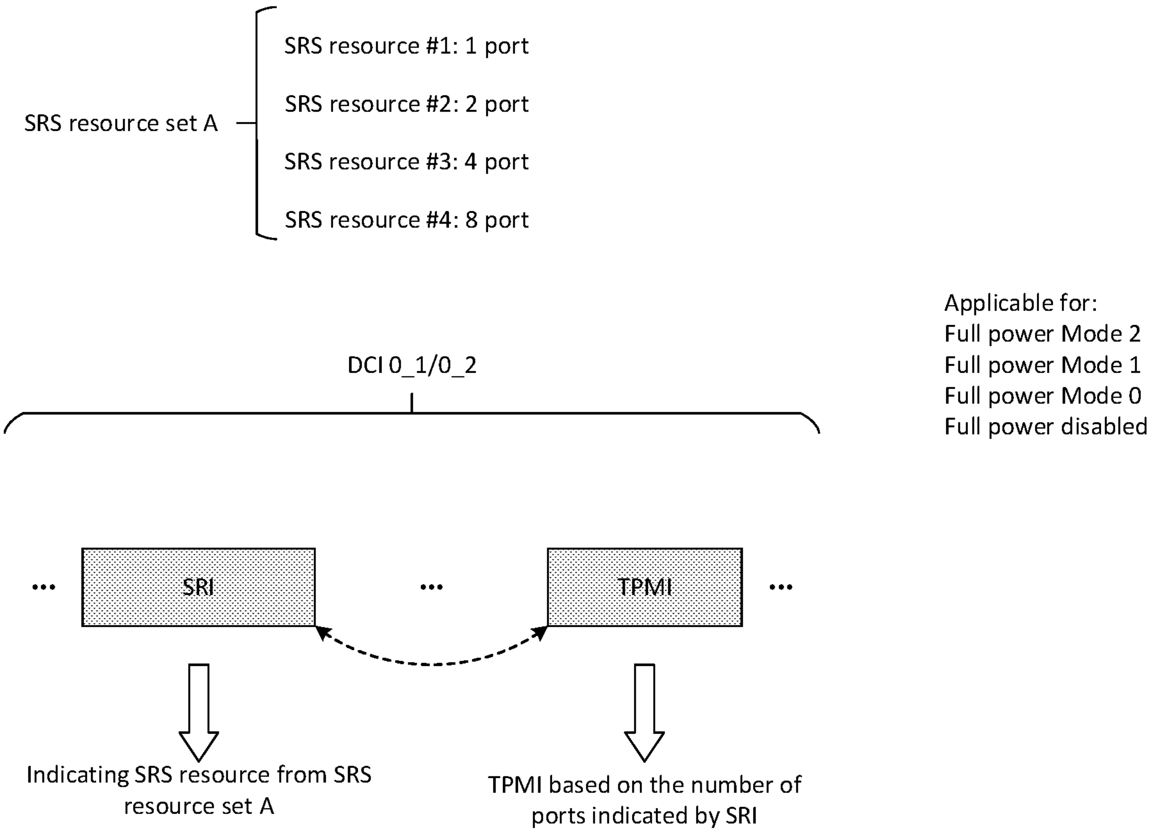
FIG. 10 illustrates a sounding reference signal (SRS) configuration for codebook-based transmission in accordance with some embodiments.

In another example, this embodiment can also be used for codebook-based transmission when full power operation is not enabled, or when full power operation is enabled and set to full power Mode 0 or full power Mode 1. FIG. 10 illustrates an SRS configuration for codebook-based transmission in accordance with some embodiments.

In an embodiment, for codebook based PUSCH transmission with up to 8 Tx, multiple SRS resource sets may be configured ($N_{SRS} \geq 1$). The number of SRS ports for the SRS resources within one SRS resource set is the same. The number of SRS ports for SRS resources across different SRS resource set may be different. In the DCI, one or multiple SRI fields should be included. The number of SRI fields may be the same or less than the number of SRS resource sets.

For example, two SRS resource sets ($N_{SRS}=2$) are configured, and each SRS resource set contains two SRS resources ($M_{SRS}=2$). In the 1st SRS resource set, the number of SRS ports of the two SRS resources is 2, and in the 2nd SRS resource set, the number of SRS ports of the two SRS resources is 8.

In the DCI, two SRIs are included. The 1st SRI corresponds to the 1st SRS resource set, and the 2nd SRI corresponds to the 2nd SRS resource set. In the DCI, one or multiple TPMI fields may be included, e.g., two TPMI fields. The 1st TPMI field corresponds to the 1st SRI and is based on 2-ports; the 2nd TPMI field corresponds to the 2nd SRI and is based on 8-ports.

Whether the SRI/TPMI field is used may be implicitly or explicitly indicated. With implicit indication, if one SRI/TPMI field is not used for transmission, one specific value (for example, one reserved value) of the SRI/TPMI field may be used to indicate that the corresponding SRI/TPMI field is not used for transmission. With explicit indication, a new field may be added to the DCI or the existing field may be reused/repurposed.

Figure 11:
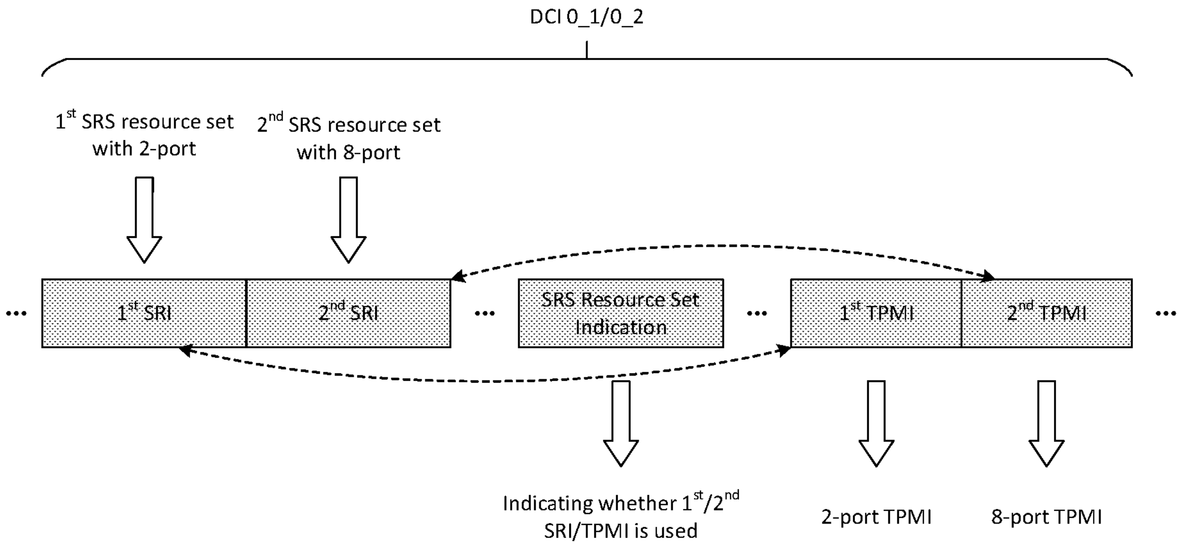
FIG. 11 illustrates DCI-based switching between different ports for codebook-based transmission in accordance with some embodiments.

FIG. 11 illustrates DCI-based switching between different ports for codebook-based transmission in accordance with some embodiments. The existing field of SRS Resource Set Indication is used to indicate which SRI/TPMI field is used. In this way, the gNB and the UE may quickly switch between 2-port and 8-port operation.

In another example, if the number of configured SRS resource sets is larger than the number of SRI fields, e.g., larger than 2, then a medium access control control element (MAC-CE) may be introduced to select a subset of the configured SRS resource sets. The selected SRS resource sets configured via MAC-CE are used and are mapped to the SRI fields.

This embodiment may be applied for codebook-based transmission when full power operation is enabled and set to full power Mode 2.

In another example, this embodiment can also be used for codebook-based transmission when full power operation is not enabled, or when full power operation is enabled and set to full power Mode 0 or full power Mode 1.

Multiple Codewords for PUSCH with Up to 8 Ports

In an embodiment, for codebook-based transmission with up to 8 ports, multiple codewords/panels may be used, e.g., two codewords/panels. In another example, for uplink transmission with N (N<=8) ports, port group may be defined with the number of port group is M. For example, for PUSCH transmission with 8 ports, the 8 antenna ports are split into two port groups. The 1st port group includes port #0 to port #3, and the 2nd port group includes port #4 to port #7.

In an embodiment, for codebook based transmission with multiple codewords/panels/port groups, one SRS resource set is configured. In the DCI, one or multiple (e.g., two) SRI fields are included, and one or multiple (e.g., two) TPMI fields are included. When two SRI/TPMI fields are included, the SRI/TPMI field may be mapped to the codeword/panel/port group. The mapping may be implicit or explicit. For example, the 1st SRI/TPMI field is used for the 1st codeword/panel/port group, and the 2nd SRI/TPMI field is used for the 2nd codeword/panel/port group.

In one example, the number of the antenna ports for the SRS resources in the SRS resource set should be the same. This may be applied for codebook-based transmission when full power operation is not enabled, or when full power operation is enabled and set to full power Mode 0 or full power Mode 1.

In another example, the number of the antenna ports for the SRS resources in the SRS resource set may be the same or different. This may be applied for codebook-based transmission when full power operation is enabled and set to full power Mode 2. Alternatively, this may also be applied for codebook-based transmission when full power operation is not enabled, or when full power operation is enabled and set to full power Mode 0 or full power Mode 1.

In another embodiment, for codebook based transmission with multiple codewords/panels/port groups, multiple SRS resource sets (e.g., two) are configured. In the DCI, multiple (e.g., two) SRI fields are included, and multiple (e.g., two) TPMI fields are included. The SRI/TPMI field may be mapped to the SRS resource set and/or codeword/panel/port group. The mapping may be implicit or explicit. For example, the $1^{st}$ SRI/TPMI field is used for the $1^{st}$ SRS resource set and/or the $1^{st}$ codeword/panel/port group, and the $2^{nd}$ SRI/TPMI field is used for the $2^{nd}$ SRS resource set and/or the $2^{nd}$ codeword/panel/port group.

In one example, the number of the antenna ports for the SRS resources within one SRS resource set may be the same. The number of antenna ports for the SRS resources across different SRS resource set may be the same or different. The number of SRS resources across different SRS resource set may be the same or different. This may be applied for codebook-based transmission when full power operation is not enabled, or when full power operation is enabled and set to full power Mode 0 or full power Mode 1.

In another example, the number of the antenna ports for the SRS resources within one SRS resource set may be the same or different. The number of antenna ports for the SRS resources across different SRS resource sets may be the same or different. The number of SRS resources across different SRS resource sets may be the same or different. This may be applied for codebook-based transmission when full power operation is enabled and set to full power Mode 2. Alternatively, this may also be applied for codebook-based transmission when full power operation is not enabled, or when full power operation is enabled and set to full power Mode 0 or full power Mode 1.

Codebook for Uplink Transmission with Eight Ports

In addition to the above, in order to improve uplink spectral efficiency, more than 4 layer (e.g., up to 8) uplink transmission is to be supported in NR Rel-18.

TPMIs with 8 Tx (8 Ports)

In an embodiment, the 8-port precoding matrix $W_{8Tx,R(X)}$ (size of 8×X) with Rank X may be generated according to Equation (1) and/or Equation (2), where R(X), R(X1), R(X2) means Rank X, Rank X1, Rank X2, respectively.

Equation (7) below may be used for 8 Tx with Rank X∈{1,2,3,4,6,8}. $W_{1,2Tx,R(X1)}$ (size of 2×X1) is a 2-port precoder with Rank X1, and $W_{2,4Tx,R(X2)}$ (size of 4×X2) is a 4-port precoder with Rank X2. $W_{1,2Tx,R(X1)}$ is as shown in TPMI Tables 1-2. $W_{2,4Tx,R(X2)}$ is as shown in TPMI Tables 3-7. The constrain is X=X1×X2, where X1 and X2 are non-zero positive integers, and X1≤2, X2≤4.

$$W_{8Tx,R(X)} = W_{1,2Tx,R(X1)} \otimes W_{2,4TxR(X2)} \quad (7)$$

where ⊗ means Kronecker product operation.

Equation (8) below may be used for 8Tx with Rank X∈{2, 3,4 . . . 8}. $W_{1,4Tx,R(X1)}$ (size of 4×X1) and $W_{2,4Tx,R(X2)}$ (size of 4×X2) are 4-port precoding matrix with Rank X1 and X2, respectively. $W_{1,4Tx,R(X1)}$ and $W_{2,4Tx,R(X2)}$ are as shown in TPMI Tables 3-7. The constrain is X=X1+X2, where X1 and X2 are non-zero positive integers, and X1≤4, X2≤4. $V_{1,2Tx,R(1)}$ and $V_{2,2Tx,R(1)}$ are 2-port precoder with Rank-1, as shown in TPMI Table 1.

$$W_{8Tx,R(X)} = [\, V_{1,2Tx,R(1)} \otimes W_{1,4Tx,R(X1)} \quad V_{2,2Tx,R(1)} \otimes W_{2,4Tx,R(X2)} \,] \quad (8)$$

where ⊗ means Kronecker product operation.

The precoding matrix generated by Equation (8) may be mutually orthogonal among columns (i.e., any two columns are orthogonal).

The precoding matrix for 8-Tx may be all the codebooks generated by Equation (7) and/or Equation (8) (or the union set of all the codebooks generated by Equation (7) and Equation (8)). Or the precoding matrix for 8-Tx may be subset of all the codebooks generated by Equation (7) and/or Equation (8) (or the subset of the union set of all the codebooks generated by Equation (7) and Equation (8)).

In another embodiment, if $V_{1,2Tx,R(1)}$ and $V_{2,2Tx,R(1)}$ in Equation (8) may select one matrix as shown in Table 9 (i.e., the candidate values for $V_{1,2Tx,R(1)}$ and $V_{2,2Tx,R(1)}$ include the Rank-1 precoder with 2-ports plus $[0\ 0]^T$), then Equation (8) may be used to generate 8-port precoding matrix for all the Ranks, i.e., Rank X∈{1, 2, 3, 4 . . . 8}.

Furthermore, Equation (7) may be covered by Equation (8), i.e., all the 8-port precoding matrix can be generated solely from Equation (8). In such case, the precoding matrix for 8-Tx may be all the codebooks generated by Equation (8). Or the precoding matrix for 8-Tx may be subset of all the codebooks generated by Equation (8). After the precoder is constructed, the column with all zeros may be removed.

TABLE 9

| Candidates for $V_{1,2Tx,R(1)}$ and $V_{2,2Tx,R(1)}$ | | | | | | |
|---|---|---|---|---|---|---|
| $\begin{bmatrix}0\\0\end{bmatrix}$ | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ |

In another embodiment, Equation (7) may be used for 8 Tx with Rank X∈{1,2,3,4,5,6,7,8}. For Rank of X={5,7}, the precoding matrix may be generated by dropping one specific column, e.g., the last column, from the precoder of Rank X+1 that is generated according to Equation (7). One field may be added to DCI to indicate the rank of the indicated TPMI is reduced by one, and the one specific column (the last column) is dropped.

In another embodiment, the 8-port precoding matrix $W_{8Tx,R(X)}$ (size of 8×X) with Rank X may be generated according to Equation (9) and/or Equation (10) below.

$$W_{8Tx,R(X)} = W_{2,4Tx,R(X2)} \otimes W_{1,2Tx,R(X1)} \tag{9}$$

$$W_{8Tx,R(X)} = [\, W_{1,4Tx,R(X1)} \otimes V_{1,2Tx,R(1)} \quad W_{2,4Tx,R(X2)} \otimes V_{2,2Tx,R(1)} \,] \tag{10}$$

wherein the definition of $W_{1,2TX,R(X1)}$, $W_{2,4TX,R(X2)}$, $V_{1,2TX,R(1)}$, $V_{2,2TX,R(1)}$, $W_{1,4TX,R(X1)}$ and $W_{2,4Tx,R(X2)}$ are the same as previous embodiments.

1) Non-Coherent TPMI

In an embodiment, for 8-port non-coherent TPMI, when it is generated by Equation (7)/(9), $W_{1,2Tx,R(X1)}$ is a 2-port non-coherent TPMI with Rank X1, and $W_{2,4Tx,R(X2)}$ is a 4-port non-coherent TPMI with Rank X2, as shown in Table.

For 8-port non-coherent TPMI, when it is generated by Equation (8)/(10), $V_{1,2Tx,R(1)}$ and $V_{2,2Tx,R(1)}$ are 2-port non-coherent precoder with Rank-1 as shown in Table, $W_{1,4Tx,R(X1)}$ is a 4-port non-coherent TPMI with Rank X1, and $W_{2,4Tx,R(X2)}$ is a 4-port non-coherent TPMI with Rank X2, as shown in Table. If $V_{1,2Tx,R(1)}$ and $V_{2,2Tx,R(1)}$ are the same, then $W_{1,4Tx,R(X1)}$ and $W_{2,4TX,R(X2)}$ may be different. If $W_{1,4Tx,R(X1)}$ and $W_{2,4TX,R(X2)}$ are the same, then $V_{1,2Tx,R(1)}$ and $V_{2,2Tx,R(1)}$ may be different.

Or when the 8-port non-coherent TPMI is generated by Equation (8)/(10), $V_{1,2Tx,R(1)}$ and $V_{2,2Tx,R(1)}$ are 2-port non-coherent precoder with Rank-1 as shown in Table plus $[0\ 0]^T$.

2) Partial Coherent TPMI

In an embodiment, for 8-port partial coherent TPMI, when it is generated by Equation (7)/(9), $W_{1,2Tx,R(X1)}$ may be a 2-port non-coherent TPMI with Rank X1, and $W_{2,4Tx,R(X2)}$ may be a 4-port partial coherent or full coherent TPMI with Rank X2 as shown in Table. Or $W_{1,2Tx,R(X1)}$ is a 2-port full coherent TPMI with Rank X1, and $W_{2,4Tx,R(X2)}$ is a 4-port partial coherent or non-coherent TPMI with Rank X2 as shown in Table.

For 8-port partial coherent TPMI, when it is generated by Equation (8)/(10), $V_{1,2Tx,R(1)}$ and $V_{2,2Tx,R(1)}$ may be 2-port non-coherent precoder with Rank-1, $W_{1,4Tx,R(X1)}$ may be a 4-port partial coherent or full coherent TPMI with Rank X1, and $W_{2,4Tx,R(X2)}$ may be a 4-port partial coherent or full coherent TPMI with Rank X2, as shown in Table. Or $V_{1,2Tx,R(1)}$ and $V_{2,2Tx,R(1)}$ may be 2-port full coherent precoder with Rank-1, $W_{1,4Tx,R(X1)}$ may be a 4-port partial coherent or non-coherent TPMI with Rank X1, and $W_{2,4Tx,R(X2)}$ may be a 4-port partial coherent or non-coherent TPMI with Rank X2, as shown in Table.

If $V_{1,2Tx,R(1)}$ and $V_{2,2Tx,R(1)}$ are the same, then $W_{1,4Tx,R(X)}$ and $W_{2,4Tx,R(X2)}$ may be different. If $W_{1,4Tx,R(X1)}$ and $W_{2,4Tx,R(X2)}$ are the same, then $V_{1,2Tx,R(1)}$ and $V_{2,2Tx,R(1)}$ may be different.

Furthermore, if the partial coherent UE supports 4 co-phasing ports (the UE can maintain relative phase among 4 ports), then when the precoder is generated by Equation (7)/(9), $W_{1,2Tx,R(X1)}$ may be a 2-port non-coherent TPMI with Rank X1, and $W_{2,4Tx,R(X2)}$ may be a 4-port full coherent TPMI with Rank X2 as shown in Table. Or $W_{1,2Tx,R(X1)}$ is a 2-port full coherent TPMI with Rank X1, and $W_{2,4Tx,R(X2)}$ is a 4-port partial coherent TPMI with Rank X2 as shown in Table.

If the partial coherent UE supports 4 co-phasing ports, then when the precoder is generated by Equation (8)/(10), $V_{1,2Tx,R(1)}$ and $V_{2,2Tx,R(1)}$ may be 2-port non-coherent precoder with Rank-1, $W_{1,4Tx,R(X1)}$ may be a 4-port full coherent TPMI with Rank X1, and $W_{2,4Tx,R(X2)}$ may be a 4-port full coherent TPMI with Rank X2, as shown in Table. Or $V_{1,2Tx,R(1)}$ and $\mathbf{V2}_{1,2Tx,R(1)}$ may be 2-port full coherent precoder with Rank-1, $W_{1,4Tx,R(X1)}$ may be a 4-port partial coherent TPMI with Rank X1, and $W_{2,4Tx,R(X2)}$ may be a 4-port partial coherent TPMI with Rank X2, as shown in Table.

If the partial coherent UE supports 2 co-phasing ports (the UE can maintain relative phase among 2 ports), then when the precoder is generated by Equation (7)/(9), $W_{1,2Tx,R(X1)}$ may be a 2-port non-coherent TPMI with Rank X1, and $W_{2,4Tx,R(X2)}$ may be a 4-port partial coherent TPMI with Rank X2 as shown in Table. Or $W_{1,2Tx,R(X1)}$ is a 2-port full coherent TPMI with Rank X1, and $W_{2,4Tx,R(X2)}$ is a 4-port non-coherent TPMI with Rank X2 as shown in Table.

If the partial coherent UE supports 2 co-phasing ports, then when the precoder is generated by Equation (8)/(10), $V_{1,2Tx,R(1)}$ and $V_{2,2Tx,R(1)}$ may be 2-port non-coherent precoder with Rank-1, $W_{1,4Tx,R(X1)}$ may be a 4-port partial coherent TPMI with Rank X1, and $W_{2,4Tx,R(X2)}$ may be a 4-port partial coherent TPMI with Rank X2, as shown in Table. Or $V_{1,2Tx,R(1)}$ and $V_{2,2Tx,R(1)}$ may be 2-port full coherent precoder with Rank-1, $W_{1,4Tx,R(X1)}$ may be a 4-port non-coherent TPMI with Rank X1, and $W_{2,4Tx,R(X2)}$ may be a 4-port non-coherent TPMI with Rank X2, as shown in Table.

3) Full Coherent TPMI

In an embodiment, for 8-port full coherent TPMI, when it is generated by Equation (7)/(9), $W_{1,2Tx,R(X1)}$ is a 2-port full coherent TPMI with Rank X1, and $W_{2,4Tx,R(X2)}$ is a 4-port full coherent TPMI with Rank X2, as shown in Table.

For 8-port full coherent TPMI, when it is generated by Equation (8)/(10), $V_{1,2Tx,R(1)}$ and $V_{2,2Tx,R(1)}$ are 2-port full coherent precoder with Rank-1 as shown in Table, $W_{1,4Tx,R(X1)}$ is a 4-port full coherent TPMI with Rank X1, and $W_{2,4Tx,R(X2)}$ is a 4-port full coherent TPMI with Rank X2, as shown in Table. If $V_{1,2Tx,R(1)}$ and $V_{2,2TX,R(1)}$ are the same, then $W_{1,4Tx,R(X1)}$ and $W_{2,4Tx,R(X2)}$ may be different. If $W_{1,4Tx,R(X1)}$ and $W_{2,4Tx,R(X2)}$ are the same, then $V_{1,2Tx,R(1)}$ and $V_{2,2Tx,R(1)}$ may be different.

Or when the 8-port full coherent TPMI is generated by Equation (8)/(10), $V_{1,2Tx,R(1)}$ and $V_{2,2Tx,R(1)}$ are 2-port full coherent precoder with Rank-1 as shown in Table plus $[0\ 0]^T$.

In an embodiment, the precoders with 8-ports for Rank-1 to Rank-8 are shown below from Table to Table.

Rank-1 Precoders

TABLE 10

| Rank-1 precoding matrix with 8-ports | |
|---|---|
| Non coherent | $\frac{1}{2\sqrt{2}}\begin{bmatrix}1\\0\\0\\0\\0\\0\\0\\0\end{bmatrix}$ $\frac{1}{2\sqrt{2}}\begin{bmatrix}0\\1\\0\\0\\0\\0\\0\\0\end{bmatrix}$ $\frac{1}{2\sqrt{2}}\begin{bmatrix}0\\0\\1\\0\\0\\0\\0\\0\end{bmatrix}$ $\frac{1}{2\sqrt{2}}\begin{bmatrix}0\\0\\0\\1\\0\\0\\0\\0\end{bmatrix}$ $\frac{1}{2\sqrt{2}}\begin{bmatrix}0\\0\\0\\0\\1\\0\\0\\0\end{bmatrix}$ $\frac{1}{2\sqrt{2}}\begin{bmatrix}0\\0\\0\\0\\0\\1\\0\\0\end{bmatrix}$ $\frac{1}{2\sqrt{2}}\begin{bmatrix}0\\0\\0\\0\\0\\0\\1\\0\end{bmatrix}$ $\frac{1}{2\sqrt{2}}\begin{bmatrix}0\\0\\0\\0\\0\\0\\0\\1\end{bmatrix}$ |
| Partial coherent | $\frac{1}{2\sqrt{2}}\begin{bmatrix}1\\0\\1\\0\\0\\0\\0\\0\end{bmatrix}$ $\frac{1}{2\sqrt{2}}\begin{bmatrix}1\\0\\-1\\0\\0\\0\\0\\0\end{bmatrix}$ $\frac{1}{2\sqrt{2}}\begin{bmatrix}1\\0\\j\\0\\0\\0\\0\\0\end{bmatrix}$ $\frac{1}{2\sqrt{2}}\begin{bmatrix}1\\0\\-j\\0\\0\\0\\0\\0\end{bmatrix}$ $\frac{1}{2\sqrt{2}}\begin{bmatrix}0\\1\\0\\1\\0\\0\\0\\0\end{bmatrix}$ $\frac{1}{2\sqrt{2}}\begin{bmatrix}0\\1\\0\\-1\\0\\0\\0\\0\end{bmatrix}$ $\frac{1}{2\sqrt{2}}\begin{bmatrix}0\\1\\0\\j\\0\\0\\0\\0\end{bmatrix}$ $\frac{1}{2\sqrt{2}}\begin{bmatrix}0\\1\\0\\-j\\0\\0\\0\\0\end{bmatrix}$ |
| | $\frac{1}{2\sqrt{2}}\begin{bmatrix}0\\0\\0\\0\\1\\0\\1\\0\end{bmatrix}$ $\frac{1}{2\sqrt{2}}\begin{bmatrix}0\\0\\0\\0\\1\\0\\-1\\0\end{bmatrix}$ $\frac{1}{2\sqrt{2}}\begin{bmatrix}0\\0\\0\\0\\1\\0\\j\\0\end{bmatrix}$ $\frac{1}{2\sqrt{2}}\begin{bmatrix}0\\0\\0\\0\\1\\0\\-j\\0\end{bmatrix}$ $\frac{1}{2\sqrt{2}}\begin{bmatrix}0\\0\\0\\0\\0\\1\\0\\1\end{bmatrix}$ $\frac{1}{2\sqrt{2}}\begin{bmatrix}0\\0\\0\\0\\0\\1\\0\\-1\end{bmatrix}$ $\frac{1}{2\sqrt{2}}\begin{bmatrix}0\\0\\0\\0\\0\\1\\0\\j\end{bmatrix}$ $\frac{1}{2\sqrt{2}}\begin{bmatrix}0\\0\\0\\0\\0\\1\\0\\-j\end{bmatrix}$ |
| Partial coherent | $\frac{1}{2\sqrt{2}}\begin{bmatrix}1\\0\\0\\0\\1\\0\\0\\0\end{bmatrix}$ $\frac{1}{2\sqrt{2}}\begin{bmatrix}1\\0\\0\\0\\-1\\0\\0\\0\end{bmatrix}$ $\frac{1}{2\sqrt{2}}\begin{bmatrix}1\\0\\0\\0\\j\\0\\0\\0\end{bmatrix}$ $\frac{1}{2\sqrt{2}}\begin{bmatrix}1\\0\\0\\0\\-j\\0\\0\\0\end{bmatrix}$ $\frac{1}{2\sqrt{2}}\begin{bmatrix}0\\1\\0\\0\\0\\1\\0\\0\end{bmatrix}$ $\frac{1}{2\sqrt{2}}\begin{bmatrix}0\\1\\0\\0\\0\\-1\\0\\0\end{bmatrix}$ |

TABLE 10-continued

| | Rank-1 precoding matrix with 8-ports |
|---|---|
| | $\frac{1}{2\sqrt{2}}\begin{bmatrix}0\\1\\0\\0\\0\\j\\0\\0\end{bmatrix}$ $\frac{1}{2\sqrt{2}}\begin{bmatrix}0\\1\\0\\0\\0\\-j\\0\\0\end{bmatrix}$ $\frac{1}{2\sqrt{2}}\begin{bmatrix}0\\0\\1\\0\\0\\0\\1\\0\end{bmatrix}$ $\frac{1}{2\sqrt{2}}\begin{bmatrix}0\\0\\1\\0\\0\\0\\-1\\0\end{bmatrix}$ $\frac{1}{2\sqrt{2}}\begin{bmatrix}0\\0\\1\\0\\0\\0\\j\\0\end{bmatrix}$ $\frac{1}{2\sqrt{2}}\begin{bmatrix}0\\0\\1\\0\\0\\0\\-j\\0\end{bmatrix}$ |
| | $\frac{1}{2\sqrt{2}}\begin{bmatrix}0\\0\\0\\1\\0\\0\\0\\1\end{bmatrix}$ $\frac{1}{2\sqrt{2}}\begin{bmatrix}0\\0\\0\\1\\0\\0\\0\\-1\end{bmatrix}$ $\frac{1}{2\sqrt{2}}\begin{bmatrix}0\\0\\0\\1\\0\\0\\0\\j\end{bmatrix}$ $\frac{1}{2\sqrt{2}}\begin{bmatrix}0\\0\\0\\1\\0\\0\\0\\-j\end{bmatrix}$ |
| Partial coherent | $\frac{1}{2\sqrt{2}}\begin{bmatrix}1\\1\\1\\1\\0\\0\\0\\0\end{bmatrix}$ $\frac{1}{2\sqrt{2}}\begin{bmatrix}1\\1\\j\\j\\0\\0\\0\\0\end{bmatrix}$ $\frac{1}{2\sqrt{2}}\begin{bmatrix}1\\1\\-1\\-1\\0\\0\\0\\0\end{bmatrix}$ $\frac{1}{2\sqrt{2}}\begin{bmatrix}1\\1\\-j\\-j\\0\\0\\0\\0\end{bmatrix}$ $\frac{1}{2\sqrt{2}}\begin{bmatrix}1\\j\\1\\j\\0\\0\\0\\0\end{bmatrix}$ $\frac{1}{2\sqrt{2}}\begin{bmatrix}1\\j\\j\\-1\\0\\0\\0\\0\end{bmatrix}$ |
| | $\frac{1}{2\sqrt{2}}\begin{bmatrix}1\\j\\-1\\-j\\0\\0\\0\\0\end{bmatrix}$ $\frac{1}{2\sqrt{2}}\begin{bmatrix}1\\j\\-j\\1\\0\\0\\0\\0\end{bmatrix}$ $\frac{1}{2\sqrt{2}}\begin{bmatrix}1\\-1\\1\\-1\\0\\0\\0\\0\end{bmatrix}$ $\frac{1}{2\sqrt{2}}\begin{bmatrix}1\\-1\\j\\-j\\0\\0\\0\\0\end{bmatrix}$ $\frac{1}{2\sqrt{2}}\begin{bmatrix}1\\-1\\-1\\1\\0\\0\\0\\0\end{bmatrix}$ $\frac{1}{2\sqrt{2}}\begin{bmatrix}1\\-1\\-j\\j\\0\\0\\0\\0\end{bmatrix}$ |
| | $\frac{1}{2\sqrt{2}}\begin{bmatrix}1\\-j\\1\\-j\\0\\0\\0\\0\end{bmatrix}$ $\frac{1}{2\sqrt{2}}\begin{bmatrix}1\\-j\\j\\1\\0\\0\\0\\0\end{bmatrix}$ $\frac{1}{2\sqrt{2}}\begin{bmatrix}1\\-j\\-1\\j\\0\\0\\0\\0\end{bmatrix}$ $\frac{1}{2\sqrt{2}}\begin{bmatrix}1\\-j\\-j\\-1\\0\\0\\0\\0\end{bmatrix}$ $\frac{1}{2\sqrt{2}}\begin{bmatrix}0\\0\\0\\0\\1\\1\\1\\1\end{bmatrix}$ $\frac{1}{2\sqrt{2}}\begin{bmatrix}0\\0\\0\\0\\1\\1\\j\\j\end{bmatrix}$ |
| | $\frac{1}{2\sqrt{2}}\begin{bmatrix}0\\0\\0\\0\\1\\1\\-1\\-1\end{bmatrix}$ $\frac{1}{2\sqrt{2}}\begin{bmatrix}0\\0\\0\\0\\1\\1\\-j\\-j\end{bmatrix}$ $\frac{1}{2\sqrt{2}}\begin{bmatrix}0\\0\\0\\0\\1\\j\\1\\j\end{bmatrix}$ $\frac{1}{2\sqrt{2}}\begin{bmatrix}0\\0\\0\\0\\1\\j\\j\\-1\end{bmatrix}$ $\frac{1}{2\sqrt{2}}\begin{bmatrix}0\\0\\0\\0\\1\\j\\-1\\-j\end{bmatrix}$ $\frac{1}{2\sqrt{2}}\begin{bmatrix}0\\0\\0\\0\\1\\j\\-j\\1\end{bmatrix}$ |
| | $\frac{1}{2\sqrt{2}}\begin{bmatrix}0\\0\\0\\0\\1\\-1\\1\\-1\end{bmatrix}$ $\frac{1}{2\sqrt{2}}\begin{bmatrix}0\\0\\0\\0\\1\\-1\\j\\-j\end{bmatrix}$ $\frac{1}{2\sqrt{2}}\begin{bmatrix}0\\0\\0\\0\\1\\-1\\-1\\1\end{bmatrix}$ $\frac{1}{2\sqrt{2}}\begin{bmatrix}0\\0\\0\\0\\1\\-1\\-j\\j\end{bmatrix}$ $\frac{1}{2\sqrt{2}}\begin{bmatrix}0\\0\\0\\0\\1\\-j\\1\\-j\end{bmatrix}$ $\frac{1}{2\sqrt{2}}\begin{bmatrix}0\\0\\0\\0\\1\\-j\\j\\1\end{bmatrix}$ |

TABLE 10-continued

| | Rank-1 precoding matrix with 8-ports |
| --- | --- |
| | $\frac{1}{2\sqrt{2}}\begin{bmatrix}0\\0\\0\\0\\1\\j\\-1\\j\end{bmatrix}$ $\frac{1}{2\sqrt{2}}\begin{bmatrix}0\\0\\0\\0\\1\\-j\\-j\\-1\end{bmatrix}$ |
| Partial coherent | $\frac{1}{2\sqrt{2}}\begin{bmatrix}1\\0\\1\\0\\1\\0\\1\\0\end{bmatrix}$ $\frac{1}{2\sqrt{2}}\begin{bmatrix}1\\0\\-1\\0\\1\\0\\-1\\0\end{bmatrix}$ $\frac{1}{2\sqrt{2}}\begin{bmatrix}1\\0\\j\\0\\1\\0\\j\\0\end{bmatrix}$ $\frac{1}{2\sqrt{2}}\begin{bmatrix}1\\0\\-j\\0\\1\\0\\-j\\0\end{bmatrix}$ $\frac{1}{2\sqrt{2}}\begin{bmatrix}1\\0\\1\\0\\-1\\0\\-1\\0\end{bmatrix}$ $\frac{1}{2\sqrt{2}}\begin{bmatrix}1\\0\\-1\\0\\-1\\0\\1\\0\end{bmatrix}$ |
| | $\frac{1}{2\sqrt{2}}\begin{bmatrix}1\\0\\j\\0\\-1\\0\\-j\\0\end{bmatrix}$ $\frac{1}{2\sqrt{2}}\begin{bmatrix}1\\0\\-j\\0\\-1\\0\\j\\0\end{bmatrix}$ $\frac{1}{2\sqrt{2}}\begin{bmatrix}1\\0\\-1\\0\\j\\0\\-j\\0\end{bmatrix}$ $\frac{1}{2\sqrt{2}}\begin{bmatrix}1\\0\\j\\0\\j\\0\\-1\\0\end{bmatrix}$ $\frac{1}{2\sqrt{2}}\begin{bmatrix}1\\0\\j\\0\\j\\0\\-1\\0\end{bmatrix}$ $\frac{1}{2\sqrt{2}}\begin{bmatrix}1\\0\\-j\\0\\j\\0\\1\\0\end{bmatrix}$ |
| | $\frac{1}{2\sqrt{2}}\begin{bmatrix}1\\0\\1\\0\\-j\\0\\-j\\0\end{bmatrix}$ $\frac{1}{2\sqrt{2}}\begin{bmatrix}1\\0\\-1\\0\\-j\\0\\j\\0\end{bmatrix}$ $\frac{1}{2\sqrt{2}}\begin{bmatrix}1\\0\\j\\0\\-j\\0\\1\\0\end{bmatrix}$ $\frac{1}{2\sqrt{2}}\begin{bmatrix}1\\0\\-j\\0\\-j\\0\\1\\0\end{bmatrix}$ $\frac{1}{2\sqrt{2}}\begin{bmatrix}0\\1\\0\\1\\0\\1\\0\\1\end{bmatrix}$ $\frac{1}{2\sqrt{2}}\begin{bmatrix}0\\1\\0\\-1\\0\\1\\0\\-1\end{bmatrix}$ |
| | $\frac{1}{2\sqrt{2}}\begin{bmatrix}0\\1\\0\\j\\0\\1\\0\\j\end{bmatrix}$ $\frac{1}{2\sqrt{2}}\begin{bmatrix}0\\1\\0\\-j\\0\\1\\0\\-j\end{bmatrix}$ $\frac{1}{2\sqrt{2}}\begin{bmatrix}0\\1\\0\\1\\0\\-1\\0\\-1\end{bmatrix}$ $\frac{1}{2\sqrt{2}}\begin{bmatrix}0\\1\\0\\-1\\0\\-1\\0\\1\end{bmatrix}$ $\frac{1}{2\sqrt{2}}\begin{bmatrix}0\\1\\0\\j\\0\\-1\\0\\-j\end{bmatrix}$ $\frac{1}{2\sqrt{2}}\begin{bmatrix}0\\1\\0\\-j\\0\\-1\\0\\j\end{bmatrix}$ |
| | $\frac{1}{2\sqrt{2}}\begin{bmatrix}0\\1\\0\\1\\0\\j\\0\\j\end{bmatrix}$ $\frac{1}{2\sqrt{2}}\begin{bmatrix}0\\1\\0\\-1\\0\\j\\0\\-j\end{bmatrix}$ $\frac{1}{2\sqrt{2}}\begin{bmatrix}0\\1\\0\\j\\0\\j\\0\\-1\end{bmatrix}$ $\frac{1}{2\sqrt{2}}\begin{bmatrix}0\\1\\0\\-j\\0\\j\\0\\1\end{bmatrix}$ $\frac{1}{2\sqrt{2}}\begin{bmatrix}0\\1\\0\\1\\0\\-j\\0\\-j\end{bmatrix}$ $\frac{1}{2\sqrt{2}}\begin{bmatrix}0\\1\\0\\-1\\0\\-j\\0\\j\end{bmatrix}$ |
| | $\frac{1}{2\sqrt{2}}\begin{bmatrix}0\\1\\0\\j\\0\\-j\\0\\1\end{bmatrix}$ $\frac{1}{2\sqrt{2}}\begin{bmatrix}0\\1\\0\\-j\\0\\-j\\0\\-1\end{bmatrix}$ |

TABLE 10-continued

| | Rank-1 precoding matrix with 8-ports |
|---|---|
| Full coherent | $\frac{1}{2\sqrt{2}}\begin{bmatrix}1\\1\\1\\1\\1\\1\\1\\1\end{bmatrix}$ $\frac{1}{2\sqrt{2}}\begin{bmatrix}1\\1\\j\\j\\1\\1\\j\\j\end{bmatrix}$ $\frac{1}{2\sqrt{2}}\begin{bmatrix}1\\1\\-1\\-1\\1\\1\\-1\\-1\end{bmatrix}$ $\frac{1}{2\sqrt{2}}\begin{bmatrix}1\\1\\-j\\-j\\1\\1\\-j\\-j\end{bmatrix}$ $\frac{1}{2\sqrt{2}}\begin{bmatrix}1\\j\\1\\j\\1\\j\\1\\j\end{bmatrix}$ $\frac{1}{2\sqrt{2}}\begin{bmatrix}1\\j\\j\\-1\\1\\j\\j\\-1\end{bmatrix}$ |
| | $\frac{1}{2\sqrt{2}}\begin{bmatrix}1\\j\\-1\\-j\\1\\j\\-1\\-j\end{bmatrix}$ $\frac{1}{2\sqrt{2}}\begin{bmatrix}1\\j\\-j\\1\\1\\j\\-j\\1\end{bmatrix}$ $\frac{1}{2\sqrt{2}}\begin{bmatrix}1\\-1\\1\\-1\\1\\-1\\1\\-1\end{bmatrix}$ $\frac{1}{2\sqrt{2}}\begin{bmatrix}1\\-1\\j\\-j\\1\\-1\\j\\-j\end{bmatrix}$ $\frac{1}{2\sqrt{2}}\begin{bmatrix}1\\-1\\-1\\1\\1\\-1\\-1\\1\end{bmatrix}$ $\frac{1}{2\sqrt{2}}\begin{bmatrix}1\\-1\\-j\\j\\1\\-1\\-j\\j\end{bmatrix}$ |
| | $\frac{1}{2\sqrt{2}}\begin{bmatrix}1\\-j\\1\\-j\\1\\-j\\1\\-j\end{bmatrix}$ $\frac{1}{2\sqrt{2}}\begin{bmatrix}1\\-j\\j\\1\\1\\-j\\j\\1\end{bmatrix}$ $\frac{1}{2\sqrt{2}}\begin{bmatrix}1\\-j\\-1\\j\\1\\-j\\-1\\j\end{bmatrix}$ $\frac{1}{2\sqrt{2}}\begin{bmatrix}1\\-j\\-j\\-1\\1\\-j\\-j\\-1\end{bmatrix}$ |
| | $\frac{1}{2\sqrt{2}}\begin{bmatrix}1\\1\\1\\1\\-1\\-1\\-1\\-1\end{bmatrix}$ $\frac{1}{2\sqrt{2}}\begin{bmatrix}1\\1\\j\\j\\-1\\-1\\-j\\-j\end{bmatrix}$ $\frac{1}{2\sqrt{2}}\begin{bmatrix}1\\1\\-1\\-1\\-1\\-1\\1\\1\end{bmatrix}$ $\frac{1}{2\sqrt{2}}\begin{bmatrix}1\\1\\-j\\-j\\-1\\-1\\j\\j\end{bmatrix}$ $\frac{1}{2\sqrt{2}}\begin{bmatrix}1\\j\\1\\j\\-1\\-j\\-1\\-j\end{bmatrix}$ $\frac{1}{2\sqrt{2}}\begin{bmatrix}1\\j\\j\\-1\\-1\\-j\\-j\\1\end{bmatrix}$ |
| | $\frac{1}{2\sqrt{2}}\begin{bmatrix}1\\j\\-1\\-j\\-1\\-j\\1\\j\end{bmatrix}$ $\frac{1}{2\sqrt{2}}\begin{bmatrix}1\\j\\-j\\1\\-1\\-j\\j\\-1\end{bmatrix}$ $\frac{1}{2\sqrt{2}}\begin{bmatrix}1\\-1\\1\\-1\\-1\\1\\-1\\1\end{bmatrix}$ $\frac{1}{2\sqrt{2}}\begin{bmatrix}1\\-1\\j\\-j\\-1\\1\\-j\\j\end{bmatrix}$ $\frac{1}{2\sqrt{2}}\begin{bmatrix}1\\-1\\-1\\1\\-1\\1\\1\\-1\end{bmatrix}$ $\frac{1}{2\sqrt{2}}\begin{bmatrix}1\\-1\\-j\\j\\-1\\1\\j\\-j\end{bmatrix}$ |
| | $\frac{1}{2\sqrt{2}}\begin{bmatrix}1\\-j\\1\\-j\\-1\\j\\-1\\j\end{bmatrix}$ $\frac{1}{2\sqrt{2}}\begin{bmatrix}1\\-j\\j\\1\\-1\\j\\-j\\-1\end{bmatrix}$ $\frac{1}{2\sqrt{2}}\begin{bmatrix}1\\-j\\-1\\j\\-1\\j\\1\\-j\end{bmatrix}$ $\frac{1}{2\sqrt{2}}\begin{bmatrix}1\\-j\\-j\\-1\\-1\\j\\j\\1\end{bmatrix}$ |
| | $\frac{1}{2\sqrt{2}}\begin{bmatrix}1\\1\\1\\1\\j\\j\\j\\j\end{bmatrix}$ $\frac{1}{2\sqrt{2}}\begin{bmatrix}1\\1\\j\\j\\j\\j\\-1\\-1\end{bmatrix}$ $\frac{1}{2\sqrt{2}}\begin{bmatrix}1\\1\\-1\\-1\\j\\j\\-j\\-j\end{bmatrix}$ $\frac{1}{2\sqrt{2}}\begin{bmatrix}1\\1\\-j\\-j\\j\\j\\1\\1\end{bmatrix}$ $\frac{1}{2\sqrt{2}}\begin{bmatrix}1\\j\\1\\j\\j\\-1\\j\\-1\end{bmatrix}$ $\frac{1}{2\sqrt{2}}\begin{bmatrix}1\\j\\j\\-1\\j\\-1\\-1\\-j\end{bmatrix}$ |

TABLE 10-continued

| Rank-1 precoding matrix with 8-ports | | | | | |
|---|---|---|---|---|---|
| $\frac{1}{2\sqrt{2}}\begin{bmatrix}1\\j\\-1\\-j\\j\\-1\\-j\\1\end{bmatrix}$ | $\frac{1}{2\sqrt{2}}\begin{bmatrix}1\\j\\-j\\1\\j\\-1\\1\\j\end{bmatrix}$ | $\frac{1}{2\sqrt{2}}\begin{bmatrix}1\\-1\\1\\-1\\j\\-j\\j\\-j\end{bmatrix}$ | $\frac{1}{2\sqrt{2}}\begin{bmatrix}1\\-1\\j\\-j\\j\\-j\\-1\\1\end{bmatrix}$ | $\frac{1}{2\sqrt{2}}\begin{bmatrix}1\\-1\\-1\\1\\j\\-j\\-j\\j\end{bmatrix}$ | $\frac{1}{2\sqrt{2}}\begin{bmatrix}1\\-1\\-j\\j\\j\\-j\\1\\-1\end{bmatrix}$ |
| $\frac{1}{2\sqrt{2}}\begin{bmatrix}1\\-j\\1\\-j\\j\\1\\j\\1\end{bmatrix}$ | $\frac{1}{2\sqrt{2}}\begin{bmatrix}1\\-j\\j\\1\\j\\1\\-1\\j\end{bmatrix}$ | $\frac{1}{2\sqrt{2}}\begin{bmatrix}1\\-j\\-1\\j\\j\\1\\-j\\-1\end{bmatrix}$ | $\frac{1}{2\sqrt{2}}\begin{bmatrix}1\\-j\\-j\\-1\\j\\1\\1\\-j\end{bmatrix}$ | | |
| $\frac{1}{2\sqrt{2}}\begin{bmatrix}1\\1\\1\\1\\-j\\-j\\-j\\-j\end{bmatrix}$ | $\frac{1}{2\sqrt{2}}\begin{bmatrix}1\\1\\j\\j\\-j\\-j\\1\\1\end{bmatrix}$ | $\frac{1}{2\sqrt{2}}\begin{bmatrix}1\\1\\-1\\-1\\-j\\-j\\j\\j\end{bmatrix}$ | $\frac{1}{2\sqrt{2}}\begin{bmatrix}1\\1\\-j\\-j\\-j\\-j\\-1\\-1\end{bmatrix}$ | $\frac{1}{2\sqrt{2}}\begin{bmatrix}1\\j\\1\\j\\-j\\1\\-j\\1\end{bmatrix}$ | $\frac{1}{2\sqrt{2}}\begin{bmatrix}1\\j\\j\\-1\\-j\\1\\1\\j\end{bmatrix}$ |
| $\frac{1}{2\sqrt{2}}\begin{bmatrix}1\\j\\-1\\-j\\-j\\1\\j\\-1\end{bmatrix}$ | $\frac{1}{2\sqrt{2}}\begin{bmatrix}1\\j\\-j\\1\\-j\\1\\-1\\-j\end{bmatrix}$ | $\frac{1}{2\sqrt{2}}\begin{bmatrix}1\\-1\\1\\-1\\-j\\j\\-j\\j\end{bmatrix}$ | $\frac{1}{2\sqrt{2}}\begin{bmatrix}1\\-1\\j\\-j\\-j\\j\\1\\-1\end{bmatrix}$ | $\frac{1}{2\sqrt{2}}\begin{bmatrix}1\\-1\\-1\\1\\-j\\j\\j\\-j\end{bmatrix}$ | $\frac{1}{2\sqrt{2}}\begin{bmatrix}1\\-1\\-j\\j\\-j\\j\\-1\\1\end{bmatrix}$ |
| $\frac{1}{2\sqrt{2}}\begin{bmatrix}1\\-j\\1\\-j\\-j\\-1\\-j\\-1\end{bmatrix}$ | $\frac{1}{2\sqrt{2}}\begin{bmatrix}1\\-j\\j\\1\\-j\\-1\\1\\-j\end{bmatrix}$ | $\frac{1}{2\sqrt{2}}\begin{bmatrix}1\\-j\\-1\\j\\-j\\-1\\j\\1\end{bmatrix}$ | $\frac{1}{2\sqrt{2}}\begin{bmatrix}1\\-j\\-j\\-1\\-j\\-1\\-1\\j\end{bmatrix}$ | | |

Rank-2 Precoders

TABLE 11

| Rank-2 precoding matrix with 8-ports | | | | | | |
|---|---|---|---|---|---|---|
| Non coherent | $\frac{1}{2\sqrt{2}}\begin{bmatrix}1&0\\0&1\\0&0\\0&0\\0&0\\0&0\\0&0\\0&0\end{bmatrix}$ | $\frac{1}{2\sqrt{2}}\begin{bmatrix}1&0\\0&0\\0&1\\0&0\\0&0\\0&0\\0&0\\0&0\end{bmatrix}$ | $\frac{1}{2\sqrt{2}}\begin{bmatrix}1&0\\0&0\\0&0\\0&1\\0&0\\0&0\\0&0\\0&0\end{bmatrix}$ | $\frac{1}{2\sqrt{2}}\begin{bmatrix}0&0\\1&0\\0&1\\0&0\\0&0\\0&0\\0&0\\0&0\end{bmatrix}$ | $\frac{1}{2\sqrt{2}}\begin{bmatrix}0&0\\1&0\\0&0\\0&1\\0&0\\0&0\\0&0\\0&0\end{bmatrix}$ | $\frac{1}{2\sqrt{2}}\begin{bmatrix}0&0\\0&0\\1&0\\0&1\\0&0\\0&0\\0&0\\0&0\end{bmatrix}$ |
| | $\frac{1}{2\sqrt{2}}\begin{bmatrix}0&0\\0&0\\0&0\\0&0\\1&0\\0&1\\0&0\\0&0\end{bmatrix}$ | $\frac{1}{2\sqrt{2}}\begin{bmatrix}0&0\\0&0\\0&0\\0&0\\1&0\\0&0\\0&1\\0&0\end{bmatrix}$ | $\frac{1}{2\sqrt{2}}\begin{bmatrix}0&0\\0&0\\0&0\\0&0\\1&0\\0&0\\0&0\\0&1\end{bmatrix}$ | $\frac{1}{2\sqrt{2}}\begin{bmatrix}0&0\\0&0\\0&0\\0&0\\0&0\\1&0\\0&1\\0&0\end{bmatrix}$ | $\frac{1}{2\sqrt{2}}\begin{bmatrix}0&0\\0&0\\0&0\\0&0\\0&0\\1&0\\0&0\\0&1\end{bmatrix}$ | $\frac{1}{2\sqrt{2}}\begin{bmatrix}0&0\\0&0\\0&0\\0&0\\0&0\\0&0\\1&0\\0&1\end{bmatrix}$ |

TABLE 11-continued

Rank-2 precoding matrix with 8-ports

Partial coherent $$\frac{1}{2\sqrt{2}}\begin{bmatrix}1&0\\0&1\\1&0\\0&-j\\0&0\\0&0\\0&0\\0&0\end{bmatrix}\quad\frac{1}{2\sqrt{2}}\begin{bmatrix}1&0\\0&1\\1&0\\0&j\\0&0\\0&0\\0&0\\0&0\end{bmatrix}\quad\frac{1}{2\sqrt{2}}\begin{bmatrix}1&0\\0&1\\-j&0\\0&1\\0&0\\0&0\\0&0\\0&0\end{bmatrix}\quad\frac{1}{2\sqrt{2}}\begin{bmatrix}1&0\\0&1\\-j&0\\0&-1\\0&0\\0&0\\0&0\\0&0\end{bmatrix}\quad\frac{1}{2\sqrt{2}}\begin{bmatrix}1&0\\0&1\\-1&0\\0&-j\\0&0\\0&0\\0&0\\0&0\end{bmatrix}\quad\frac{1}{2\sqrt{2}}\begin{bmatrix}1&0\\0&1\\-1&0\\0&j\\0&0\\0&0\\0&0\\0&0\end{bmatrix}$$

$$\frac{1}{2\sqrt{2}}\begin{bmatrix}1&0\\0&1\\j&0\\0&1\\0&0\\0&0\\0&0\\0&0\end{bmatrix}\quad\frac{1}{2\sqrt{2}}\begin{bmatrix}1&0\\0&1\\j&0\\0&-1\\0&0\\0&0\\0&0\\0&0\end{bmatrix}\quad\frac{1}{2\sqrt{2}}\begin{bmatrix}0&0\\0&0\\0&0\\0&0\\1&0\\0&1\\1&0\\0&-j\end{bmatrix}\quad\frac{1}{2\sqrt{2}}\begin{bmatrix}0&0\\0&0\\0&0\\0&0\\1&0\\0&1\\1&0\\0&j\end{bmatrix}\quad\frac{1}{2\sqrt{2}}\begin{bmatrix}0&0\\0&0\\0&0\\0&0\\1&0\\0&1\\-j&0\\0&1\end{bmatrix}\quad\frac{1}{2\sqrt{2}}\begin{bmatrix}0&0\\0&0\\0&0\\0&0\\1&0\\0&1\\-j&0\\0&-1\end{bmatrix}$$

$$\frac{1}{2\sqrt{2}}\begin{bmatrix}0&0\\0&0\\0&0\\0&0\\1&0\\0&1\\-1&0\\0&-j\end{bmatrix}\quad\frac{1}{2\sqrt{2}}\begin{bmatrix}0&0\\0&0\\0&0\\0&0\\1&0\\0&1\\-1&0\\0&j\end{bmatrix}\quad\frac{1}{2\sqrt{2}}\begin{bmatrix}0&0\\0&0\\0&0\\0&0\\1&0\\0&1\\j&0\\0&1\end{bmatrix}\quad\frac{1}{2\sqrt{2}}\begin{bmatrix}0&0\\0&0\\0&0\\0&0\\1&0\\0&1\\j&0\\0&-1\end{bmatrix}$$

Partial coherent $$\frac{1}{2\sqrt{2}}\begin{bmatrix}1&0\\0&1\\0&0\\0&0\\1&0\\0&1\\0&0\\0&0\end{bmatrix}\quad\frac{1}{2\sqrt{2}}\begin{bmatrix}1&0\\1&0\\1&1\\1&1\\-1&0\\0&-1\\1&1\\1&1\end{bmatrix}\quad\frac{1}{2\sqrt{2}}\begin{bmatrix}1&0\\0&1\\0&0\\0&0\\j&0\\0&j\\0&0\\0&0\end{bmatrix}\quad\frac{1}{2\sqrt{2}}\begin{bmatrix}1&0\\0&1\\0&0\\0&0\\-j&0\\0&-j\\0&0\\0&0\end{bmatrix}\quad\frac{1}{2\sqrt{2}}\begin{bmatrix}1&0\\0&0\\0&1\\0&0\\1&0\\0&0\\0&1\\0&0\end{bmatrix}\quad\frac{1}{2\sqrt{2}}\begin{bmatrix}1&0\\0&0\\0&1\\0&0\\-1&0\\0&0\\0&-1\\0&0\end{bmatrix}$$

coherent $$\frac{1}{2\sqrt{2}}\begin{bmatrix}1&0\\0&0\\0&1\\0&0\\j&0\\0&0\\0&j\\0&0\end{bmatrix}\quad\frac{1}{2\sqrt{2}}\begin{bmatrix}1&0\\0&0\\0&1\\0&0\\-j&0\\0&0\\0&-j\\0&0\end{bmatrix}\quad\frac{1}{2\sqrt{2}}\begin{bmatrix}1&0\\0&0\\0&0\\0&1\\1&0\\0&0\\0&0\\0&1\end{bmatrix}\quad\frac{1}{2\sqrt{2}}\begin{bmatrix}1&0\\0&0\\0&0\\0&1\\-1&0\\0&0\\0&0\\0&-1\end{bmatrix}\quad\frac{1}{2\sqrt{2}}\begin{bmatrix}1&0\\0&0\\0&0\\1&j\\0&0\\0&0\\0&0\\0&j\end{bmatrix}\quad\frac{1}{2\sqrt{2}}\begin{bmatrix}1&0\\0&0\\0&0\\0&1\\-j&0\\0&0\\0&0\\0&-j\end{bmatrix}$$

$$\frac{1}{2\sqrt{2}}\begin{bmatrix}0&0\\1&0\\0&1\\0&0\\0&0\\1&0\\0&1\\0&0\end{bmatrix}\quad\frac{1}{2\sqrt{2}}\begin{bmatrix}0&0\\1&0\\0&1\\0&0\\0&0\\-1&0\\0&-1\\0&0\end{bmatrix}\quad\frac{1}{2\sqrt{2}}\begin{bmatrix}0&0\\1&0\\0&1\\0&0\\0&0\\j&0\\0&j\\0&0\end{bmatrix}\quad\frac{1}{2\sqrt{2}}\begin{bmatrix}0&0\\1&0\\0&1\\0&0\\0&0\\-j&0\\0&-j\\0&0\end{bmatrix}\quad\frac{1}{2\sqrt{2}}\begin{bmatrix}0&0\\1&0\\0&0\\0&1\\0&0\\1&0\\0&0\\0&1\end{bmatrix}\quad\frac{1}{2\sqrt{2}}\begin{bmatrix}0&0\\1&0\\0&0\\0&1\\0&0\\-1&0\\0&0\\0&-1\end{bmatrix}$$

$$\frac{1}{2\sqrt{2}}\begin{bmatrix}0&0\\1&0\\0&0\\0&1\\0&0\\j&0\\0&0\\0&j\end{bmatrix}\quad\frac{1}{2\sqrt{2}}\begin{bmatrix}0&0\\1&0\\0&0\\0&1\\0&0\\-j&0\\0&0\\0&-j\end{bmatrix}\quad\frac{1}{2\sqrt{2}}\begin{bmatrix}0&0\\0&0\\1&0\\0&1\\0&0\\0&0\\1&0\\0&1\end{bmatrix}\quad\frac{1}{2\sqrt{2}}\begin{bmatrix}0&0\\0&0\\1&0\\0&1\\0&0\\0&0\\-1&0\\0&-1\end{bmatrix}\quad\frac{1}{2\sqrt{2}}\begin{bmatrix}0&0\\0&0\\1&0\\0&1\\0&0\\0&0\\j&0\\0&j\end{bmatrix}\quad\frac{1}{2\sqrt{2}}\begin{bmatrix}0&0\\0&0\\1&0\\0&1\\0&0\\0&0\\-j&0\\0&-j\end{bmatrix}$$

TABLE 11-continued

| | Rank-2 precoding matrix with 8-ports |
|---|---|
| Partial coherent | $\frac{1}{2\sqrt{2}}\begin{bmatrix}1&1\\1&1\\1&-1\\1&-1\\0&0\\0&0\\0&0\\0&0\end{bmatrix}$ $\frac{1}{2\sqrt{2}}\begin{bmatrix}1&1\\1&1\\j&-j\\j&-j\\0&0\\0&0\\0&0\\0&0\end{bmatrix}$ $\frac{1}{2\sqrt{2}}\begin{bmatrix}1&1\\j&j\\1&-1\\j&-j\\0&0\\0&0\\0&0\\0&0\end{bmatrix}$ $\frac{1}{2\sqrt{2}}\begin{bmatrix}1&1\\j&j\\j&-j\\-1&1\\0&0\\0&0\\0&0\\0&0\end{bmatrix}$ $\frac{1}{2\sqrt{2}}\begin{bmatrix}1&1\\-1&-1\\1&-1\\-1&1\\0&0\\0&0\\0&0\\0&0\end{bmatrix}$ $\frac{1}{2\sqrt{2}}\begin{bmatrix}1&1\\-1&-1\\j&-j\\-j&j\\0&0\\0&0\\0&0\\0&0\end{bmatrix}$ $\frac{1}{2\sqrt{2}}\begin{bmatrix}1&1\\-j&-j\\1&-1\\-j&j\\0&0\\0&0\\0&0\\0&0\end{bmatrix}$ $\frac{1}{2\sqrt{2}}\begin{bmatrix}1&1\\-j&-j\\j&-j\\1&-1\\0&0\\0&0\\0&0\\0&0\end{bmatrix}$ $\frac{1}{2\sqrt{2}}\begin{bmatrix}0&0\\0&0\\0&0\\0&0\\1&1\\1&1\\1&-1\\1&-1\end{bmatrix}$ $\frac{1}{2\sqrt{2}}\begin{bmatrix}0&0\\0&0\\0&0\\0&0\\1&1\\1&1\\j&-j\\j&-j\end{bmatrix}$ $\frac{1}{2\sqrt{2}}\begin{bmatrix}0&0\\0&0\\0&0\\0&0\\1&1\\j&j\\1&-1\\j&-j\end{bmatrix}$ $\frac{1}{2\sqrt{2}}\begin{bmatrix}0&0\\0&0\\0&0\\0&0\\1&1\\j&j\\j&-j\\-1&1\end{bmatrix}$ $\frac{1}{2\sqrt{2}}\begin{bmatrix}0&0\\0&0\\0&0\\0&0\\1&1\\-1&-1\\1&-1\\-1&1\end{bmatrix}$ $\frac{1}{2\sqrt{2}}\begin{bmatrix}0&0\\0&0\\0&0\\0&0\\1&1\\-1&-1\\j&-j\\-j&j\end{bmatrix}$ $\frac{1}{2\sqrt{2}}\begin{bmatrix}0&0\\0&0\\0&0\\0&0\\1&1\\-j&-j\\1&-1\\-j&j\end{bmatrix}$ $\frac{1}{2\sqrt{2}}\begin{bmatrix}0&0\\0&0\\0&0\\0&0\\1&1\\-j&-j\\j&-j\\1&-1\end{bmatrix}$ |
| Partial coherent | $\frac{1}{2\sqrt{2}}\begin{bmatrix}1&0\\0&1\\1&0\\0&-j\\1&0\\0&1\\1&0\\0&-j\end{bmatrix}$ $\frac{1}{2\sqrt{2}}\begin{bmatrix}1&0\\0&1\\1&0\\0&j\\1&0\\0&1\\1&0\\0&j\end{bmatrix}$ $\frac{1}{2\sqrt{2}}\begin{bmatrix}1&0\\0&1\\-j&0\\0&1\\1&0\\0&1\\-j&0\\0&1\end{bmatrix}$ $\frac{1}{2\sqrt{2}}\begin{bmatrix}1&0\\0&1\\-j&0\\0&-1\\1&0\\0&1\\-j&0\\0&-1\end{bmatrix}$ $\frac{1}{2\sqrt{2}}\begin{bmatrix}1&0\\0&1\\-1&0\\0&-j\\1&0\\0&1\\-1&0\\0&-j\end{bmatrix}$ $\frac{1}{2\sqrt{2}}\begin{bmatrix}1&0\\0&1\\-1&0\\0&j\\1&0\\0&1\\-1&0\\0&j\end{bmatrix}$ $\frac{1}{2\sqrt{2}}\begin{bmatrix}1&0\\0&1\\j&0\\0&1\\1&0\\0&1\\j&0\\0&1\end{bmatrix}$ $\frac{1}{2\sqrt{2}}\begin{bmatrix}1&0\\0&1\\j&0\\0&-1\\1&0\\0&1\\j&0\\0&-1\end{bmatrix}$ $\frac{1}{2\sqrt{2}}\begin{bmatrix}1&0\\0&1\\1&0\\0&-j\\-1&0\\0&-1\\-1&0\\0&j\end{bmatrix}$ $\frac{1}{2\sqrt{2}}\begin{bmatrix}1&0\\0&1\\1&0\\0&j\\-1&0\\0&-1\\-1&0\\0&-j\end{bmatrix}$ $\frac{1}{2\sqrt{2}}\begin{bmatrix}1&0\\0&1\\-j&0\\0&1\\-1&0\\0&-1\\j&0\\0&-1\end{bmatrix}$ $\frac{1}{2\sqrt{2}}\begin{bmatrix}1&0\\0&1\\-j&0\\0&-1\\-1&0\\0&-1\\j&0\\0&1\end{bmatrix}$ $\frac{1}{2\sqrt{2}}\begin{bmatrix}1&0\\0&1\\-1&0\\0&-j\\-1&0\\0&-1\\1&0\\0&j\end{bmatrix}$ $\frac{1}{2\sqrt{2}}\begin{bmatrix}1&0\\0&1\\-1&0\\0&j\\-1&0\\0&-1\\1&0\\0&-j\end{bmatrix}$ $\frac{1}{2\sqrt{2}}\begin{bmatrix}1&0\\0&1\\j&0\\0&1\\-1&0\\0&-1\\-j&0\\0&-1\end{bmatrix}$ $\frac{1}{2\sqrt{2}}\begin{bmatrix}1&0\\0&1\\j&0\\0&-1\\-1&0\\0&-1\\-j&0\\0&1\end{bmatrix}$ |

TABLE 11-continued

| | Rank-2 precoding matrix with 8-ports |
|---|---|
| | $\frac{1}{2\sqrt{2}}\begin{bmatrix}1&0\\0&1\\1&0\\0&-j\\j&0\\0&j\\j&0\\0&1\end{bmatrix}$ $\frac{1}{2\sqrt{2}}\begin{bmatrix}1&0\\0&1\\1&0\\0&j\\j&0\\0&j\\j&0\\0&-1\end{bmatrix}$ $\frac{1}{2\sqrt{2}}\begin{bmatrix}1&0\\0&1\\-j&0\\0&1\\j&0\\0&j\\1&0\\0&j\end{bmatrix}$ $\frac{1}{2\sqrt{2}}\begin{bmatrix}1&0\\0&1\\-j&0\\0&-1\\j&0\\0&j\\1&0\\0&-j\end{bmatrix}$ $\frac{1}{2\sqrt{2}}\begin{bmatrix}1&0\\0&1\\-1&0\\0&-j\\j&0\\0&j\\-j&0\\0&1\end{bmatrix}$ $\frac{1}{2\sqrt{2}}\begin{bmatrix}1&0\\0&1\\-1&0\\0&j\\j&0\\0&j\\-j&0\\0&-1\end{bmatrix}$ |
| | $\frac{1}{2\sqrt{2}}\begin{bmatrix}1&0\\0&1\\j&0\\0&1\\j&0\\0&j\\-1&0\\0&j\end{bmatrix}$ $\frac{1}{2\sqrt{2}}\begin{bmatrix}1&0\\0&1\\j&0\\0&-1\\j&0\\0&j\\-1&0\\0&-j\end{bmatrix}$ |
| | $\frac{1}{2\sqrt{2}}\begin{bmatrix}1&0\\0&1\\1&0\\0&-j\\-j&0\\0&-j\\-j&0\\0&-1\end{bmatrix}$ $\frac{1}{2\sqrt{2}}\begin{bmatrix}1&0\\0&1\\1&0\\0&j\\-j&0\\0&-j\\-j&0\\0&1\end{bmatrix}$ $\frac{1}{2\sqrt{2}}\begin{bmatrix}1&0\\0&1\\-j&0\\0&1\\-j&0\\0&-j\\-1&0\\0&-j\end{bmatrix}$ $\frac{1}{2\sqrt{2}}\begin{bmatrix}1&0\\0&1\\-j&0\\0&-1\\-j&0\\0&-j\\-1&0\\0&j\end{bmatrix}$ $\frac{1}{2\sqrt{2}}\begin{bmatrix}1&0\\0&1\\-1&0\\0&-j\\-j&0\\0&-j\\j&0\\0&-1\end{bmatrix}$ $\frac{1}{2\sqrt{2}}\begin{bmatrix}1&0\\0&1\\-1&0\\0&j\\-j&0\\0&-j\\j&0\\0&1\end{bmatrix}$ |
| | $\frac{1}{2\sqrt{2}}\begin{bmatrix}1&0\\0&1\\j&0\\0&1\\-j&0\\0&-j\\1&0\\0&-j\end{bmatrix}$ $\frac{1}{2\sqrt{2}}\begin{bmatrix}1&0\\0&1\\j&0\\0&-1\\-j&0\\0&-j\\1&0\\0&j\end{bmatrix}$ |
| Full Coherent | $\frac{1}{4}\begin{bmatrix}1&1\\1&1\\1&-1\\1&-1\\1&1\\1&1\\1&-1\\1&-1\end{bmatrix}$ $\frac{1}{4}\begin{bmatrix}1&1\\1&1\\j&-j\\j&-j\\1&1\\1&1\\j&-j\\j&-j\end{bmatrix}$ $\frac{1}{4}\begin{bmatrix}1&1\\j&j\\1&-1\\j&-j\\1&1\\j&j\\1&-1\\j&-j\end{bmatrix}$ $\frac{1}{4}\begin{bmatrix}1&1\\j&j\\j&-j\\-1&1\\1&1\\j&j\\j&-j\\-1&1\end{bmatrix}$ $\frac{1}{4}\begin{bmatrix}1&1\\-1&-1\\1&-1\\-1&1\\1&1\\-1&-1\\1&-1\\-1&1\end{bmatrix}$ $\frac{1}{4}\begin{bmatrix}1&1\\-1&-1\\j&-j\\-j&j\\1&1\\-1&-1\\j&-j\\-j&j\end{bmatrix}$ |
| | $\frac{1}{4}\begin{bmatrix}1&1\\-j&-j\\1&-1\\-j&j\\1&1\\-j&-j\\1&-1\\-j&j\end{bmatrix}$ $\frac{1}{4}\begin{bmatrix}1&1\\-j&-j\\j&-j\\1&-1\\1&1\\-j&-j\\j&-j\\1&-1\end{bmatrix}$ |
| | $\frac{1}{4}\begin{bmatrix}1&1\\1&1\\1&-1\\1&-1\\-1&-1\\-1&-1\\-1&1\\-1&1\end{bmatrix}$ $\frac{1}{4}\begin{bmatrix}1&1\\1&1\\j&-j\\j&-j\\-1&-1\\-1&-1\\-j&j\\-j&j\end{bmatrix}$ $\frac{1}{4}\begin{bmatrix}1&1\\j&j\\1&-1\\j&-j\\-1&-1\\-j&-j\\-1&1\\-j&j\end{bmatrix}$ $\frac{1}{4}\begin{bmatrix}1&1\\j&j\\j&-j\\-1&1\\-1&-1\\-j&-j\\-j&j\\1&-1\end{bmatrix}$ $\frac{1}{4}\begin{bmatrix}1&1\\-1&-1\\1&-1\\-1&1\\-1&-1\\1&1\\-1&1\\1&-1\end{bmatrix}$ $\frac{1}{4}\begin{bmatrix}1&1\\-1&-1\\j&-j\\-j&j\\-1&-1\\1&1\\-j&j\\j&-j\end{bmatrix}$ |

TABLE 11-continued

| Rank-2 precoding matrix with 8-ports |
|---|
| $\frac{1}{4}\begin{bmatrix} 1 & 1 \\ -j & -j \\ 1 & -1 \\ -j & j \\ -1 & -1 \\ j & j \\ -1 & 1 \\ j & -j \end{bmatrix}$ $\frac{1}{4}\begin{bmatrix} 1 & 1 \\ -j & -j \\ j & -j \\ 1 & -1 \\ -1 & -1 \\ j & j \\ -j & j \\ -1 & 1 \end{bmatrix}$ |
| $\frac{1}{4}\begin{bmatrix} 1 & 1 \\ 1 & 1 \\ 1 & -1 \\ 1 & -1 \\ j & j \\ j & j \\ j & -j \\ j & -j \end{bmatrix}$ $\frac{1}{4}\begin{bmatrix} 1 & 1 \\ 1 & 1 \\ j & -j \\ j & -j \\ j & j \\ j & j \\ -1 & 1 \\ -1 & 1 \end{bmatrix}$ $\frac{1}{4}\begin{bmatrix} 1 & 1 \\ j & j \\ 1 & -1 \\ j & -j \\ j & j \\ -1 & -1 \\ j & -j \\ -1 & 1 \end{bmatrix}$ $\frac{1}{4}\begin{bmatrix} 1 & 1 \\ j & j \\ j & -j \\ -1 & 1 \\ j & j \\ -1 & -1 \\ -1 & 1 \\ -j & j \end{bmatrix}$ $\frac{1}{4}\begin{bmatrix} 1 & 1 \\ -1 & -1 \\ 1 & -1 \\ -1 & 1 \\ j & j \\ -j & -j \\ j & -j \\ -j & j \end{bmatrix}$ $\frac{1}{4}\begin{bmatrix} 1 & 1 \\ -1 & -1 \\ j & -j \\ -j & j \\ j & j \\ -j & -j \\ -1 & 1 \\ 1 & -1 \end{bmatrix}$ |
| $\frac{1}{4}\begin{bmatrix} 1 & 1 \\ -j & -j \\ 1 & -1 \\ -j & j \\ j & j \\ 1 & 1 \\ j & -j \\ 1 & -1 \end{bmatrix}$ $\frac{1}{4}\begin{bmatrix} 1 & 1 \\ -j & -j \\ j & -j \\ 1 & -1 \\ j & j \\ 1 & 1 \\ -1 & 1 \\ j & -j \end{bmatrix}$ |
| $\frac{1}{4}\begin{bmatrix} 1 & 1 \\ 1 & 1 \\ 1 & -1 \\ 1 & -1 \\ -j & -j \\ -j & -j \\ -j & j \\ -j & j \end{bmatrix}$ $\frac{1}{4}\begin{bmatrix} 1 & 1 \\ 1 & 1 \\ j & -j \\ j & -j \\ -j & -j \\ -j & -j \\ 1 & -1 \\ 1 & -1 \end{bmatrix}$ $\frac{1}{4}\begin{bmatrix} 1 & 1 \\ j & j \\ 1 & -1 \\ j & -j \\ -j & -j \\ 1 & 1 \\ -j & j \\ 1 & -1 \end{bmatrix}$ $\frac{1}{4}\begin{bmatrix} 1 & 1 \\ j & j \\ j & -j \\ -1 & 1 \\ -j & -j \\ 1 & 1 \\ 1 & -1 \\ j & -j \end{bmatrix}$ $\frac{1}{4}\begin{bmatrix} 1 & 1 \\ -1 & -1 \\ 1 & -1 \\ -1 & 1 \\ -j & -j \\ j & j \\ -j & j \\ j & -j \end{bmatrix}$ $\frac{1}{4}\begin{bmatrix} 1 & 1 \\ -1 & -1 \\ j & -j \\ -j & j \\ -j & -j \\ j & j \\ 1 & -1 \\ -1 & 1 \end{bmatrix}$ |
| $\frac{1}{4}\begin{bmatrix} 1 & 1 \\ -j & -j \\ 1 & -1 \\ -j & j \\ -j & -j \\ -1 & -1 \\ -j & j \\ -1 & 1 \end{bmatrix}$ $\frac{1}{4}\begin{bmatrix} 1 & 1 \\ -j & -j \\ j & -j \\ 1 & -1 \\ -j & -j \\ -1 & -1 \\ 1 & -1 \\ -j & j \end{bmatrix}$ |

Rank-3 Precoders

TABLE 12

| | Rank-3 precoding matrix with 8-ports | | | |
|---|---|---|---|---|
| Non coherent | $\frac{1}{2}\begin{bmatrix} 1 & 0 & 0 \\ 0 & 1 & 0 \\ 0 & 0 & 1 \\ 0 & 0 & 0 \\ 0 & 0 & 0 \\ 0 & 0 & 0 \\ 0 & 0 & 0 \\ 0 & 0 & 0 \end{bmatrix}$ | $\frac{1}{2}\begin{bmatrix} 0 & 0 & 0 \\ 0 & 0 & 0 \\ 0 & 0 & 0 \\ 0 & 0 & 0 \\ 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 0 & 0 \\ 0 & 0 & 0 \\ 0 & 0 & 0 \\ 0 & 1 & 0 \\ 0 & 0 & 1 \\ 0 & 0 & 0 \\ 0 & 0 & 0 \end{bmatrix}$ | $\frac{1}{2}\begin{bmatrix} 1 & 0 & 0 \\ 0 & 1 & 0 \\ 0 & 0 & 0 \\ 0 & 0 & 0 \\ 0 & 0 & 1 \\ 0 & 0 & 0 \\ 0 & 0 & 0 \\ 0 & 0 & 0 \end{bmatrix}$ |
| Partial coherent | $\frac{1}{2}\begin{bmatrix} 1 & 0 & 0 \\ 0 & 1 & 0 \\ 1 & 0 & 0 \\ 0 & 0 & 1 \\ 0 & 0 & 0 \\ 0 & 0 & 0 \\ 0 & 0 & 0 \\ 0 & 0 & 0 \end{bmatrix}$ | $\frac{1}{2}\begin{bmatrix} 1 & 0 & 0 \\ 0 & 1 & 0 \\ -1 & 0 & 0 \\ 0 & 0 & 1 \\ 0 & 0 & 0 \\ 0 & 0 & 0 \\ 0 & 0 & 0 \\ 0 & 0 & 0 \end{bmatrix}$ | $\frac{1}{2}\begin{bmatrix} 0 & 0 & 0 \\ 0 & 0 & 0 \\ 0 & 0 & 0 \\ 0 & 0 & 0 \\ 1 & 0 & 0 \\ 0 & 1 & 0 \\ 1 & 0 & 0 \\ 0 & 0 & 1 \end{bmatrix}$ | $\frac{1}{2}\begin{bmatrix} 0 & 0 & 0 \\ 0 & 0 & 0 \\ 0 & 0 & 0 \\ 0 & 0 & 0 \\ 1 & 0 & 0 \\ 0 & 1 & 0 \\ -1 & 0 & 0 \\ 0 & 0 & 1 \end{bmatrix}$ |

TABLE 12-continued

| | Rank-3 precoding matrix with 8-ports | | | |
|---|---|---|---|---|
| Partial coherent | $\frac{1}{\sqrt{6}}\begin{bmatrix}1&0&0\\0&1&0\\0&0&1\\0&0&0\\1&0&0\\0&1&0\\0&0&1\\0&0&0\end{bmatrix}$ | $\frac{1}{\sqrt{6}}\begin{bmatrix}1&0&0\\0&1&0\\0&0&1\\0&0&0\\-1&0&0\\0&-1&0\\0&0&-1\\0&0&0\end{bmatrix}$ | $\frac{1}{\sqrt{6}}\begin{bmatrix}1&0&0\\0&1&0\\0&0&1\\0&0&0\\j&0&0\\0&j&0\\0&0&j\\0&0&0\end{bmatrix}$ | $\frac{1}{\sqrt{6}}\begin{bmatrix}1&0&0\\0&1&0\\0&0&1\\0&0&0\\-j&0&0\\0&-j&0\\0&0&-j\\0&0&0\end{bmatrix}$ |
| Partial coherent | $\frac{1}{2\sqrt{3}}\begin{bmatrix}1&1&1\\1&-1&1\\1&1&-1\\1&-1&-1\\0&0&0\\0&0&0\\0&0&0\\0&0&0\end{bmatrix}$ | $\frac{1}{2\sqrt{3}}\begin{bmatrix}1&1&1\\1&-1&1\\j&j&-j\\j&-j&-j\\0&0&0\\0&0&0\\0&0&0\\0&0&0\end{bmatrix}$ | $\frac{1}{2\sqrt{3}}\begin{bmatrix}1&1&1\\-1&1&-1\\1&1&-1\\-1&1&1\\0&0&0\\0&0&0\\0&0&0\\0&0&0\end{bmatrix}$ | $\frac{1}{2\sqrt{3}}\begin{bmatrix}1&1&1\\-1&1&-1\\j&j&-j\\-j&j&j\\0&0&0\\0&0&0\\0&0&0\\0&0&0\end{bmatrix}$ |
| | $\frac{1}{2\sqrt{3}}\begin{bmatrix}0&0&0\\0&0&0\\0&0&0\\0&0&0\\1&1&1\\1&-1&1\\1&1&-1\\1&-1&-1\end{bmatrix}$ | $\frac{1}{2\sqrt{3}}\begin{bmatrix}0&0&0\\0&0&0\\0&0&0\\0&0&0\\1&1&1\\1&-1&1\\j&j&-j\\j&-j&-j\end{bmatrix}$ | $\frac{1}{2\sqrt{3}}\begin{bmatrix}0&0&0\\0&0&0\\0&0&0\\0&0&0\\1&1&1\\-1&1&-1\\1&1&-1\\-1&1&1\end{bmatrix}$ | $\frac{1}{2\sqrt{3}}\begin{bmatrix}0&0&0\\0&0&0\\0&0&0\\0&0&0\\1&1&1\\-1&1&-1\\j&j&-j\\-j&j&j\end{bmatrix}$ |
| Partial coherent | $\frac{1}{2\sqrt{2}}\begin{bmatrix}1&0&0\\0&1&0\\1&0&0\\0&0&1\\1&0&0\\0&1&0\\1&0&0\\0&0&1\end{bmatrix}$ | $\frac{1}{2\sqrt{2}}\begin{bmatrix}1&0&0\\0&1&0\\1&0&0\\0&0&1\\-1&0&0\\0&-1&0\\-1&0&0\\0&0&-1\end{bmatrix}$ | $\frac{1}{2\sqrt{2}}\begin{bmatrix}1&0&0\\0&1&0\\1&0&0\\0&0&1\\j&0&0\\0&j&0\\j&0&0\\0&0&j\end{bmatrix}$ | $\frac{1}{2\sqrt{2}}\begin{bmatrix}1&0&0\\0&1&0\\1&0&0\\0&0&1\\-j&0&0\\0&-j&0\\-j&0&0\\0&0&-j\end{bmatrix}$ |
| | $\frac{1}{2\sqrt{2}}\begin{bmatrix}1&0&0\\0&1&0\\-1&0&0\\0&0&1\\1&0&0\\0&1&0\\-1&0&0\\0&0&1\end{bmatrix}$ | $\frac{1}{2\sqrt{2}}\begin{bmatrix}1&0&0\\0&1&0\\-1&0&0\\0&0&1\\-1&0&0\\0&-1&0\\1&0&0\\0&0&-1\end{bmatrix}$ | $\frac{1}{2\sqrt{2}}\begin{bmatrix}1&0&0\\0&1&0\\-1&0&0\\0&0&1\\j&0&0\\0&j&0\\-j&0&0\\0&0&j\end{bmatrix}$ | $\frac{1}{2\sqrt{2}}\begin{bmatrix}1&0&0\\0&1&0\\-1&0&0\\0&0&1\\-j&0&0\\0&-j&0\\j&0&0\\0&0&-j\end{bmatrix}$ |
| Full coherent | $\frac{1}{2\sqrt{6}}\begin{bmatrix}1&1&1\\1&-1&1\\1&1&-1\\1&-1&-1\\1&1&1\\1&-1&1\\1&1&-1\\1&-1&-1\end{bmatrix}$ | $\frac{1}{2\sqrt{6}}\begin{bmatrix}1&1&1\\1&-1&1\\j&j&-j\\j&-j&-j\\1&1&1\\1&-1&1\\j&j&-j\\j&-j&-j\end{bmatrix}$ | $\frac{1}{2\sqrt{6}}\begin{bmatrix}1&1&1\\-1&1&-1\\1&1&-1\\-1&1&1\\1&1&1\\-1&1&-1\\1&1&-1\\-1&1&1\end{bmatrix}$ | $\frac{1}{2\sqrt{6}}\begin{bmatrix}1&1&1\\-1&1&-1\\j&j&-j\\-j&j&j\\1&1&1\\-1&1&-1\\j&j&-j\\-j&j&j\end{bmatrix}$ |
| | $\frac{1}{2\sqrt{6}}\begin{bmatrix}1&1&1\\1&-1&1\\1&1&-1\\1&-1&-1\\-1&-1&-1\\-1&1&-1\\-1&-1&1\\-1&1&1\end{bmatrix}$ | $\frac{1}{2\sqrt{6}}\begin{bmatrix}1&1&1\\1&-1&1\\j&j&-j\\j&-j&-j\\-1&-1&-1\\-1&1&-1\\-j&-j&j\\-j&j&j\end{bmatrix}$ | $\frac{1}{2\sqrt{6}}\begin{bmatrix}1&1&1\\-1&1&-1\\1&1&-1\\-1&1&1\\-1&-1&-1\\1&-1&1\\-1&-1&1\\1&-1&-1\end{bmatrix}$ | $\frac{1}{2\sqrt{6}}\begin{bmatrix}1&1&1\\-1&1&-1\\j&j&-j\\-j&j&j\\-1&-1&-1\\1&-1&1\\-j&-j&j\\j&-j&-j\end{bmatrix}$ |

TABLE 12-continued

| Rank-3 precoding matrix with 8-ports | | | |
|---|---|---|---|
| $\frac{1}{2\sqrt{6}}\begin{bmatrix}1&1&1\\1&-1&1\\1&1&-1\\1&-1&-1\\j&j&j\\j&-j&j\\j&j&-j\\j&-j&-j\end{bmatrix}$ | $\frac{1}{2\sqrt{6}}\begin{bmatrix}1&1&1\\1&-1&1\\j&j&-j\\j&-j&-j\\j&j&j\\j&-j&j\\-1&-1&1\\-1&1&1\end{bmatrix}$ | $\frac{1}{2\sqrt{6}}\begin{bmatrix}1&1&1\\-1&1&-1\\1&1&-1\\-1&1&1\\j&j&j\\-j&j&-j\\j&j&-j\\-j&j&j\end{bmatrix}$ | $\frac{1}{2\sqrt{6}}\begin{bmatrix}1&1&1\\-1&1&-1\\j&j&-j\\-j&j&j\\j&j&j\\-j&j&-j\\-1&-1&1\\1&-1&-1\end{bmatrix}$ |
| $\frac{1}{2\sqrt{6}}\begin{bmatrix}1&1&1\\1&-1&1\\1&1&-1\\1&-1&-1\\-j&-j&-j\\-j&j&-j\\-j&-j&j\\-j&j&j\end{bmatrix}$ | $\frac{1}{2\sqrt{6}}\begin{bmatrix}1&1&1\\1&-1&1\\j&j&-j\\j&-j&-j\\-j&-j&-j\\-j&j&-j\\1&1&-1\\1&-1&-1\end{bmatrix}$ | $\frac{1}{2\sqrt{6}}\begin{bmatrix}1&1&1\\-1&1&-1\\1&1&-1\\-1&1&1\\-j&-j&-j\\j&-j&j\\-j&-j&j\\j&-j&-j\end{bmatrix}$ | $\frac{1}{2\sqrt{6}}\begin{bmatrix}1&1&1\\-1&1&-1\\j&j&-j\\-j&j&j\\-j&-j&-j\\j&-j&j\\1&1&-1\\-1&1&1\end{bmatrix}$ |

Rank-4 Precoders

TABLE 13

| Rank-4 precoding matrix with 8-ports | | | | |
|---|---|---|---|---|
| Non coherent | $\frac{1}{2}\begin{bmatrix}1&0&0&0\\0&1&0&0\\0&0&1&0\\0&0&0&1\\0&0&0&0\\0&0&0&0\\0&0&0&0\\0&0&0&0\end{bmatrix}$ | $\frac{1}{2}\begin{bmatrix}0&0&0&0\\0&0&0&0\\0&0&0&0\\0&0&0&0\\1&0&0&0\\0&1&0&0\\0&0&1&0\\0&0&0&1\end{bmatrix}$ | | |
| Partial coherent | $\frac{1}{2\sqrt{2}}\begin{bmatrix}1&1&0&0\\0&0&1&1\\1&-1&0&0\\0&0&1&-1\\0&0&0&0\\0&0&0&0\\0&0&0&0\\0&0&0&0\end{bmatrix}$ | $\frac{1}{2\sqrt{2}}\begin{bmatrix}1&1&0&0\\0&0&1&1\\j&-j&0&0\\0&0&j&-j\\0&0&0&0\\0&0&0&0\\0&0&0&0\\0&0&0&0\end{bmatrix}$ | $\frac{1}{2\sqrt{2}}\begin{bmatrix}0&0&0&0\\0&0&0&0\\0&0&0&0\\0&0&0&0\\1&1&0&0\\0&0&1&1\\1&-1&0&0\\0&0&1&-1\end{bmatrix}$ | $\frac{1}{2\sqrt{2}}\begin{bmatrix}0&0&0&0\\0&0&0&0\\0&0&0&0\\0&0&0&0\\1&1&0&0\\0&0&1&1\\j&-j&0&0\\0&0&j&-j\end{bmatrix}$ |
| Partial coherent | $\frac{1}{4}\begin{bmatrix}1&1&1&1\\1&-1&1&-1\\1&1&-1&-1\\1&-1&-1&1\\0&0&0&0\\0&0&0&0\\0&0&0&0\\0&0&0&0\end{bmatrix}$ | $\frac{1}{4}\begin{bmatrix}1&1&1&1\\1&-1&1&-1\\j&j&-j&-j\\j&-j&-j&j\\0&0&0&0\\0&0&0&0\\0&0&0&0\\0&0&0&0\end{bmatrix}$ | $\frac{1}{4}\begin{bmatrix}0&0&0&0\\0&0&0&0\\0&0&0&0\\0&0&0&0\\1&1&1&1\\1&-1&1&-1\\1&1&-1&-1\\1&-1&-1&1\end{bmatrix}$ | $\frac{1}{4}\begin{bmatrix}0&0&0&0\\0&0&0&0\\0&0&0&0\\0&0&0&0\\1&1&1&1\\1&-1&1&-1\\j&j&-j&-j\\j&-j&-j&j\end{bmatrix}$ |
| Partial coherent | $\frac{1}{4}\begin{bmatrix}1&1&0&0\\0&0&1&1\\1&-1&0&0\\0&0&1&-1\\1&1&0&0\\0&0&1&1\\1&-1&0&0\\0&0&1&-1\end{bmatrix}$ | $\frac{1}{4}\begin{bmatrix}1&1&0&0\\0&0&1&1\\1&-1&0&0\\0&0&1&-1\\-1&-1&0&0\\0&0&-1&-1\\-1&1&0&0\\0&0&-1&1\end{bmatrix}$ | $\frac{1}{4}\begin{bmatrix}1&1&0&0\\0&0&1&1\\1&-1&0&0\\0&0&1&-1\\j&j&0&0\\0&0&j&j\\j&-j&0&0\\0&0&j&-j\end{bmatrix}$ | $\frac{1}{4}\begin{bmatrix}1&1&0&0\\0&0&1&1\\1&-1&0&0\\0&0&1&-1\\-j&-j&0&0\\0&0&-j&-j\\-j&j&0&0\\0&0&-j&j\end{bmatrix}$ |
| | $\frac{1}{4}\begin{bmatrix}1&1&0&0\\0&0&1&1\\j&-j&0&0\\0&0&j&-j\\1&1&0&0\\0&0&1&1\\j&-j&0&0\\0&0&j&-j\end{bmatrix}$ | $\frac{1}{4}\begin{bmatrix}1&1&0&0\\0&0&1&1\\j&-j&0&0\\0&0&j&-j\\-1&-1&0&0\\0&0&-1&-1\\-j&j&0&0\\0&0&-j&j\end{bmatrix}$ | $\frac{1}{4}\begin{bmatrix}1&1&0&0\\0&0&1&1\\j&-j&0&0\\0&0&j&-j\\j&j&0&0\\0&0&j&j\\-1&1&0&0\\0&0&-1&1\end{bmatrix}$ | $\frac{1}{4}\begin{bmatrix}1&1&0&0\\0&0&1&1\\j&-j&0&0\\0&0&j&-j\\-j&-j&0&0\\0&0&-j&-j\\1&-1&0&0\\0&0&1&-1\end{bmatrix}$ |

TABLE 13-continued

| Rank-4 precoding matrix with 8-ports | |
|---|---|
| Full coherent | $\frac{1}{4\sqrt{2}}\begin{bmatrix}1&1&1&1\\1&-1&1&-1\\1&1&-1&-1\\1&-1&-1&1\\1&1&1&1\\1&-1&1&-1\\1&1&-1&-1\\1&-1&-1&1\end{bmatrix}$ $\frac{1}{4\sqrt{2}}\begin{bmatrix}1&1&1&1\\1&-1&1&-1\\1&1&-1&-1\\1&-1&-1&1\\-1&-1&-1&-1\\-1&1&-1&1\\-1&-1&1&1\\-1&1&1&-1\end{bmatrix}$ $\frac{1}{4\sqrt{2}}\begin{bmatrix}1&1&1&1\\1&-1&1&-1\\1&1&-1&-1\\1&-1&-1&1\\j&j&j&j\\j&-j&j&-j\\j&j&-j&-j\\j&-j&-j&j\end{bmatrix}$ $\frac{1}{4\sqrt{2}}\begin{bmatrix}1&1&1&1\\1&-1&1&-1\\1&1&-1&-1\\1&-1&-1&1\\-j&-j&-j&-j\\-j&j&-j&j\\-j&-j&j&j\\-j&j&j&-j\end{bmatrix}$ |
| | $\frac{1}{4\sqrt{2}}\begin{bmatrix}1&1&1&1\\1&-1&1&-1\\j&j&-j&-j\\j&-j&-j&j\\1&1&1&1\\1&-1&1&-1\\j&j&-j&-j\\j&-j&-j&j\end{bmatrix}$ $\frac{1}{4\sqrt{2}}\begin{bmatrix}1&1&1&1\\1&-1&1&-1\\j&j&-j&-j\\j&-j&-j&j\\-1&-1&-1&-1\\-1&1&-1&1\\-j&-j&j&j\\-j&j&j&-j\end{bmatrix}$ $\frac{1}{4\sqrt{2}}\begin{bmatrix}1&1&1&1\\1&-1&1&-1\\j&j&-j&-j\\j&-j&-j&j\\j&j&j&j\\j&-j&j&-j\\-1&-1&1&1\\-1&1&1&-1\end{bmatrix}$ $\frac{1}{4\sqrt{2}}\begin{bmatrix}1&1&1&1\\1&-1&1&-1\\j&j&-j&-j\\j&-j&-j&j\\-j&-j&-j&-j\\-j&j&-j&j\\1&1&-1&-1\\1&-1&-1&1\end{bmatrix}$ |

Rank-5 Precoders

TABLE 14

| Rank-5 precoding matrix with 8-ports | |
|---|---|
| Non coherent | $\frac{1}{\sqrt{5}}\begin{bmatrix}1&0&0&0&0\\0&1&0&0&0\\0&0&1&0&0\\0&0&0&1&0\\0&0&0&0&1\\0&0&0&0&0\\0&0&0&0&0\\0&0&0&0&0\end{bmatrix}$ |
| Partial coherent | $\frac{1}{\sqrt{10}}\begin{bmatrix}1&1&0&0&0\\0&0&1&1&0\\1&-1&0&0&0\\0&0&1&-1&0\\0&0&0&0&1\\0&0&0&0&0\\0&0&0&0&1\\0&0&0&0&0\end{bmatrix}$ $\frac{1}{\sqrt{10}}\begin{bmatrix}1&1&0&0&0\\0&0&1&1&0\\j&-j&0&0&0\\0&0&j&-j&0\\0&0&0&0&1\\0&0&0&0&0\\0&0&0&0&j\\0&0&0&0&0\end{bmatrix}$ |
| Partial coherent | $\frac{1}{2\sqrt{5}}\begin{bmatrix}1&1&1&1&0\\1&-1&1&-1&0\\1&1&-1&-1&0\\1&-1&-1&1&0\\0&0&0&0&1\\0&0&0&0&1\\0&0&0&0&1\\0&0&0&0&1\end{bmatrix}$ $\frac{1}{2\sqrt{5}}\begin{bmatrix}1&1&1&1&0\\1&-1&1&-1&0\\j&j&-j&-j&0\\j&-j&-j&j&0\\0&0&0&0&1\\0&0&0&0&1\\0&0&0&0&j\\0&0&0&0&j\end{bmatrix}$ |
| | $\frac{1}{2\sqrt{5}}\begin{bmatrix}1&1&0&0&1\\0&0&1&1&0\\1&-1&0&0&1\\0&0&1&-1&0\\1&1&0&0&-1\\0&0&1&1&0\\1&-1&0&0&-1\\0&0&1&-1&0\end{bmatrix}$ $\frac{1}{2\sqrt{5}}\begin{bmatrix}1&1&0&0&1\\0&0&1&1&0\\j&-j&0&0&j\\0&0&j&-j&0\\1&1&0&0&-1\\0&0&1&1&0\\j&-j&0&0&-j\\0&0&j&-j&0\end{bmatrix}$ |

TABLE 14-continued

| Rank-5 precoding matrix with 8-ports | |
|---|---|
| | $\frac{1}{2\sqrt{5}}\begin{bmatrix}1&1&0&0&1\\0&0&1&1&0\\1&-1&0&0&1\\0&0&1&-1&0\\j&j&0&0&-j\\0&0&j&j&0\\j&-j&0&0&-j\\0&0&j&-j&0\end{bmatrix}$ $\frac{1}{2\sqrt{5}}\begin{bmatrix}1&1&0&0&1\\0&0&1&1&0\\j&-j&0&0&j\\0&0&j&-j&0\\j&j&0&0&-j\\0&0&j&j&0\\-1&1&0&0&1\\0&0&-1&1&0\end{bmatrix}$ |
| Full coherent | $\frac{1}{2\sqrt{10}}\begin{bmatrix}1&1&1&1&1\\1&-1&1&-1&1\\1&1&-1&-1&1\\1&-1&-1&1&1\\1&1&1&1&-1\\1&-1&1&-1&-1\\1&1&-1&-1&-1\\1&-1&-1&1&-1\end{bmatrix}$ $\frac{1}{2\sqrt{10}}\begin{bmatrix}1&1&1&1&1\\1&-1&1&-1&1\\j&j&-j&-j&j\\j&-j&-j&j&j\\1&1&1&1&-1\\1&-1&1&-1&-1\\j&j&-j&-j&-j\\j&-j&-j&j&-j\end{bmatrix}$ |
| | $\frac{1}{2\sqrt{10}}\begin{bmatrix}1&1&1&1&1\\1&-1&1&-1&1\\1&1&-1&-1&1\\1&-1&-1&1&1\\j&j&j&j&-j\\j&-j&j&-j&-j\\j&j&-j&-j&-j\\j&-j&-j&j&-j\end{bmatrix}$ $\frac{1}{2\sqrt{10}}\begin{bmatrix}1&1&1&1&1\\1&-1&1&-1&1\\j&j&-j&-j&j\\j&-j&-j&j&j\\j&j&j&j&-j\\j&-j&j&-j&-j\\-1&-1&1&1&1\\-1&1&1&-1&1\end{bmatrix}$ |

Rank-6 Precoders

TABLE 15

| Rank-6 precoding matrix with 8-ports | | |
|---|---|---|
| Non coherent | $\frac{1}{\sqrt{6}}\begin{bmatrix} 1&0&0&0&0&0\\ 0&1&0&0&0&0\\ 0&0&1&0&0&0\\ 0&0&0&1&0&0\\ 0&0&0&0&1&0\\ 0&0&0&0&0&1\\ 0&0&0&0&0&0\\ 0&0&0&0&0&0 \end{bmatrix}$ | |
| Partial coherent | $\frac{1}{2\sqrt{3}}\begin{bmatrix} 1&1&0&0&0&0\\ 0&0&1&1&0&0\\ 1&-1&0&0&0&0\\ 0&0&1&-1&0&0\\ 0&0&0&0&1&1\\ 0&0&0&0&0&0\\ 0&0&0&0&1&-1\\ 0&0&0&0&0&0 \end{bmatrix}$ | $\frac{1}{2\sqrt{3}}\begin{bmatrix} 1&1&0&0&0&0\\ 0&0&1&1&0&0\\ j&-j&0&0&0&0\\ 0&0&j&-j&0&0\\ 0&0&0&0&1&1\\ 0&0&0&0&0&0\\ 0&0&0&0&j&-j\\ 0&0&0&0&0&0 \end{bmatrix}$ |
| Partial coherent | $\frac{1}{2\sqrt{6}}\begin{bmatrix} 1&1&1&1&0&0\\ 1&-1&1&-1&0&0\\ 1&1&-1&-1&0&0\\ 1&-1&-1&1&0&0\\ 0&0&0&0&1&1\\ 0&0&0&0&1&-1\\ 0&0&0&0&1&1\\ 0&0&0&0&1&-1 \end{bmatrix}$ | $\frac{1}{2\sqrt{6}}\begin{bmatrix} 1&1&1&1&0&0\\ 1&-1&1&-1&0&0\\ j&j&-j&-j&0&0\\ j&-j&-j&j&0&0\\ 0&0&0&0&1&1\\ 0&0&0&0&1&-1\\ 0&0&0&0&j&j\\ 0&0&0&0&j&-j \end{bmatrix}$ |
| | $\frac{1}{2\sqrt{6}}\begin{bmatrix} 1&1&0&0&1&1\\ 0&0&1&1&0&0\\ 1&-1&0&0&1&-1\\ 0&0&1&-1&0&0\\ 1&1&0&0&-1&-1\\ 0&0&1&1&0&0\\ 1&-1&0&0&-1&1\\ 0&0&1&-1&0&0 \end{bmatrix}$ | $\frac{1}{2\sqrt{6}}\begin{bmatrix} 1&1&0&0&1&1\\ 0&0&1&1&0&0\\ j&-j&0&0&j&-j\\ 0&0&j&-j&0&0\\ 1&1&0&0&-1&-1\\ 0&0&1&1&0&0\\ j&-j&0&0&-j&j\\ 0&0&j&-j&0&0 \end{bmatrix}$ |
| | $\frac{1}{2\sqrt{6}}\begin{bmatrix} 1&1&0&0&1&1\\ 0&0&1&1&0&0\\ 1&-1&0&0&1&-1\\ 0&0&1&-1&0&0\\ j&j&0&0&-j&-j\\ 0&0&j&j&0&0\\ j&-j&0&0&-j&j\\ 0&0&j&-j&0&0 \end{bmatrix}$ | $\frac{1}{2\sqrt{6}}\begin{bmatrix} 1&1&0&0&1&1\\ 0&0&1&1&0&0\\ j&-j&0&0&j&-j\\ 0&0&j&-j&0&0\\ j&j&0&0&-j&-j\\ 0&0&j&j&0&0\\ -1&1&0&0&1&-1\\ 0&0&-1&1&0&0 \end{bmatrix}$ |
| Full coherent | $\frac{1}{4\sqrt{3}}\begin{bmatrix} 1&1&1&1&1&1\\ 1&-1&1&-1&1&-1\\ 1&1&-1&-1&1&1\\ 1&-1&-1&1&1&-1\\ 1&1&1&1&-1&-1\\ 1&-1&1&-1&-1&1\\ 1&1&-1&-1&-1&-1\\ 1&-1&-1&1&-1&1 \end{bmatrix}$ | $\frac{1}{4\sqrt{3}}\begin{bmatrix} 1&1&1&1&1&1\\ 1&-1&1&-1&1&-1\\ j&j&-j&-j&j&j\\ j&-j&-j&j&j&-j\\ 1&1&1&1&-1&-1\\ 1&-1&1&-1&-1&1\\ j&j&-j&-j&-j&-j\\ j&-j&-j&j&-j&j \end{bmatrix}$ |
| | $\frac{1}{4\sqrt{3}}\begin{bmatrix} 1&1&1&1&1&1\\ 1&-1&1&-1&1&-1\\ 1&1&-1&-1&1&1\\ 1&-1&-1&1&1&-1\\ j&j&j&j&-j&-j\\ j&-j&j&-j&-j&j\\ j&j&-j&-j&-j&-j\\ j&-j&-j&j&-j&j \end{bmatrix}$ | $\frac{1}{4\sqrt{3}}\begin{bmatrix} 1&1&1&1&1&1\\ 1&-1&1&-1&1&-1\\ 1&1&-j&-j&j&j\\ j&-j&-j&j&j&-j\\ j&j&j&j&-j&-j\\ j&-j&j&-j&-j&j\\ -1&-1&1&1&1&1\\ -1&1&1&-1&1&-1 \end{bmatrix}$ |

Rank-7 Precoders

TABLE 16

| | Rank-7 precoding matrix with 8-ports | |
|---|---|---|
| Non coherent | $\frac{1}{\sqrt{7}}\begin{bmatrix} 1 & 0 & 0 & 0 & 0 & 0 & 0 \\ 0 & 1 & 0 & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 1 \\ 0 & 0 & 0 & 0 & 0 & 0 & 0 \end{bmatrix}$ | |
| Partial coherent | $\frac{1}{\sqrt{14}}\begin{bmatrix} 1 & 1 & 0 & 0 & 0 & 0 & 0 \\ 0 & 0 & 1 & 1 & 0 & 0 & 0 \\ 1 & -1 & 0 & 0 & 0 & 0 & 0 \\ 0 & 0 & 1 & -1 & 0 & 0 & 0 \\ 0 & 0 & 0 & 0 & 1 & 1 & 0 \\ 0 & 0 & 0 & 0 & 0 & 0 & 1 \\ 0 & 0 & 0 & 0 & 1 & -1 & 0 \\ 0 & 0 & 0 & 0 & 0 & 0 & 1 \end{bmatrix}$ | $\frac{1}{\sqrt{14}}\begin{bmatrix} 1 & 1 & 0 & 0 & 0 & 0 & 0 \\ 0 & 0 & 1 & 1 & 0 & 0 & 0 \\ j & -j & 0 & 0 & 0 & 0 & 0 \\ 0 & 0 & j & -j & 0 & 0 & 0 \\ 0 & 0 & 0 & 0 & 1 & 1 & 0 \\ 0 & 0 & 0 & 0 & 0 & 0 & 1 \\ 0 & 0 & 0 & 0 & j & -j & 0 \\ 0 & 0 & 0 & 0 & 0 & 0 & j \end{bmatrix}$ |
| Partial coherent | $\frac{1}{2\sqrt{7}}\begin{bmatrix} 1 & 1 & 1 & 1 & 0 & 0 & 0 \\ 1 & -1 & 1 & -1 & 0 & 0 & 0 \\ 1 & 1 & -1 & -1 & 0 & 0 & 0 \\ 1 & -1 & -1 & 1 & 0 & 0 & 0 \\ 0 & 0 & 0 & 0 & 1 & 1 & 1 \\ 0 & 0 & 0 & 0 & 1 & -1 & 1 \\ 0 & 0 & 0 & 0 & 1 & 1 & -1 \\ 0 & 0 & 0 & 0 & 1 & -1 & -1 \end{bmatrix}$ | $\frac{1}{2\sqrt{7}}\begin{bmatrix} 1 & 1 & 1 & 1 & 0 & 0 & 0 \\ 1 & -1 & 1 & -1 & 0 & 0 & 0 \\ j & j & -j & -j & 0 & 0 & 0 \\ j & -j & -j & j & 0 & 0 & 0 \\ 0 & 0 & 0 & 0 & 1 & 1 & 1 \\ 0 & 0 & 0 & 0 & 1 & -1 & 1 \\ 0 & 0 & 0 & 0 & j & j & -j \\ 0 & 0 & 0 & 0 & j & -j & -j \end{bmatrix}$ |
| | $\frac{1}{2\sqrt{7}}\begin{bmatrix} 1 & 1 & 0 & 0 & 1 & 1 & 0 \\ 0 & 0 & 1 & 1 & 0 & 0 & 1 \\ 1 & -1 & 0 & 0 & 1 & -1 & 0 \\ 0 & 0 & 1 & -1 & 0 & 0 & 1 \\ 1 & 1 & 0 & 0 & -1 & -1 & 0 \\ 0 & 0 & 1 & 1 & 0 & 0 & -1 \\ 1 & -1 & 0 & 0 & -1 & 1 & 0 \\ 0 & 0 & 1 & -1 & 0 & 0 & -1 \end{bmatrix}$ | $\frac{1}{2\sqrt{7}}\begin{bmatrix} 1 & 1 & 0 & 0 & 1 & 1 & 0 \\ 0 & 0 & 1 & 1 & 0 & 0 & 1 \\ j & -j & 0 & 0 & j & -j & 0 \\ 0 & 0 & j & -j & 0 & 0 & j \\ 1 & 1 & 0 & 0 & -1 & -1 & 0 \\ 0 & 0 & 1 & 1 & 0 & 0 & -1 \\ j & -j & 0 & 0 & -j & j & 0 \\ 0 & 0 & j & -j & 0 & 0 & -j \end{bmatrix}$ |
| | $\frac{1}{2\sqrt{7}}\begin{bmatrix} 1 & 1 & 0 & 0 & 1 & 1 & 0 \\ 0 & 0 & 1 & 1 & 0 & 0 & 1 \\ 1 & -1 & 0 & 0 & 1 & -1 & 0 \\ 0 & 0 & 1 & -1 & 0 & 0 & 1 \\ j & j & 0 & 0 & -j & -j & 0 \\ 0 & 0 & j & j & 0 & 0 & -j \\ j & -j & 0 & 0 & -j & j & 0 \\ 0 & 0 & j & -j & 0 & 0 & -j \end{bmatrix}$ | $\frac{1}{2\sqrt{7}}\begin{bmatrix} 1 & 1 & 0 & 0 & 1 & 1 & 0 \\ 0 & 0 & 1 & 1 & 0 & 0 & 1 \\ j & -j & 0 & 0 & j & -j & 0 \\ 0 & 0 & j & -j & 0 & 0 & j \\ j & j & 0 & 0 & -j & -j & 0 \\ 0 & 0 & j & j & 0 & 0 & -j \\ -1 & 1 & 0 & 0 & 1 & -1 & 0 \\ 0 & 0 & -1 & 1 & 0 & 0 & 1 \end{bmatrix}$ |
| Full coherent | $\frac{1}{2\sqrt{14}}\begin{bmatrix} 1 & 1 & 1 & 1 & 1 & 1 & 1 \\ 1 & -1 & 1 & -1 & 1 & -1 & 1 \\ 1 & 1 & -1 & -1 & 1 & 1 & -1 \\ 1 & -1 & -1 & 1 & 1 & -1 & -1 \\ 1 & 1 & 1 & 1 & -1 & -1 & -1 \\ 1 & -1 & 1 & -1 & -1 & 1 & -1 \\ 1 & 1 & -1 & -1 & -1 & -1 & 1 \\ 1 & -1 & -1 & 1 & -1 & 1 & 1 \end{bmatrix}$ | $\frac{1}{2\sqrt{14}}\begin{bmatrix} 1 & 1 & 1 & 1 & 1 & 1 & 1 \\ 1 & -1 & 1 & -1 & 1 & -1 & 1 \\ j & j & -j & -j & j & j & -j \\ j & -j & -j & j & j & -j & -j \\ 1 & 1 & 1 & 1 & -1 & -1 & -1 \\ 1 & -1 & 1 & -1 & -1 & 1 & -1 \\ j & j & -j & -j & -j & -j & j \\ j & -j & -j & j & -j & j & j \end{bmatrix}$ |
| | $\frac{1}{2\sqrt{14}}\begin{bmatrix} 1 & 1 & 1 & 1 & 1 & 1 & 1 \\ 1 & -1 & 1 & -1 & 1 & -1 & 1 \\ 1 & 1 & -1 & -1 & 1 & 1 & -1 \\ 1 & -1 & -1 & 1 & 1 & -1 & -1 \\ j & j & j & j & -j & -j & -j \\ j & -j & j & -j & -j & j & -j \\ j & j & -j & -j & -j & -j & j \\ j & -j & -j & j & -j & j & j \end{bmatrix}$ | $\frac{1}{2\sqrt{14}}\begin{bmatrix} 1 & 1 & 1 & 1 & 1 & 1 & 1 \\ 1 & -1 & 1 & -1 & 1 & -1 & 1 \\ j & j & -j & -j & j & j & -j \\ j & -j & -j & j & j & -j & -j \\ j & j & j & j & -j & -j & -j \\ j & -j & j & -j & -j & j & -j \\ -1 & -1 & 1 & 1 & 1 & 1 & -1 \\ -1 & 1 & 1 & -1 & 1 & -1 & -1 \end{bmatrix}$ |

Rank-8 Precoders

TABLE 17

| Rank-8 precoding matrix with 8-ports | | |
|---|---|---|
| Non coherent | $\frac{1}{2\sqrt{2}}\begin{bmatrix} 1&0&0&0&0&0&0&0\\ 0&1&0&0&0&0&0&0\\ 0&0&1&0&0&0&0&0\\ 0&0&0&1&0&0&0&0\\ 0&0&0&0&1&0&0&0\\ 0&0&0&0&0&1&0&0\\ 0&0&0&0&0&0&1&0\\ 0&0&0&0&0&0&0&1 \end{bmatrix}$ | |
| Partial coherent | $\frac{1}{4}\begin{bmatrix} 1&1&0&0&0&0&0&0\\ 0&0&1&1&0&0&0&0\\ 1&-1&0&0&0&0&0&0\\ 0&0&1&-1&0&0&0&0\\ 0&0&0&0&1&1&0&0\\ 0&0&0&0&0&0&1&1\\ 0&0&0&0&1&-1&0&0\\ 0&0&0&0&0&0&1&-1 \end{bmatrix}$ | $\frac{1}{4}\begin{bmatrix} 1&1&0&0&0&0&0&0\\ 0&0&1&1&0&0&0&0\\ j&-j&0&0&0&0&0&0\\ 0&0&j&-j&0&0&0&0\\ 0&0&0&0&1&1&0&0\\ 0&0&0&0&0&0&1&1\\ 0&0&0&0&j&-j&0&0\\ 0&0&0&0&0&0&j&-j \end{bmatrix}$ |
| Partial coherent | $\frac{1}{4\sqrt{2}}\begin{bmatrix} 1&1&1&1&0&0&0&0\\ 1&-1&1&-1&0&0&0&0\\ 1&1&-1&-1&0&0&0&0\\ 1&-1&-1&1&0&0&0&0\\ 0&0&0&0&1&1&1&1\\ 0&0&0&0&1&-1&1&-1\\ 0&0&0&0&1&1&-1&-1\\ 0&0&0&0&1&-1&-1&1 \end{bmatrix}$ | $\frac{1}{4\sqrt{2}}\begin{bmatrix} 1&1&1&1&0&0&0&0\\ 1&-1&1&-1&0&0&0&0\\ j&j&-j&-j&0&0&0&0\\ j&-j&-j&j&0&0&0&0\\ 0&0&0&0&1&1&1&1\\ 0&0&0&0&1&-1&1&-1\\ 0&0&0&0&j&j&-j&-j\\ 0&0&0&0&j&-j&-j&j \end{bmatrix}$ |
| | $\frac{1}{4\sqrt{2}}\begin{bmatrix} 1&1&0&0&1&1&0&0\\ 0&0&1&1&0&0&1&1\\ 1&-1&0&0&1&-1&0&0\\ 0&0&1&-1&0&0&1&-1\\ 1&1&0&0&-1&-1&0&0\\ 0&0&1&1&0&0&-1&-1\\ 1&-1&0&0&-1&1&0&0\\ 0&0&1&-1&0&0&-1&1 \end{bmatrix}$ | $\frac{1}{4\sqrt{2}}\begin{bmatrix} 1&1&0&0&1&1&0&0\\ 0&0&1&1&0&0&1&1\\ j&-j&0&0&j&-j&0&0\\ 0&0&j&-j&0&0&j&-j\\ 1&1&0&0&-1&-1&0&0\\ 0&0&1&1&0&0&-1&-1\\ j&-j&0&0&-j&j&0&0\\ 0&0&j&-j&0&0&-j&j \end{bmatrix}$ |
| | $\frac{1}{4\sqrt{2}}\begin{bmatrix} 1&1&0&0&1&1&0&0\\ 0&0&1&1&0&0&1&1\\ 1&-1&0&0&1&-1&0&0\\ 0&0&1&-1&0&0&1&-1\\ j&j&0&0&-j&-j&0&0\\ 0&0&j&j&0&0&-j&-j\\ j&-j&0&0&-j&j&0&0\\ 0&0&j&-j&0&0&-j&j \end{bmatrix}$ | $\frac{1}{4\sqrt{2}}\begin{bmatrix} 1&1&0&0&1&1&0&0\\ 0&0&1&1&0&0&1&1\\ j&-j&0&0&j&-j&0&0\\ 0&0&j&-j&0&0&j&-j\\ j&j&0&0&-j&-j&0&0\\ 0&0&j&j&0&0&-j&-j\\ -1&1&0&0&1&-1&0&0\\ 0&0&-1&1&0&0&1&-1 \end{bmatrix}$ |
| Full coherent | $\frac{1}{8}\begin{bmatrix} 1&1&1&1&1&1&1&1\\ 1&-1&1&-1&1&-1&1&-1\\ 1&1&-1&-1&1&1&-1&-1\\ 1&-1&-1&1&1&-1&-1&1\\ 1&1&1&1&-1&-1&-1&-1\\ 1&-1&1&-1&-1&1&-1&1\\ 1&1&-1&-1&-1&-1&1&1\\ 1&-1&-1&1&-1&1&1&-1 \end{bmatrix}$ | $\frac{1}{8}\begin{bmatrix} 1&1&1&1&1&1&1&1\\ 1&-1&1&-1&1&-1&1&-1\\ j&j&-j&-j&j&j&-j&-j\\ j&-j&-j&j&j&-j&-j&j\\ 1&1&1&1&-1&-1&-1&-1\\ 1&-1&1&-1&-1&1&-1&1\\ j&j&-j&-j&-j&-j&j&j\\ j&-j&-j&j&-j&j&j&-j \end{bmatrix}$ |
| | $\frac{1}{8}\begin{bmatrix} 1&1&1&1&1&1&1&1\\ 1&-1&1&-1&1&-1&1&-1\\ 1&1&-1&-1&1&1&-1&-1\\ 1&-1&-1&1&1&-1&-1&1\\ j&j&j&j&-j&-j&-j&-j\\ j&-j&j&-j&-j&j&-j&j\\ j&j&-j&-j&-j&-j&j&j\\ j&-j&-j&j&-j&j&j&-j \end{bmatrix}$ | $\frac{1}{8}\begin{bmatrix} 1&1&1&1&1&1&1&1\\ 1&-1&1&-1&1&-1&1&-1\\ j&j&-j&-j&j&j&-j&-j\\ j&-j&-j&j&j&-j&-j&j\\ j&j&j&j&-j&-j&-j&-j\\ j&-j&j&-j&-j&j&-j&j\\ -1&-1&1&1&1&1&-1&-1\\ -1&1&1&-1&1&-1&-1&1 \end{bmatrix}$ |

Enhanced Coherence and Full Power Operation

As above, in codebook-based PUSCH transmission, a UE different coherence, including maintaining the relative phase among all (full coherence), a subset (partial coherence), or none (non-coherence) of the transmit chains/antenna ports over time.

In Rel-15, the UE may be configured to operate with a subset of precoders in the UL codebook according to the reported coherence capability. A UE capable of 'fullCoherent' transmission may be configured with codebook subset of 'fullAndPartialAndNonCoherent', 'partialAndNonCoherent', or 'nonCoherent'. A UE capable of 'partialCoherent' transmission may be configured with codebook subset of 'partialAndNonCoherent' or 'nonCoherent'. A UE capable of 'nonCoherent' transmission may be configured with codebook subset of 'nonCoherent'.

The UE may report its coherence capability as shown by pusch-TransCoherence below:

```
MIMO-ParametersPerBand ::= SEQUENCE {
  tci-StatePDSCH                  SEQUENCE {
    maxNumberConfiguredTCIstatesPerCC   ENUMERATED {n4, n8, n16, n32, n64,
n128}  OPTIONAL,
    maxNumberActiveTCI-PerBWP          ENUMERATED {n1, n2, n4, n8}          OPTIONAL
  }                                      OPTIONAL,
  additionalActiveTCI-StatePDCCH  ENUMERATED {supported}                   OPTIONAL,
  pusch-TransCoherence              ENUMERATED {nonCoherent,
                                  partialNonCoherent,
                                  fullCoherent}                        OPTIONAL,
  beamCorrespondence                ENUMERATED {supported}                OPTIONAL,
  periodicBeamReport              ENUMERATED {supported}                OPTIONAL,
  aperiodicBeamReport               ENUMERATED {supported}                OPTIONAL,
  sp-BeamReportPUCCH                    ENUMERATED {supported}              OPTIONAL,
  sp-BeamReportPUSCH                    ENUMERATED {supported}              OPTIONAL,
  dummy1                          dummyG                               OPTIONAL,
  maxNumberRxBeam                     INTEGER (2..8)                    OPTIONAL,
  ...
}
```

In Rel-16, full power operation is supported including full power Mode 0, full power Mode 1, and full power Mode 2 as described above. The UE reports its capability on full power operation (whether full power Mode 0, Mode 1, or Mode 2 is supported). However, the UE coherence capability and full power capability do not consider different capabilities for different numbers of antenna ports. When the UE supports a maximum number of antenna ports of 8, the gNB may configure the UE with 4-port operation. In this case, the UE coherence capability and full power capability may be enhanced, i.e., the coherence and/or full power capability may be different for different numbers of antenna ports.

Enhanced Coherence Operation

In an embodiment, the UE coherence capability is reported for each number of antenna ports supported by the UE or a subset of the number of antenna ports supported by the UE. For different number of antenna ports, the coherence capability may be the same or different.

Assuming the maximum number of antenna ports supported by the UE is $P_{Max}$, e.g., $P_{Max}$=8, then the UE may report coherence capability for 8 ports, (6 ports, which may not be reported if 6 port is not supported), 4 ports, and 2 ports. The coherence capability for P={8, 4, 2} may be the same or different, where P is the number of ports.

When the gNB configures a codebook subset, the same or different codebook subsets may be configured to the UE for difference numbers of ports depending on the UE capability. One or multiple codebook subsets may be configured to the UE simultaneously. When multiple codebook subsets are configured, the codebook subsets may be the same or different for different numbers of ports.

In a first example, the UE may report full coherence for P={8, 4, 2}.

In a second example, the UE may report non-coherence for P={8, 4, 2}.

Figure 12:
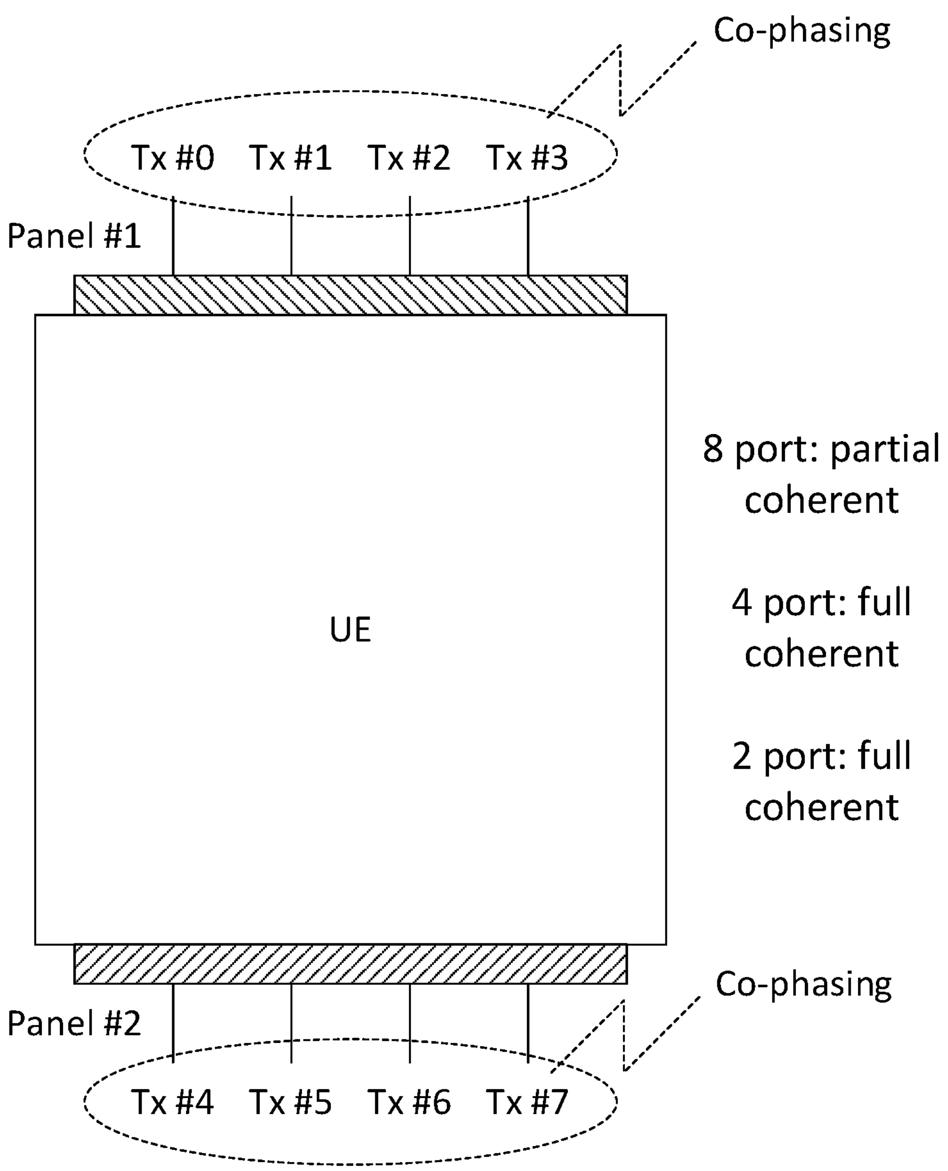
FIG. 12 illustrates a UE with port-dependent coherence in accordance with some embodiments.

In a third example, the UE may report partial coherence for P={8}, and report full coherence for P={4, 2}. FIG. 12 illustrates a UE with port-dependent coherence in accordance with some embodiments, in particular the third example. The number of co-phasing ports (i.e., co-phasing ports means the ports that the UE can maintain relative phase) is 4. The 1st four ports (port #0 to #3) are co-phasing, and the second four ports (port #4 to #7) are co-phasing. For 8-ports, the UE is partial coherent. For 4-port and 2-port, the UE is full coherent.

Figure 13:
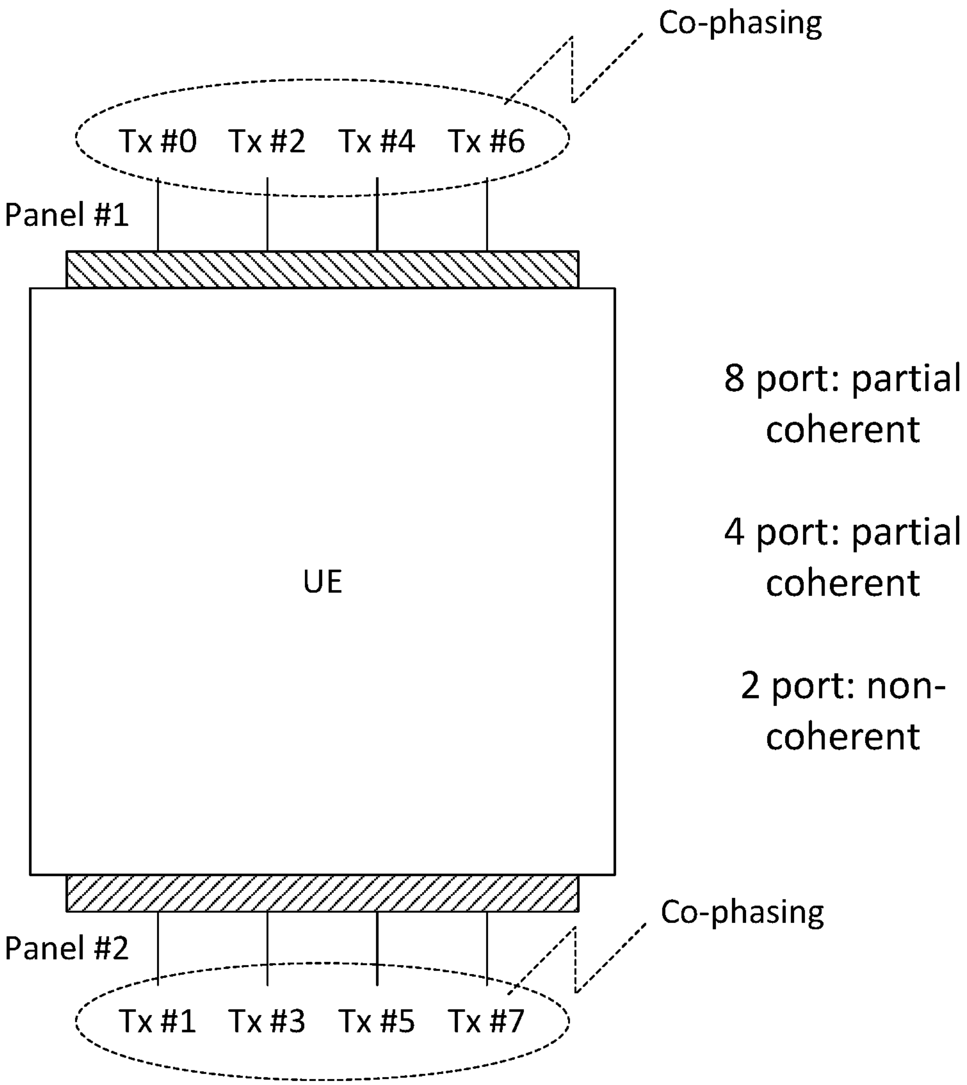
FIG. 13 illustrates a UE with port-dependent coherence in accordance with some embodiments.

In a fourth example, the UE may report partial coherence for P={8, 4} and non-coherence for P={2}. FIG. 13 illustrates a UE with port-dependent coherence in accordance with some embodiments, in particular the fourth example. The number of co-phasing ports is 4. Port {#0, #2, #4, #6} are co-phasing; port {#1, #3, #5 #7} are co-phasing. For 8-port, the UE is partial coherent. For 4-port, the UE is partial coherent. For 2-port, the UE is non-coherent.

Figure 14:
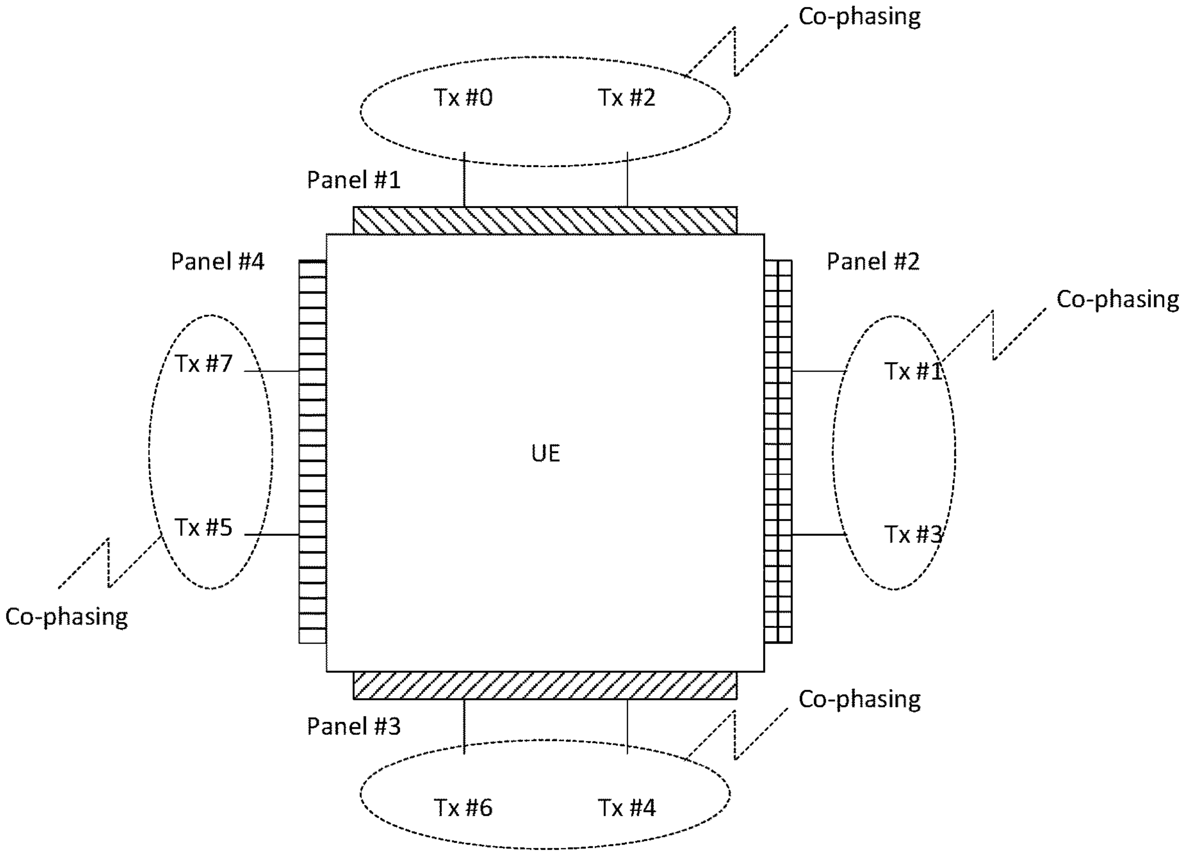
FIG. 14 illustrates a UE with port-dependent coherence in accordance with some embodiments.

FIG. 14 illustrates a UE with port-dependent coherence in accordance with some embodiments. In FIG. 14, the number of co-phasing ports is 2. Port {#0, #2}, {#1, #3}, {#4, #6} and {#5, #7} are co-phasing. For 8-port, the UE is partial coherent. For 4-port, the UE is partial coherent. For 2-port, the UE is non-coherent.

Figure 15:
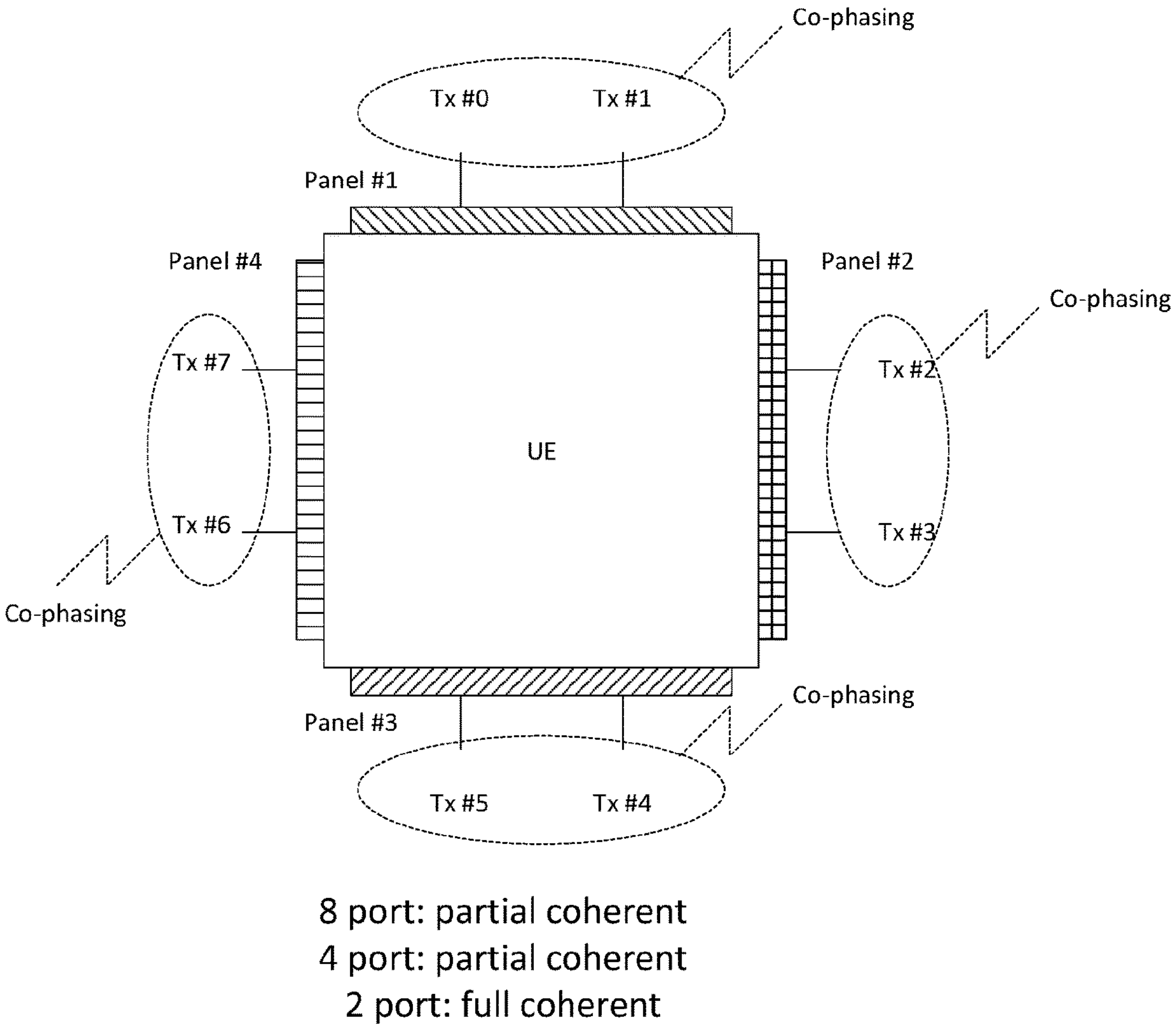
FIG. 15 illustrates a UE with port-dependent coherence in accordance with some embodiments.

In a fifth example, the UE may report partial coherence for P={8, 4}, and full coherence for P={2}. FIG. 15 illustrates a UE with port-dependent coherence in accordance with some embodiments, in particular the fifth example. In FIG. 15, the number of co-phasing ports is 2. Port {#0, #1}, {#2, #3}, {#4, #5} and {#6, #7} are co-phasing. For 8-port, the UE is partial coherent. For 4-port, the UE is partial coherent. For 2-port, the UE is full coherent.

In another embodiment, when the UE reports coherence capability for 8-port, if the coherence is partial coherence, the UE may report the number of co-phasing ports, and/or the port combination among which the UE is able to maintain relative phase. For example, for the UE shown in FIG. 12, the UE reports partial coherence for 8-port, the number of co-phasing port is 4, and/or the UE reports the port combination of {#0, #1, #2, #3} and {#4, #5, #6, #7} over which the UE is able to maintain relative phase. For the UE shown in FIG. 13, the UE reports partial coherence for 8-port, the number of co-phasing port is 4, and/or the UE reports the port combination of {#0, #2, #4, #6} and {#1, #3, #5, #7} over which the UE is able to maintain relative phase. For the UE shown in FIG. 14, the UE reports partial coherence for 8-port, the number of co-phasing port is 2, and/or the UE reports the port combination of {#0, #2}, {#1, #3}, {#4, #6} and {#5, #7} over which the UE is able to maintain relative phase. For the UE shown in FIG. 15 Error! Reference source not found, the UE reports partial coherence for 8-port, the number of co-phasing port is 2, and/or the UE reports the port combination of {#0, #1}, {#2, #3}, {#4, #5} and {#6, #7} over which the UE is able to maintain relative phase.

In another embodiment, for uplink transmission with multiple codewords/multiple panels, the same or different UE coherence capability may be reported for different codeword/panels. Correspondingly, the same or different codebook subset may be configured for different codeword/panels.

In another embodiment, for uplink transmission with up to N ports, various port groups may be defined with the number of port groups being M. For example, 8 antenna ports may be split into two port groups, in which the 1$^{st}$ port group includes port #0 to port #3, and the 2$^{nd}$ port group includes port #4 to port #7. The UE may report the same or different coherence capability for different port group. Correspondingly, the same or different codebook subsets may be configured for different port groups.

Enhanced Full Power Operation

In an embodiment, the UE capability on full power operation is reported for each number of antenna ports supported by the UE or a subset of the number of antenna ports supported by the UE. For different numbers of antenna ports, the UE full power operation capability may be the same or different.

When the gNB configures full power operation, the same or different full power modes may be configured to the UE for difference numbers of ports depending on the UE capability. One or multiple full power operation modes may be configured to the UE simultaneously. When multiple full power modes are configured, the full power modes may be the same or different for different numbers of ports.

Figure 16:
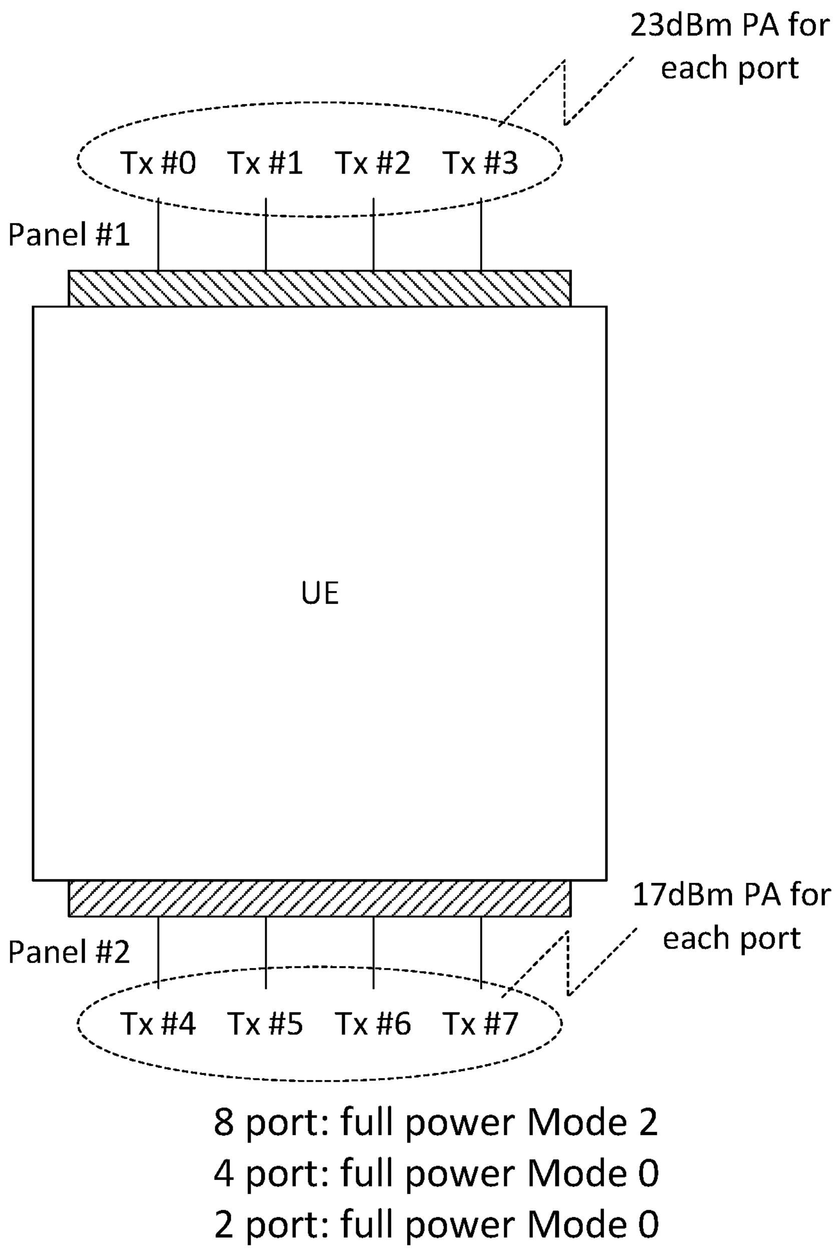
FIG. 16 illustrates a UE with port-dependent full power mode in accordance with some embodiments.

FIG. 16 illustrates a UE with port-dependent full power mode in accordance with some embodiments. For the 1$^{st}$ four ports (port #0 to #3), each PA is 23 dBm. For the 2$^{nd}$ four ports (port #4 to #7), each PA is 17 dBm. In such a case, for 8-port, the UE may support full power Mode 2. For 4-port and 2-port, the UE may support full power Mode 0.

In another example, the UE may support full power Mode 2 for 8-port. For 4-port with port combination {#0, #1, #2, #3}, the UE may support full power Mode 0, and for 4-port with port combination {#4, #5, #6, #7}, the UE may support full power Mode 1. For 2-port with port combination {#0, #1} and {#2, #3}, the UE may support full power Mode 0, and for 2-port with port combination {#4, #5} and {#6, #7}, the UE may not support full power operation.

In another embodiment, for uplink transmission with multiple codewords/multiple panels, the same or different UE full power capability may be reported for different codeword/panels. Correspondingly, the same or different full power mode may be configured for different codeword/panels.

In another embodiment, for uplink transmission with up to N ports, multiple port groups may be defined with the number of port group being M. For example, the 8 antenna ports are split into two port groups, with the 1$^{st}$ port group including port #0 to port #3, and the 2$^{nd}$ port group including port #4 to port #7. The UE may report the same or different full power operation capability for different port groups. Correspondingly, the same or different full power mode may be configured for different port groups.

Thus, in various embodiments, a UE that is able support uplink transmission with up to 8 ports reports a coherence capability and full power operation capability to a gNB. In response the gNB may configure the UE with a corresponding codebook subset and full power operation mode dependent on the coherence capability. The coherence capability is reported for each number of antenna ports supported by the UE or a subset of the number of antenna ports supported by the UE. The coherence capability is able to be identical or different for different numbers of antenna ports. Identical or different codebook subsets are configured to the UE for different numbers of ports depending on the UE capability. The codebook subsets are simultaneously configured to the UE.

For an 8-port coherence capability that indicates partial coherence, the UE reports at least one of a number of co-phasing ports or port combinations among which the UE is able to maintain relative phase. For uplink transmission with multiple codewords or panels, identical or different UE coherence capabilities are reported for at least one of different codewords or panels. Correspondingly, identical or different codebook subsets are configured for the at least one of different codewords or panels.

A predetermined number of port groups are defined for uplink transmission with up to N ports. For 8 antenna ports split into two port groups, a first port group includes port #0 to port #3, and a second port group includes port #4 to port #7. The UE reports identical or different coherence capabilities for the different port groups. Identical or different codebook subset are configured for the different port groups.

The full power operation capability is reported for each antenna port supported by the UE or a subset of the antenna ports supported by the UE. The full power operation capability is identical or different for different numbers of antenna ports. In response to full power operation being configured by the gNB, identical or different full power modes are configured to the UE for different numbers of ports depending on the full power operation capability. One or more full power operation modes are simultaneously configured to the UE.

For uplink transmission with at least one of multiple codewords or panels, identical or different UE full power capabilities are reported for the different at least one of codeword or panels. Correspondingly, identical or different full power modes are configured for the different at least one of codeword or panels.

EXAMPLES

Example 1 is an apparatus for a user equipment (UE), the apparatus comprising: memory; and processing circuitry, to configure the UE to: receive, from a 5th generation NodeB (gNB), a codebook for eight port uplink physical shared channel (PUSCH) transmission, the codebook containing a plurality of Transmit Precoder Matrix Indicators (TPMIs) that includes, a non-coherent TPMI, a partial coherent TPMI, and a full coherent TPMI; receive, from the gNB, downlink channel information (DCI) scheduling a PUSCH, the DCI indicating one of the TPMIs; and transmit, to the gNB, the PUSCH on eight ports of the UE based on the DCI; and wherein the memory is configured to store the codebook.

In Example 2, the subject matter of Example 1 includes, wherein: the processing circuitry configures the UE as a partial coherent UE to transmit the PUSCH, and one of the UE has four panels, each panel contains two co-phasing antenna ports, and the partial coherent TPMI includes two co-phasing ports, or the UE has two panels, each panel contains four co-phasing antenna ports, and the partial coherent TPMI includes four co-phasing ports.

In Example 3, the subject matter of Example 2 includes, wherein the processing circuitry configures the UE to report, to the gNB, UE capacity that indicates which one of both of two or four co-phasing ports in the partial coherent TPMI is supported by the UE.

In Example 4, the subject matter of Example 3 includes, wherein: the codebook contains a partial coherent codebook subset that includes partial coherent TPMIs that are dependent on the UE capacity, and for UE support of two co-phasing ports in the partial coherent TPMI, one of partial coherent TPMIs with two co-phasing ports are able to be configured to the UE in the partial coherent codebook subset, or partial coherent TPMIs with two co-phasing ports are able to be configured to the UE in the partial coherent codebook subset and partial coherent TPMIs with four co-phasing TPMIs are unable to be configured to the UE in the partial coherent codebook subset, and for UE support of four co-phasing ports in the partial coherent TPMI, one of: partial coherent TPMIs with four co-phasing ports are able to be configured to the UE in the partial coherent codebook subset, or partial coherent TPMIs with four co-phasing ports and partial coherent TPMIs with two co-phasing ports are able to be configured to the UE in the partial coherent codebook subset.

In Example 5, the subject matter of Examples 3-4 includes, wherein the processing circuitry configures the UE to: support full power Mode 1, report, to the gNB, whether the UE is able to support full power delivery for partial coherent TPMIs with two port co-phasing or four port co-phasing, and in response to the UE supporting full power for partial coherent TPMIs, at least one of set a power scaling factor for corresponding partial coherent TPMIs to be 1 or report to the gNB partial coherent TPMIs that can deliver full power.

In Example 6, the subject matter of Examples 3-5 includes, wherein the processing circuitry configures the UE to: split the partial coherent TPMIs into groups including a first group with two port co-phasing and a second group with four port co-phasing, report, to the gNB, a supported power scaling factor for corresponding TPMIs in each group, and use the reported power scaling factor for the corresponding TPMIs when performing power control.

In Example 7, the subject matter of Examples 1-6 includes, wherein: the processing circuitry configures the UE as a full coherent UE to transmit the PUSCH, one of: the UE has four panels, each panel contains two co-phasing antenna ports, and the partial coherent TPMI includes two co-phasing ports, or the UE has two panels, each panel contains four co-phasing antenna ports, and the partial coherent TPMI includes four co-phasing ports, and partial coherent TPMIs containing two co-phasing ports and partial coherent TPMIs containing four co-phasing ports are able to be configured to the UE in a full coherent codebook subset of the codebook.

In Example 8, the subject matter of Examples 1-7 includes, wherein: the UE has eight ports with multiple port groups of an identical number of ports, and the DCI indicates the one of the TPMIs in a “Precoding information and number of layers” field for each port group.

In Example 9, the subject matter of Example 8 includes, wherein one of: an 8-port precoding matrix $W_{8Tx,R(X)}$ with Rank X (X∈{1, 2, 3, 4 . . . 8}) is generated according to $W_{8Tx,R(X)}=[V_1 \otimes W_{1,4Tx,R(X1)} V_2 \otimes W_{2,4TX,R(X2)}]$, where ⊗ is a Kronecker product operation, an 8-port precoding matrix $W_{8Tx,R(X)}$ with Rank X (X∈{1,2,3,4,6,8}) is generated according to $W_{8Tx,R(X)}=W_{1,2TX,R(X1)} \otimes W_{2,4Tx,R(X2)}$, or an 8-port precoding matrix $W_{8TX,R(X)}$ with Rank X (X∈{2, 3,4 . . . 8}) is generated according to $W_{8TX,R(X)}=[V_{1,2Tx,R(1)} \otimes W_{1,4Tx,R(X1)} V_{2,2Tx,R(1)} \otimes W_{2,4Tx,R(X2)}]$.

In Example 10, the subject matter of Examples 8-9 includes, -port precoding matrix, and the field is one of a new field or a sounding reference signal (SRS) Resource Set Indication field for configuration of two SRS resource sets with codebook usage.

In Example 11, the subject matter of Examples 1-10 includes, wherein: the UE is configured with at least one sounding reference signal (SRS) Resource Set resource set with usage of ‘codebook’, and a number of SRS resource sets configured for codebook-based transmission is N_SRS, and N_SRS≥1.

In Example 12, the subject matter of Examples 1-11 includes, wherein for codebook-based PUSCH transmission with up to eight ports: one sounding reference signal (SRS) resource set is configured, up to two or four SRS resources are configured in the SRS resource set, a number of SRS ports for SRS resources within the SRS resource set are identical for up to two SRS resources configured in the SRS resource set and are able to be different for up to four SRS resources configured in the SRS resource set, and for up to two SRS resources configured in the SRS resource set, the processing circuitry configures the UE to apply the codebook-based PUSCH transmission during periods in which full power operation is not enabled and full power operation is enabled and set to full power Mode 0 or full power Mode 1.

In Example 13, the subject matter of Example 12 includes, wherein: different number of ports are configured for the SRS resources within the SRS resource set, TPMI field length is determined by a maximum number of ports of a configured SRS resource, and for up to four SRS resources configured in the SRS resource set, the processing circuitry configures the UE to apply the codebook-based PUSCH transmission during periods in which full power operation is not enabled and full power operation is enabled and set to full power Mode 0, full power Mode 1, or full power Mode 2.

In Example 14, the subject matter of Examples 1-13 includes, wherein for codebook-based PUSCH transmission with up to eight ports: multiple sounding reference signal (SRS) resource sets are configured, a number of SRS ports for SRS resources within one SRS resource set are identical, a number of SRS ports for SRS resources across different SRS resource sets are able to be different, and the DCI includes at least one SRS resource indicator (SRI) field and at least one TPMI field, a number of SRI fields being at most a number of SRS resource sets.

In Example 15, the subject matter of Examples 1-14 includes, wherein: an eight port precoding matrix $W_{8Tx,R(X)}$ with Rank X is generated according at least one of: $W_{8Tx,R(X)}=W_{1,2Tx,R(X1)} \otimes W_{2,4Tx,R(X2)}$ (1), or $W_{8Tx,R(X)}=[V_{1,2Tx,R(1)} \otimes W_{1,4Tx,R(X1)} V_{2,2Tx,R(1)} \otimes W_{2,4Tx,R(X2)}]$, (2) where R(X), R(X1), R(X2) is Rank X, Rank X1, Rank X2, respectively, and ⊗ is a Kronecker product operation.

In Example 16, the subject matter of Example 15 includes, wherein at least one of: $V_{1,2Tx,R(1)}$ and $V_{2,2Tx,R(1)}$ in (2) selects a matrix from:

| | | | | | | |
|---|---|---|---|---|---|---|
| $\begin{bmatrix}0\\0\end{bmatrix}$ | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ |

in which candidate values for V_(1,2Tx,R(1)) and V_(2, 2Tx,R(1)) include a Rank-1 precoder with 2-ports plus [■(0&0)]^T), then (2) is used to generate the eight port precoding matrix for the ranks, or (1) is used for eight ports with Rank X∈{1,2,3,4,5,6,7,8}, for Rank of X={5,7}, the eight port precoding matrix is generated by dropping one column from the precoder of Rank X+1 which is generated according to (1), and a field is added to the DCI to indicate a rank of an indicated TPMI is reduced by one, and the column dropped.

Example 17 is an apparatus for a 5th generation NodeB (gNB), the apparatus comprising: memory; and processing circuitry, to configure the gNB to: transmit, to a user equipment (UE), a codebook for eight port uplink physical shared channel (PUSCH) transmission, the codebook containing a plurality of Transmit Precoder Matrix Indicators (TPMIs) that includes, a non-coherent TPMI, a partial coherent TPMI, and a full coherent TPMI; transmit, to the UE, downlink channel information (DCI) scheduling a PUSCH, the DCI indicating one of the TPMIs; and receive, from the UE, the PUSCH on eight ports of the UE based on the DCI; and wherein the memory is configured to store the codebook.

In Example 18, the subject matter of Example 17 includes, wherein the processing circuitry configures the gNB to receive, from the UE, UE capacity that indicates which one of both of two or four co-phasing ports in the partial coherent TPMI is supported by the UE.

Example 19 is a computer-readable storage medium that stores instructions for execution by one or more processors of a user equipment (UE), the one or more processors to configure the UE, when the instructions are executed: receive, from a 5th generation NodeB (gNB), a codebook for eight port uplink physical shared channel (PUSCH) transmission, the codebook containing a plurality of Transmit Precoder Matrix Indicators (TPMIs) that includes, a non-coherent TPMI, a partial coherent TPMI, and a full coherent TPMI; receive, from the gNB, downlink channel information (DCI) scheduling a PUSCH, the DCI indicating one of the TPMIs; and transmit, to the gNB, the PUSCH on eight ports of the UE based on the DCI.

In Example 20, the subject matter of Example 19 includes, wherein the instructions configure the one or more processors to configure the UE to report, to the gNB, UE capacity that indicates which one of both of two or four co-phasing ports in the partial coherent TPMI is supported by the UE.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The listing above is merely exemplary. Any of the embodiments described above may be added to the examples, such as the coherence and full power capability embodiments described above.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a user equipment (UE), the apparatus comprising: processing circuitry configured to:

decode, from a $5^{th}$ generation NodeB (gNB), a codebook for eight port uplink physical shared channel (PUSCH) transmission, the codebook containing a plurality of Transmit Precoder Matrix Indicators (TPMIs) that includes a non-coherent TPMI, a partial coherent TPMI, and a full coherent TPMI;

decode, from the gNB, downlink channel information (DCI) scheduling a PUSCH, the DCI indicating one of the TPMIs; and encode, for transmission to the gNB, the PUSCH on eight ports of the UE based on the DCI; and memory configured to store the codebook.

2. The apparatus of claim 1, wherein:

the UE is configured as a partial coherent UE to transmit the PUSCH, one of:

the UE has four panels, each panel contains two co-phasing antenna ports, and the partial coherent TPMI includes two co-phasing ports, or the UE has two panels, each panel contains four co-phasing antenna ports, and the partial coherent TPMI includes four co-phasing ports, and the processing circuitry is configured to encode, for transmission to the gNB, UE capacity that indicates which one of both of two or four co-phasing ports in the partial coherent TPMI is supported by the UE.

3. The apparatus of claim 2, wherein:

the codebook contains a partial coherent codebook subset that includes partial coherent TPMIs that are dependent on the UE capacity, and for UE support of two co-phasing ports in the partial coherent TPMI, one of:

partial coherent TPMIs with two co-phasing ports are able to be configured to the UE in the partial coherent codebook subset, or partial coherent TPMIs with two co-phasing ports are able to be configured to the UE in the partial coherent codebook subset and partial coherent TPMIs with four co-phasing TPMIs are unable to be configured to the UE in the partial coherent codebook subset, and for UE support of four co-phasing ports in the partial coherent TPMI, one of:

partial coherent TPMIs with four co-phasing ports are able to be configured to the UE in the partial coherent codebook subset, or partial coherent TPMIs with four co-phasing ports and partial coherent TPMIs with two co-phasing ports are able to be configured to the UE in the partial coherent codebook subset.

4. The apparatus of claim 2, wherein the processing circuitry is configured to:

support full power Mode 1, encode, for transmission to the gNB, whether the UE is able to support full power delivery for partial coherent TPMIs with two port co-phasing or four port co-phasing, and in response to the UE supporting full power for partial coherent TPMIs, at least one of:

set a power scaling factor for corresponding partial coherent TPMIs to be 1, or encode, for transmission to the gNB, partial coherent TPMIs that can deliver full power.

5. The apparatus of claim 2, wherein the processing circuitry is configured to:

split partial coherent TPMIs into groups including a first group with two port co-phasing and a second group with four port co-phasing, encode, for transmission to the gNB, a supported power scaling factor for corresponding TPMIs in each group, and use the supported power scaling factor for the corresponding TPMIs when performing power control.

6. The apparatus of claim 1, wherein the processing circuitry is configured to:

encode a coherence capability for each antenna port or subset of antenna ports supported by the UE and full power operation capability for transmission to the gNB, and decode, from the gNB, a codebook subset and full power operation mode dependent on the coherence capability.

7. The apparatus of claim 1, wherein:

the UE is configured as a full coherent UE to transmit the PUSCH, one of:

the UE has four panels, each panel contains two co-phasing antenna ports, and the partial coherent TPMI includes two co-phasing ports, or the UE has two panels, each panel contains four co-phasing antenna ports, and the partial coherent TPMI includes four co-phasing ports, and partial coherent TPMIs containing two co-phasing ports and partial coherent TPMIs containing four co-phasing ports are able to be configured to the UE in a full coherent codebook subset of the codebook.

8. The apparatus of claim 1, wherein:

the UE has eight ports with multiple port groups of an identical number of ports, and the DCI indicates the one of the TPMIs in a "Precoding information and number of layers" field for each port group.

9. The apparatus of claim 8, wherein one of:

an 8-port precoding matrix $W_{8Tx,R(X)}$ with Rank X ($X \in \{1, 2, 3, 4 \ldots 8\}$) is generated according to $W_{8Tx,R(X)} = [V_1 [W_{1,4Tx,R(X1)}\ V_2 \otimes W_{2,4Tx,R(X2)}]$, where $\otimes$ is a Kronecker product operation, an 8-port precoding matrix $W_{8Tx,R(X)}$ with Rank X($X \in \{1, 2,3,4,6,8\}$) is generated according to $W_{8Tx,R(X)} = W_{1,2Tx,R(X1)} \otimes W_{2,4Tx,R(X2)}$, or an 8-port precoding matrix $W_{8Tx,R(X)}$ with Rank X ($X \in \{2, 3,4 \ldots 8\}$) is generated according to $W_{8Tx,R(X)} = [V_{1,2Tx,R(1)} \otimes W_{1,4Tx,R(X1)} \otimes W_{2,4Tx,R(X2)}]$.

10. The apparatus of claim 8, wherein the DCI contains a field that indicates a number of TPMIs to be used to generate an 8-port precoding matrix, and the field is one of a new field or a sounding reference signal (SRS) Resource Set Indication field for configuration of two SRS resource sets with codebook usage.

11. The apparatus of claim 1, wherein:

the UE is configured with at least one sounding reference signal (SRS) Resource Set resource set with usage of 'codebook', and a number of SRS resource sets configured for codebook-based transmission is $N_{SRS}$, and $N_{SRS} \geq 1$.

12. The apparatus of claim 1, wherein for codebook-based PUSCH transmission with up to eight ports:

one sounding reference signal (SRS) resource set is configured, up to two or four SRS resources are configured in the SRS resource set, a number of SRS ports for SRS resources within the SRS resource set are identical for up to two SRS resources configured in the SRS resource set and are able to be different for up to four SRS resources configured in the SRS resource set, and for up to two SRS resources configured in the SRS resource set, the processing circuitry configures the UE to apply the codebook-based PUSCH transmission during periods in which full power operation is not enabled and full power operation is enabled and set to full power Mode 0 or full power Mode 1.

13. The apparatus of claim 12, wherein:

different number of ports are configured for the SRS resources within the SRS resource set, TPMI field length is determined by a maximum number of ports of a configured SRS resource, and for up to four SRS resources configured in the SRS resource set, the processing circuitry configures the UE to apply the codebook-based PUSCH transmission during periods in which full power operation is not enabled and full power operation is enabled and set to full power Mode 0, full power Mode 1, or full power Mode 2.

14. The apparatus of claim 1, wherein for codebook-based PUSCH transmission with up to eight ports:

multiple sounding reference signal (SRS) resource sets are configured, a number of SRS ports for SRS resources within one SRS resource set are identical, a number of SRS ports for SRS resources across different SRS resource sets are able to be different, and the DCI includes at least one SRS resource indicator (SRI) field and at least one TPMI field, a number of SRI fields being at most a number of SRS resource sets.

15. The apparatus of claim 1, wherein:

an eight port precoding matrix $W_{BTx,R(X)}$ with Rank X is generated according at least one of:

$$W_{8Tx,R(X)} = W_{1,2Tx,R(X1)} \otimes W_{2,4Tx,R(X2)}, \text{ or } \quad (1)$$

$$W_{8Tx,R(X)} = [\, V_{1,2Tx,R(1)} \otimes W_{1,4Tx,R(X1)} \quad V_{2,2Tx,R(1)} \otimes W_{2,4Tx,R(X2)} \,],$$

where R(X), R(X1), R(X2) is Rank X, Rank X1, Rank X2, respectively, and $\otimes$ is a Kronecker product operation.

16. The apparatus of claim 15, wherein at least one of:

$V_{1,2Tx,R(1)}$ and $V_{2,2Tx,R(1)}$, in (2) selects a matrix from:

| | | | | | | |
|---|---|---|---|---|---|---|
| $\begin{bmatrix}0\\0\end{bmatrix}$ | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ |

in which candidate values for $V_{1,2Tx,R(1)}$ and $V_{2,2Tx,R(1)}$ include a Rank-1 precoder with 2-ports plus $[0\ 0]^T$), then (2) is used to generate the eight port precoding matrix for the ranks, or (1) is used for eight ports with Rank X∈{1,2,3,4,5,6,7,8}, for Rank of X={5,7}, the eight port precoding matrix is generated by dropping one column from the precoder of Rank X+1, which is generated according to (1), and a field is added to the DCI to indicate a rank of an indicated TPMI is reduced by one, and the column dropped.

17. An apparatus for a $5^{th}$ generation NodeB (gNB), the apparatus comprising:

processing circuitry configured to:

encode, for transmission to a user equipment (UE), a codebook for eight port uplink physical shared channel (PUSCH) transmission, the codebook containing a plurality of Transmit Precoder Matrix Indicators (TPMIs) that includes a non-coherent TPMI, a partial coherent TPMI, and a full coherent TPMI;

encode, for transmission to the UE, downlink channel information (DCI) scheduling a PUSCH, the DCI indicating one of the TPMIs; and decode, from the UE, the PUSCH on eight ports of the UE based on the DCI; and memory configured to store the codebook.

18. The apparatus of claim 17, wherein the processing circuitry configures the gNB to decode, from the UE, UE capacity that indicates which one of both of two or four co-phasing ports in the partial coherent TPMI is supported by the UE.

19. A non-transitory computer-readable storage medium that stores instructions for execution by one or more processors of a user equipment (UE), the one or more processors, when the instructions are executed, are configured to:

decode, from a $5^{th}$ generation NodeB (gNB), a codebook for eight port uplink physical shared channel (PUSCH) transmission, the codebook containing a plurality of Transmit Precoder Matrix Indicators (TPMIs) that includes a non-coherent TPMI, a partial coherent TPMI, and a full coherent TPMI;

decode, from the gNB, downlink channel information (DCI) scheduling a PUSCH, the DCI indicating one of the TPMIs; and encode, for transmission to the gNB, the PUSCH on eight ports of the UE based on the DCI.

20. The medium of claim 19, wherein the instructions, when executed, configure the one or more processors to encode, for transmission to the gNB, UE capacity that indicates which one of both of two or four co-phasing ports in the partial coherent TPMI is supported by the UE.

* * * * *